(12) United States Patent
Iwai

(10) Patent No.: US 9,762,170 B2
(45) Date of Patent: Sep. 12, 2017

(54) MAGNETIC INDUCTION FIXED MAGNETIC POLE ROTOR MOTOR

(71) Applicant: Takeo Iwai, Yachiyo (JP)

(72) Inventor: Takeo Iwai, Yachiyo (JP)

(*) Notice: Subject to any disclaimer, the term of this patent is extended or adjusted under 35 U.S.C. 154(b) by 0 days.

(21) Appl. No.: 14/437,687

(22) PCT Filed: Apr. 30, 2014

(86) PCT No.: PCT/JP2014/061993
§ 371 (c)(1),
(2) Date: Mar. 3, 2017

(87) PCT Pub. No.: WO2015/118700
PCT Pub. Date: Aug. 13, 2015

(65) Prior Publication Data
US 2017/0170769 A1    Jun. 15, 2017

(30) Foreign Application Priority Data

Feb. 4, 2014  (JP) ................................. 2014-019014
Feb. 16, 2014  (JP) ................................. 2014-027083

(51) Int. Cl.
| | | |
|---|---|---|
| *H02P 1/26* | (2006.01) | |
| *H02P 25/22* | (2006.01) | |
| *H02P 6/16* | (2016.01) | |
| *H02P 1/40* | (2006.01) | |

(52) U.S. Cl.
CPC ............... *H02P 25/22* (2013.01); *H02P 1/40* (2013.01); *H02P 6/16* (2013.01)

(58) Field of Classification Search
CPC .......... H02P 27/04; H02P 27/06; H02P 21/00; H02P 1/24; H02P 1/26

USPC .... 318/400.01, 400.02, 400.14, 400.15, 700, 318/701, 721, 799, 800, 801, 430; 310/10, 323.02, 323.21, 12.13, 46, 12.28, 310/49.23, 156.01, 166, 171, 216.074, 310/254.1

See application file for complete search history.

(56) References Cited

U.S. PATENT DOCUMENTS 8,760,030 B2 *  6/2014  Ross ...................... H02K 41/06
310/156.16

FOREIGN PATENT DOCUMENTS

| JP | H04-021391 | 1/1992 |
|---|---|---|
| JP | H07-194178 A | 7/1995 |
| JP | H10-271870 A | 10/1998 |

(Continued)

*Primary Examiner* — Antony M Paul
(74) *Attorney, Agent, or Firm* — Oliff PLC

(57) ABSTRACT

A rotor having rotation salient poles, a stator having fixed salient poles with a plurality of field winding sets, K control signal output sections outputting signals by detecting a plurality of sections to be formed on a cylindrical body or a disk pivoted to the rotor by a plurality of sensors installed to correspond to the fixed salient poles with the plurality of sections to be detected are opposed to a track formed in a circumferential direction, and a power-feeding control section having control circuits operating according to control signals, controlling directions and intensities of excitation currents, where the rotation salient poles are opposed to at least two salient poles, and the excitation currents are controlled with magnetic fields in the same direction occur in rotation salient poles of the salient poles advanced by at least one and magnetic fields disappear in rotation salient poles.

10 Claims, 42 Drawing Sheets

(56) References Cited

FOREIGN PATENT DOCUMENTS

| | | |
|---|---|---|
| JP | 2001-008306 A | 1/2001 |
| JP | 2003-061381 A | 2/2003 |
| JP | 2007-244024 A | 9/2007 |
| JP | 2008-054441 A | 3/2008 |
| JP | 2008-167599 A | 7/2008 |
| JP | 5063822 B1 | 10/2012 |
| JP | 5128709 B1 | 1/2013 |
| JP | 5406406 B1 | 2/2014 |

* cited by examiner

MAGNETIC INDUCTION FIXED MAGNETIC POLE ROTOR MOTOR

TECHNICAL FIELD

The present invention relates to a magnetic induction fixed magnetic pole rotor motor where both a rotor and a stator have salient pole structures, which always magnetically induces the rotor to a fixed magnetic pole by controlling directions and intensities of excitation currents flowing from a direct-current power source to field windings, and in particular to a magnetic induction fixed-magnetic pole rotor motor where switching of a rotation direction of a rotor and regeneration braking are possible.

BACKGROUND ART

Conventionally, a switch reluctance motor (SR motor) where both a rotor and stator include salient poles, which causes non-sine wave currents to flow in field windings wound on the salient poles of the stator and rotationally drives the rotor by magnetic attraction forces of the field windings is known. This motor has such a feature that since laminated electromagnetic steel plates are used for the rotor, there is not such a problem that heat generation or heat demagnetization of the rotor occurs, and a high speed rotation is possible at a low cost. However, in a two-phase drive SR motor, when the salient poles of the rotor and the stator are completely opposed to each other, inductance change in a rotation direction does not occur, so that a torque does not occur. Therefore, a stepped gap type SR motor or a cam type SR motor which has solved such a problem by providing a step difference in a length of the rotor salient pole in a rotation direction or changing the rotor salient pole in a taper shape to change induction in the rotation direction has been introduced, but since a rotation direction where the inductance changes is limited to one direction in these motors, a reverse rotation is difficult therein. Further, a switched reluctance motor composed of a first switched reluctance motor section driving at three or more phases and a second switched reluctance motor section driving a two phases has been proposed (see Patent Document 1). In the three-phase switched reluctance motor, however, since a torque is generated in such an aspect that the salient poles of the rotor move relative to the salient poles of the excited stator such that the reluctance becomes minimal, the torque is pulsated, so that when a starting torque is small and a load is large depending on the position of the rotor, rotation does not take place or a large rotation fluctuation may occur. In addition, when reverse rotation is forced, the salient poles overlap with each other, and switching of an exciting phase is further performed after going pass, so that a case that starting cannot be made takes place. Therefore, a switched reluctance motor where three rotation position sensors for the rotor are provided and combination patterns of 6 kinds of position signals obtained from the three sensors are changed for each rotation of 15° of the rotor has been proposed (see Patent Document 2).

Further, as a method for detecting a rotation position of a rotor body, a method for capturing inductance changes of three coils where magnetic flux is obstructed by a rotor rotating in a synchronous manner, a method for detecting magnetic fields of magnets arranged on a rotating body so as to be opposed to rotation salient poles by Hall elements arranged around the rotating body so as to correspond to the rotation salient poles, and the like are disclosed (see Patent Documents 3, 7, 8).

On the other hand, in an electric automobile, a method for converting surplus kinetic energy during running time of the electric automobile into electricity to charge the same in a secondary battery, and the so-called regeneration braking where surplus kinetic energy during deceleration is converted to electricity to be collected and consumed are effective for suppressing energy consumption to elongate a running distance or enhancing an energy efficiency. Therefore, such a method is proposed that, when power generated by regeneration braking is charged into the battery, a capacity limitation value of an initial charging is set less than full charging such that the battery is not overcharged on a long downslope while an upper limit value of a vehicle speed is set so as to lower when charging reaches overcharging during running (see Patent Document 4). Further, such a method is proposed that by performing an integration processing of a toque, use of a regeneration torque is limited or inhibited to prevent the windings of the motor from overheating and sufficient vehicle performance is secured, after a high torque exceeding a reference value is outputted, and a such an inconvenience is solved that a current is limited due to rising of a winding temperature due to regeneration braking during hill descending and a torque required during hill ascending thereafter cannot be obtained (see Patent Document 5).

Further, such a method that for improving fuel consumption, only regeneration braking is used when a required braking force obtained by brake pedal operation is smaller than a regeneration braking force, while both regeneration braking and frictional braking are used when the required braking force is larger than the regeneration braking force, and a ratio of the regeneration braking force is made small when rapid barking is required, or the like is proposed (see Patent Document 6).

In the method described in Patent Document 1 or Patent Document 2, however, noises or vibrations may occur due to unbalance of a radial direction component of a torque acting on the rotor and a special logic circuit for combining a main excitation phase and a subsidiary excitation phase with each other in response to a rotation angle of the rotor is required. Further, in the methods disclosed in Patent Document 4 to Patent Document 6, there is such a possibility that, even if improvement of the energy efficiency or improvement of the fuel consumption can be achieved, when a driver familiar to an engine automobile relaxes and releases an acceleration pedal with a feeling similar to that to an engine brake, the driver steps on the brake pedal hastily from a feeling of anxiety when the regeneration braking does not function.

Therefore, the present applicant invented a non-sine wave driving motor which can obtain a low torque ripple with a high torque by detecting magnetic poles of magnets installed on a rotation body rotating in synchronism with a rotor by magnetic sensors such as Hall elements to detect a rotation position of the rotor and controlling excitation currents flowing in field windings wound on the magnetic poles of the stator while performing acceleration and deceleration with the same means and the same operation in order to obtain a feeling similar to the engine brake and got a patent of the invention (see Patent Documents 7 and 8).

PRIOR ART TECHNICAL DOCUMENT

Patent Document

Patent Document 1: Japanese Patent Application Laid-Open No. 2007-244024

Patent Document 2: Japanese Patent Application Laid-Open No. 2003-61381
Patent Document 3: Japanese Patent Application Laid-Open No. H07-194178
Patent Document 4: Japanese Patent Application Laid-Open No. 2008-54441
Patent Document 5: Japanese Patent Application Laid-Open No. 2008-167599
Patent Document 6: Japanese Patent Application Laid-Open No. 2001-8306
Patent Document 7: Japanese Patent No. 5063822
Patent Document 8: Japanese Patent No. 5128709

SUMMARY OF THE INVENTION

Problem to be Solved by the Invention

However, the inventions described in Patent Document 7 and Patent Document 8 are configured such that magnets are installed on a peripheral edge of a rotation body rotating in synchronism with a rotor and control signals for controlling excitation currents in respective field windings are obtained by detecting the magnetic fields of the magnets by magnetic sensors arranged around the rotation body, and it is thought that the control signals can be obtained by another preferred method other than this method. Further, the invention described in Patent Document 8 does not have a means for performing rotation direction switching, and the invention described in Patent Document 7 uses a method provided with a magnetic sensor for forward rotation and a magnetic sensor for reverse rotation individually in order to perform switching of a rotation direction, but it is not required to include sensors individually necessarily.

In view of these circumstances, a first object of the present invention is to provide a magnetic induction fixed magnetic pole rotor motor which controls an excitation current by a control signal obtained by detecting a rotation position of a rotor by a sensor (other than a magnetic sensor) while switching to each direction is free, can obtain smooth actuations and strong reluctance torques regarding both rotation directions, and is reduced in rotation fluctuation. Further, a second object of the present invention is to provide a magnetic induction fixed magnetic pole rotor motor which makes it possible to perform acceleration and deceleration by the same apparatus operation and can store power generated by regeneration braking during deceleration to enhance an energy efficiency.

Means for Solving the Problem

A magnetic induction fixed magnetic pole rotor motor of the present invention is provided with a rotor having 2n rotation salient poles arranged symmetrically regarding a rotation shaft, where n is an integer; a stator having 2nK fixed salient poles arranged so as to be opposed to the rotation salient poles and formed with a plurality of field winding sets by connecting field windings wound on the respective fixed salient poles in parallel or in series, where K is an integer of 3 or more; K control signal output sections outputting control signals at timings at which the rotation salient poles pass through the respective fixed salient poles based upon detection signals obtained by detecting a plurality of sections to be detected formed on a cylindrical body or a disk pivoted to the rotation shaft and rotating synchronously by a plurality of sensors installed at positons corresponding to the respective fixed salient poles so as to be caused to be opposed to a track formed in a circumferential direction by the sections to be detected; and a power-feeding control section having K control circuits operating according to the respective control signals and controlling directions and intensities of excitation currents fed from a direct-current power source to the field winding sets, wherein the respective rotation salient poles are opposed to at least two of the fixed salient poles, the excitation currents are controlled such that magnetic fields in the same direction occur in rotation salient poles of the rotation salient poles other than trailing ends of rotation salient poles in a rotation direction opposed to the fixed salient poles and rotation salient poles of the respective salient poles advanced from rotation salient poles of the respective salient poles having leading ends in the rotation direction which have passed through the fixed salient pole by at least one, and magnetic fields disappear in rotation salient poles of the respective salient poles having trailing ends in the rotation direction opposed to the fixed salient poles, and the respective rotation salient poles are always magnetized to the same magnetic pole regardless of rotation positions of the respective rotation salient poles to be rotated.

In this case, the respective sections to be detected are ones formed on a side face of the cylindrical body or a flat face of the disk in a circumferential direction to be spaced from each other at fixed intervals, and the control signal output sections output the control signals, when the track is singular, by detection signals detected by K sensor pairs formed by combining the plurality of sensors installed in one row by twos at intervals of k, and when the track is composed of a plurality of tracks, by detection signals detected by K sensor pairs formed by combining the plurality of sensors installed on a plurality of rows by twos of the sensors installed on different rows.

Thus, the sections to be detected are arranged such that one or a plurality of tracks are formed on the side face of the cylindrical body or the flat face of the disk in a circumferential direction, and K sensor pairs are constituted at positions opposed to these tracks by combining the plurality of sensors arranged in one row so as to be caused to correspond to an adjacent fixed salient pole by twos at intervals of K or combining the plurality of sensors arranged in a plurality of rows, by twos of the sensors in different rows. Then, since the direction of the excitation current is controlled by a control signal outputted when one of each sensor pair detects a section to be detected and a control signal outputted when the other of each sensor pair detects a section to be detected, a magnetic field distribution of each rotation salient pole can be kept constant, and a magnetic field distribution of a fixed salient pole opposed to each rotation salient pole can be rotationally moved according to rotation of each rotation salient pole. Therefore, magnetization of one of the plurality of fixed salient poles opposed to the rotation salient pole, to which a trailing end of the rotation salient pole is opposed is suspended, and excitation is performed such that magnetization directions of the remaining fixed salient poles and a fixed salient pole advanced from the leading end of the rotation salient pole by at least one become the same, so that attraction force in the rotation direction always acts on each rotation salient pole, and a motor with a high torque and reduced torque ripple can be obtained.

Here, the sections to be detected are reflection portions for reflecting illumination light or transmission portions through which illumination light is transmitted, and the K sensor pairs are composed of two K light sensors for performing irradiation of light toward the reflection portions or the transmission portions and receiving reflection lights by the reflection portions or transmission lights by the transmission portions to output detection signals, and the control signal output sections can output control signals causing the excitation currents to flow in one direction and control signals causing the excitation currents to flow in the other direction according to the detection signals outputted from the K light sensor pairs, respectively. Further, the respective sections to be detected are conductor portions shielding a portion of electromagnetic wave, and the K sensor pairs are composed of 2K coil sensors outputting detection signals according to inductance changes when electromagnetic wave is emitted toward the conductor portions, and the control signal output sections can output control signals causing the excitation currents to flow in one direction and control signals causing the excitation currents to flow in the other direction according to the detection signals outputted from the respective K coil sensors.

Thus, as the sensor, a light sensor having a light emitting element and a light receiving element integrated with each other or a light sensor having a light emitting element and a light receiving element separated from each other is used and a coil sensor where one side of a Wheatstone bridge is constituted by a coil can be used, but control signals for controlling directions and intensities of excitation currents by detection signals outputted from sensor pairs obtained by combining the light sensors or the coil sensors by twos can be generated. That is, such a configuration can be adopted that, for example, two output terminals are provided on a control signal output section having a terminal inputted with a PWM signal adjusting a rotation torque and two terminals inputted with a detection signal from the sensor pair, so that a direction of the excitation current is controlled by outputting a PWM signal (PWM control signal) from one of the terminals when a section to be detected is detected by one sensor of the sensor pair and outputting a PWM signal (PWM control signal) from the other of the terminals when the section to be detected is detected by the other sensor of the sensor pair.

The control signal output sections stop the control signals when the detection signals are not inputted to the control signals output sections, and the control signal output sections output the respective control signals at timings at which the excitation current exciting the fixed salient pole to which a trailing end of one of the respective rotation salient poles in the rotation direction is opposed stops, and the excitation currents exciting the fixed salient pole through which the leading end of the one of the rotation salient poles in the rotation direction has passed and the respective fixed salient poles advanced from the fixed salient pole by at least one are caused to flow in the same directions.

In this case, it is preferable that when a length of an opposed face of each rotation salient pole to the fixed salient pole in the rotation direction is L0, a length of the fixed salient pole in the rotation direction is L1, a length of a slot between the rotation salient poles to each other in the rotation direction is L2, the number of the fixed salient poles opposed to each slot between the rotation salient poles to each other is m, and the number of control signal output sections whose control signals are simultaneously stopped of the control signal output sections is p; p is 1 or more and m or less; and when a circumference of a track formed by the sections to be detected is equal to a circumference formed by the opposed faces of the rotation salient poles, a circumferential length W of the section to be detected is set to [L0+L2+(m−p)*(L1+L2)].

Thus, by stopping the control signals when the sensor pairs do not detect the section to be detected, the fixed salient pole to which the trailing end of the rotation salient pole in the rotation direction is opposed can be put in magnetization suspension. When the number of fixed salient poles simultaneously put in magnetization suspension per one of the rotation salient poles is made equal to or less than the number of fixed salient poles opposed to the slot between the rotation salient poles to each other and the circumferential length W of the section to be detected is set to satisfy the above equation, the respective rotation salient poles are always magnetized to the same pole regardless of their rotation positions, and attraction force in the rotation direction always acts on the rotation salient poles without attraction force in a reverse direction to the rotation direction acting on the rotation salient poles, and a high torque can be obtained at a low torque ripple.

The magnetic induction fixed magnetic pole rotor motor can be configured so as to be provided with a command signal generation section generating a first command signal for accelerating rotation of the rotor and a second command signal for decelerating the rotation; a rotation signal generation section generating a rotation signal with a duty ratio corresponding to the first command signal and inputting the rotation signal into the respective control signal output sections; a regeneration signal generation section generating a regeneration signal with a duty ratio corresponding to the second command signal; and a regeneration power control section rectifying powers induced in the respective field winding sets in response to the duty ratio of the regeneration signal to store electricity in a storage apparatus. Further, The magnetic induction fixed magnetic pole rotor motor can be configured so as to be provided with an overload detection section outputting an overload signal when the excitation current caused to flow in each field winding set exceeds a threshold value, wherein the rotation signal generation section decreases the duty ratio of the rotation signal when being inputted with the overload signal, and increases the decreased duty ratio of the rotation signal up to a duty ratio corresponding to the first command signal when the overload signal disappears, or an overcurrent detection section outputting an overcurrent signal when a current due to a voltage induced in each field winding set exceeds a threshold value, wherein the regeneration signal generation section decreases the duty ratio of the regeneration signal when being inputted with the overcurrent signal, and increases the decreased duty ratio of the regeneration signal up to a duty ratio corresponding to the second command signal when the overcurrent signal disappears.

Thereby, since acceleration or deceleration can be performed using one command means, for example, in application to an acceleration pedal of an electric automobile, a speed of the electric automobile can be changed freely and regeneration braking can be performed with a feeling similar to engine braking. Further, an energy efficiency can also be improved by storing power obtained by the regeneration braking in a large-capacity capacitor and charging the power in a secondary battery. Furthermore, by monitoring an excitation current or an overcurrent, even if any abnormality occurs, burnout of the field winding or runaway of a motor can be prevented.

The magnetic induction fixed magnetic pole rotor motor is provided with a switching section switching an input destination of one of the control signals outputted from the control signal output sections from one predetermined control circuit of the respective control circuits to another predetermined control circuit, wherein such a configuration that when the switching section receives a command for reversing the rotor from a forward rotation direction to a reverse rotation direction or from the reverse rotation direction to the forward rotation direction, the switching section is subjected to switching is adopted, forward and reverse rotation commands can be implemented by the same sensor pair.

Further, since the K control signal output sections are forward rotation control signal output sections outputting the control signals according to detection signals detected by K forward rotation sensor pairs actuated when a predetermined power is fed to the K forward rotation sensor pairs, and the K control signal output sections are provided with K reverse rotation control signal output sections outputting the control signals according to detection signals detected by K reverse rotation sensor pairs provided separately of the forward rotation sensor pairs, and a power-feeding switching means switching feeding of the power to ones of the forward rotation sensor pairs and the reverse rotation sensor pairs when receiving a command regarding a rotation direction of the rotor, forward and reverse rotation commands can be performed; and since the K control signal output sections are forward rotation control signal output sections outputting the control signals according to detection signals detected by K forward rotation sensor pairs during input of the rotation signals, and the K control signal output sections are provided with K reverse rotation control signal output sections outputting the control signals according to detection signals detected by K reverse rotation sensor pairs provided separately of the forward rotation sensor pairs, and a rotation signal switching means switching an input destination of the rotation signal to ones of the forward rotation control signal output sections and the reverse rotation control signal output sections when receiving a command regarding a rotation direction of the rotor, forward and reverse rotation commands can be performed.

Effect of Invention

According to the magnetic induction fixed magnetic pole rotor motor of the present invention, by detecting sections to be detected installed on a cylindrical body or a disk rotating synchronously by sensor pairs formed by combining a plurality of sensors such as light sensors or coil sensors to control excitation currents, the rotation salient poles are always magnetized to the same magnetic pole, while a magnetic field disappears in a fixed salient pole of the fixed salient poles to which the respective rotation salient poles are opposed, to which a trailing end of the rotation salient pole in the rotation direction and attraction force always acts on a rotation salient poles from a fixed salient pole advanced from the fixed salient pole to which a leading end of a rotation salient pole in the rotation direction is opposed by at least one, so that the rotor can obtain a large even torque regardless of a rotation direction of the rotor. In this case, individual sensor pairs can be used to respective forward rotation and reversed rotation and a common sensor pair can be used. Therefore, it is unnecessary to use rare earth metal for the rotor, and the rotor can be manufactured at a low cost by using one obtained by forming ferromagnetic material (including a permanent magnet), one obtained by laminating electromagnetic steel sheets, or the like. Further, switching from forward rotation to reverse rotation or from reverse rotation to forward rotation can be performed freely by switching operation of the switching section performing switching among control circuits to be inputted with a control signal, power-feeding switching to forward or reverse rotation sensors, and switching of a command signal between a forward rotation control signal output section and a reverse rotation control signal output section. Furthermore, by providing a command signal generation means, a regeneration control means and the like and performing application to an acceleration pedal of an electric automobile, a speed of the electric automobile can be changed freely, and regeneration braking can be performed with a feeling similar to an engine brake. Further, an energy efficiency can also be enhanced by storing power obtained by regeneration braking in a large-capacity capacitor and charging the power into a secondary battery.

MODE FOR CARRYING OUT THE INVENTION

Embodiments of a magnetic induction fixed magnetic pole rotor motor of the present invention will be described below with reference to the drawings.

First Embodiment

Figure 1:
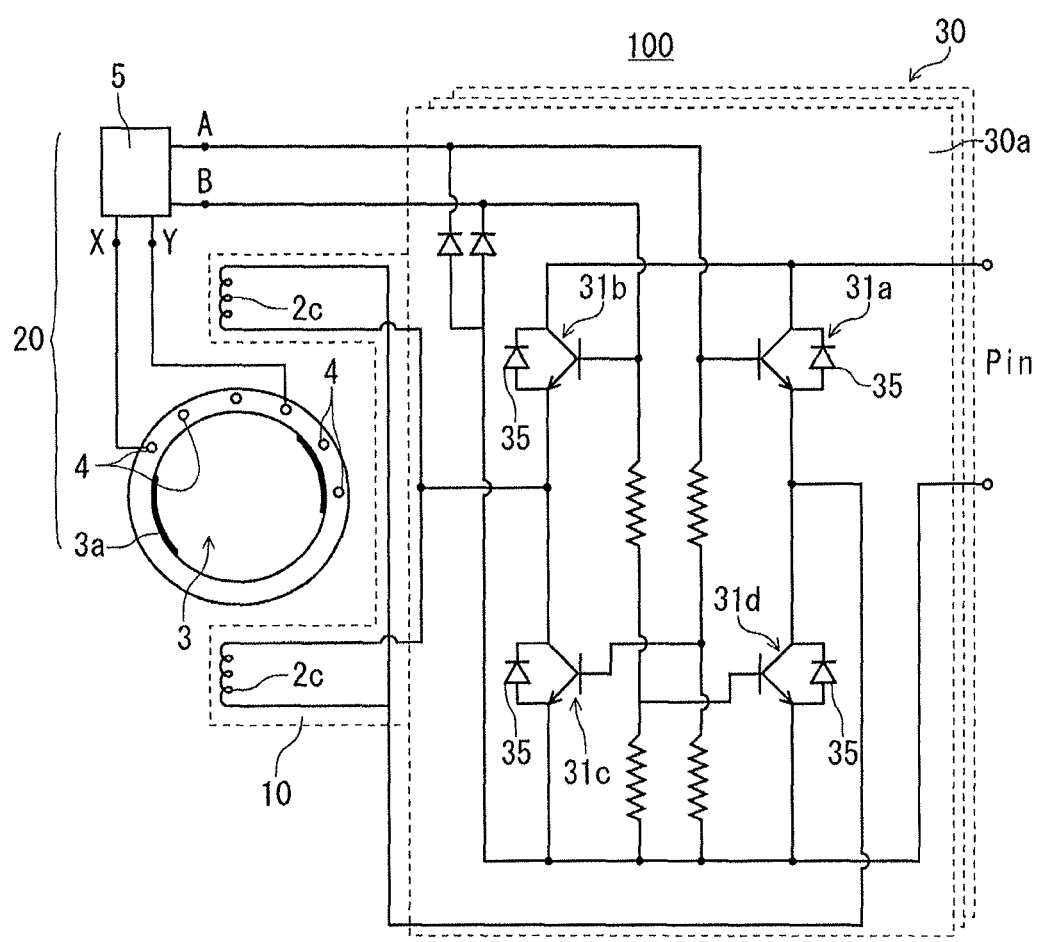
FIG. 1 is a diagram showing a magnetic induction fixed magnetic pole rotor motor of a first embodiment.
Figure 2:
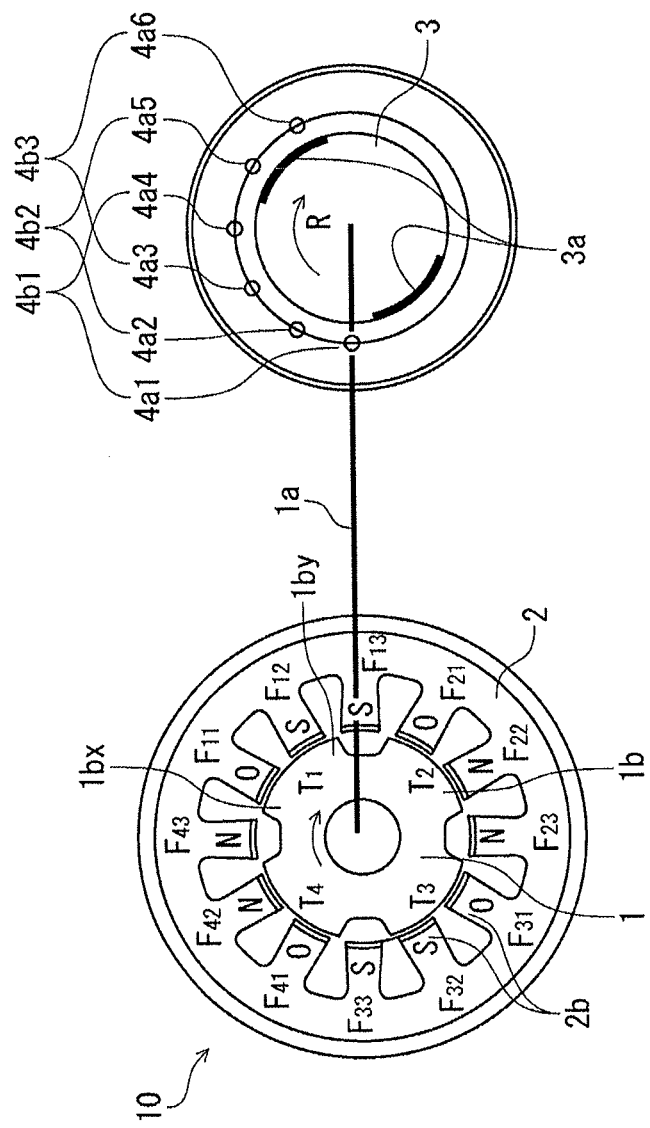
FIG. 2 is a diagram showing one example of a motor main body.

FIG. 1 is a diagram showing a magnetic induction fixed magnetic pole rotor motor of a first embodiment, and FIG. 2 is a view showing one example of a motor main body which does not appear in FIG. 1 (a case where the number of rotation salient poles is 4 and the number of fixed salient poles is 12).

A magnetic induction fixed magnetic pole rotor motor 100 shown in FIG. 1 and FIG. 2 is provided with a motor main body 10 having a rotor 1 provided with rotation salient poles 1b and a stator 2 provided with fixed salient poles 2b wound with field windings, a detection section 20 for detecting timings at which the rotation salient poles 1b pass through the respective fixed salient poles 2b, and a power-feeding control section 30 for controlling a direction and an intensity of an excitation current caused to flow from a direct-current power source to each field winding set 2c via a power source input terminal Pin.

The rotor 1 has 2n rotation salient poles 1b arranged symmetrically regarding a rotation shaft 1a, where n is an integer.

The stator 2 has 2nK (which is K times the number of rotation salient poles 1b) fixed salient poles 2b arranged so as to be opposed to the rotation salient poles 1b, where K is an integer of 3 or more). K sets of field winding sets 2c are formed by connecting 2n field windings obtained by sequentially combining 2nK field windings wound on the 2nK fixed salient poles 2b at intervals of K in parallel while performing switching between starting ends and terminal ends of the field windings such that directions of magnetic fields occurring are sequentially reversed.

Here, the field winding set 2c of this embodiment is formed by connecting 2n field windings in parallel in consideration of winding starts and winding terminations of the respective 2n field windings and arrangement positions, but the field winding set 2c is not required to be formed by connecting the respective 2n field windings in parallel necessarily, and it may be formed by connecting respective n field windings in parallel or it may be formed by connecting respective 2n or n field windings in series.

Further, as the rotor 1 of this embodiment, one obtained by forming a ferromagnetic body (including a permanent magnet) is used, but the rotor 1 is not required to be constituted of a ferromagnetic body necessarily and one obtained by stamping electromagnetic steel plates to laminate them can be used.

The detection section 20 has a cylindrical body 3 where n sections to be detected 3a are provided on the same track in a circumferential direction of a side face thereof, 2K light sensors 4 fixed and provided at non-contact positions on a periphery of the side face of the cylindrical body 3 so as to correspond to the fixed salient poles 2b and detecting the respective sections to be detected 3a to output detection signals, and a control signal output section 5 outputting a control signal for controlling a direction and an intensity of an excitation current according to a detection signal outputted from each sensor 4 and a PWM signal (adjusting a current flow time by a pulse width) inputted separately, and it detects timings at which the rotation salient poles 1b pass through the respective fixed salient poles 2b so that control signals (hereinafter, called "PWM control signals") whose pulse widths have been modulated are outputted.

Here, when the sensor 4 is a light sensor 4a and light which has been emitted from the light emitting element and has been reflected by the section to be detected 3a is received by the light receiving element to output a detection signal, a light reflection plate is used in the section to be detected 3a, and when light which has been emitted from the light emitting element and has transmitted through the section to be detected 3a is received by the light receiving element to output a detection signal, a light transmitting plate or a slit is used in the section to be detected 3a.

Further, when the sensor 4 is a coil sensor 4c, a conductor plate serving to shield magnetism is used in the section to be detected 3a.

The 2K sensors 4 (4a1 to 4ak, or 4c1 to 4ck) are arranged at positions corresponding to the respective adjacent 2K fixed salient poles 2b of the respective fixed salient pole 2b and they are combined by twos to constitute K sensor pairs 4p(4b1 to 4bk, or 4d1 to 4dk).

Each sensor pair 4p is configured such that when the respective sensors 4 detect the sections to be detected 3a, detection signals are outputted from output terminals (X, Y) of the respective sensors 4.

The control signal output section 5 is provided with output terminals (A, B), a PWM control signal being outputted from either one of the output terminals (A, B) in response to detection signals outputted from the output terminals (X, Y) of each sensor pair 4p. That is, for example, when a detection signal is inputted into the control signal section 5 from the X terminal, a PWM control signal whose pulse width has been modulated is outputted from the A terminal, and when a detection signal is inputted into the control signal section 5 from the Y terminal, a PWM control signal is outputted from the B terminal.

The power-feeding control section 30 is provided with K switching circuits 30a corresponding to the respective control signal output sections 5, each control circuit 30a is provided with four switching elements 31a, 31b, 31c and 31d, and free wheel diodes 35 bypassing a surge voltage or the like are connected to the respective switching elements 31a, 31b, 31c, 31d in parallel.

For example, when a PWM control signal is inputted into the control circuit 30a from the A terminal of the control signal output section 5, the switching elements 31a and 31c operate, and when a PWM control signal is inputted into the control circuit 30a from the B terminal, the switching elements 31b and 31d operate. Therefore, when the respective field winding sets 2c and the respective control circuits 30a correspond to each other one by one, directions and intensities of excitation currents a caused to flow the respective field winding sets 2c can be controlled.

That is, depending on one of the output terminals (A, B) of the control signal output section 5 from which a PWM control signal is inputted, the direction of an excitation current fed from the direct-current power source to each field winding set 2c is controlled, and the intensity (the current flow time) of the excitation current is controlled by a duty ratio of the PWM control signal. Therefore, magnetic fields (N, S) different in direction occur in 2n fixed salient poles 2b corresponding to respective field winding sets 2c in response to a connection aspect where winding starts and winding terminations of the respective field windings are connected in parallel.

On the other hand, when a PWM control signal is not inputted into the control signal output section 5, each control circuit 30a does not operate, so that an excitation current stops, and magnetic fields do not occur in 2n fixed salient poles 2b corresponding to the field winding set 2c (hereinafter, called "magnetization suspension").

In this connection, a counter electromotive voltage is induced in the field winding set 2c put in the magnetization suspension, but it can be utilized as an excitation current for another field winding set 2c via the free wheel diode 35 connected in parallel.

Here, the control signal output section 5 of this embodiment adopts a configuration where a control signal is outputted from either one of the output terminals (A, B) depending on one of the sensors 4 of the sensor pair 4p from which a detection signal has been inputted, but the control signal output section 5 is not limited to this configuration necessarily.

Figure 3:
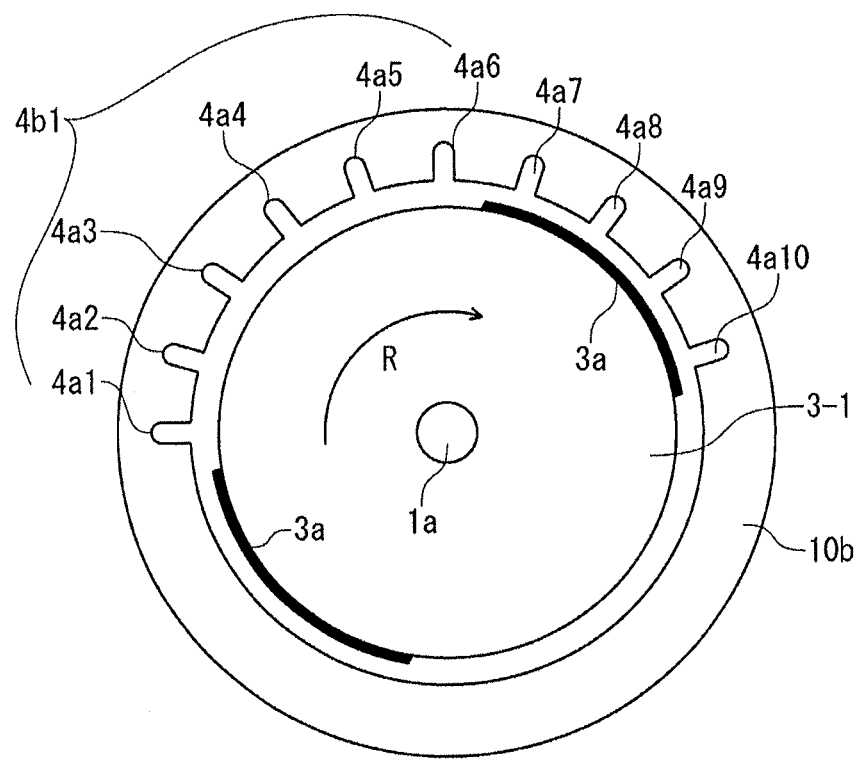
FIG. 3 is a view showing an example of a cylindrical body where light sensors for detecting reflected light are arranged.
Figure 4:
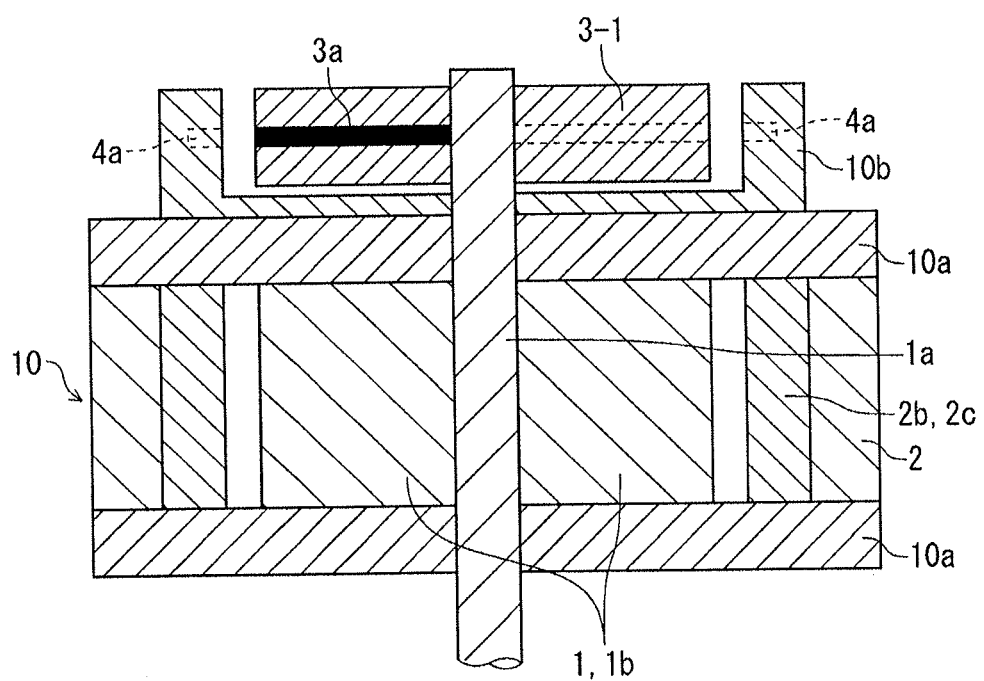
FIG. 4 is a sectional view showing a state where the cylindrical body and the light sensor are arranged in the motor main body.
Figure 5:
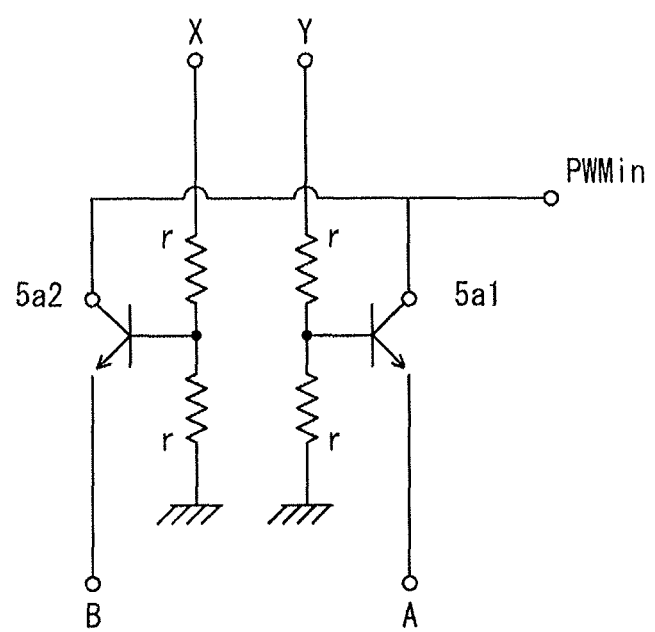
FIG. 5 is a diagram showing one example of a control signal output section.

FIG. 3 is a view showing an example of the cylindrical body where light sensors for detecting reflected light are arranged on a side face of the cylindrical body, FIG. 4 is a sectional view showing a state where the cylindrical body and the light sensors are arranged in the motor main body, and FIG. 5 is a diagram showing one example of the control signal output section.

A cylindrical body 3-1 shown in FIG. 3 is pivoted to a rotation shaft 1a of the motor main body 10, and a side face thereof is covered with a circular holder 10b. Sections to be detected (reflection plates) 3a are arranged on the same track in a circumference direction of the side face symmetrically regarding the rotation shaft 1a.

Further, 10 light sensors 4a are fixed and mounted at non-contacting positions opposed to the sections to be detected (reflection plates) 3a corresponding to the respective fixed salient poles 2b.

The light sensor 4a is composed of a light emitting element and a light receiving element and it is arranged at a position corresponding to each fixed salient pole 2b adjacent thereto. Light of the light emitting element 4ax is reflected by the section to be detected (reflection plate) 3a of the cylindrical body 3-1, and reflected light thereof is received on the light receiving element so that a detection signal is outputted.

A first light sensor 4a1 and a sixth light sensor 4a6 constitute a first light sensor pair 4b1 and a second light sensor 4a2 and a seventh light sensor 4a7 constitute a second sensor pair 4b2 in a direction of arrow R. In the following, a t-th (t is an integer of 1 or more) light sensor 4at and a (t+5)-th light sensor 4a(t+5) constitute a t-th light sensor pair 4bt, and a fifth light sensor 4a5 and a tenth light sensor 4a10 constitute a fifth light sensor pair 4b5.

On the other hand, in the cylindrical body 3-1 of this embodiment, since a circumferential length W of a portion of the track on which the section to be detected (reflection plate) 3a is arranged is set so as to be shorter than a circumferential length a portion of the track where no section to be detected (reflection plate) 3a is arranged by a length corresponding to one or two of the fixed salient poles 2b, the light sensors 4a1 and 4a6 of the light sensor pair 4b1 at the rotation position shown in FIG. 3 do not receive reflected light and a corresponding control signal output section 5 is not inputted with a detection signal and it does not output a PWM control signal. As a result, a magnetic field does not occur in a corresponding fixed salient pole 2b (hereinafter, called "magnetization suspension"). When the cylindrical body 3-1 rotates in the direction of arrow R, the light sensor pair 4b which does not output a PWM control signal also move one by one in the direction of arrow R and the fixed salient poles 2b put in the magnetization suspension also move one by one in the direction of arrow R.

Here, a reflection plate with a high reflectivity vapor-deposited or attached with aluminum, tin or the like is used in the section to be detected (reflection plate) 3a in this embodiment, but it is not limited to this necessarily. Further, as the light sensor 4a, one composed of an LED or the like serving as the light emitting element and a photodiode or the like serving as the light receiving element integrated with each other is used, but the light sensor 4a is not limited to this necessarily, and a light sensor 4a where a light emitting element and a light receiving element are arranged so as to be separated from each other via a side face of the cylindrical body and light transmitting through a section to be detected (slit) 3a formed on the side face of the cylindrical body 3 is received may be used. Further, such a configuration can be adopted that the section to be detected 3a is formed of a conductor plate, a coil sensor 4c is used instead of the light sensor 4a, and an inductance change when an electromagnetic wave is emitted toward the conductor plate is adopted as the detection signal. In this connection, the circumferential length W of the portion of the track on which the section to be detected (reflection plate) 3a is arranged is set so as to be shorter than a circumferential length of the portion of the track where no section to be detected (reflection plate) 3a is arranged by a length corresponding to one or two of the fixed salient poles 2b, but the circumferential length W can be set arbitrarily depending on the number of fixed salient poles 2b to be put in the magnetization suspension simultaneously.

As shown with a section in FIG. 4, the motor main body 10 has a rotor 1 where the rotation salient poles 1b are arranged symmetrically regarding the rotation shaft 1a, a stator 2 wounded with a field winding sets 2c, and a casing 10a. Further, the cylindrical body 3-1 is pivoted to the rotation shaft 1a so as to rotate in a synchronization manner.

A holder 10b is attached to the casing 10a so as to cover a side face of the cylindrical body 3-1, and 10 fixed salient poles 2b adjacent to one another and 10 light sensors 4a (4a1 to 4a10) caused to correspond thereto are provided inside the holder 10b.

Therefore, when the rotation shaft 1a rotates, the cylindrical body 3-1 rotates, and when the section to be detected 3a of the cylindrical body passes through the respective light sensors 4a (4a1 to 4a10) in the holder 10b, the respective light sensors 4a outputs detection signals so that a rotation position of the rotor 1 can be detected.

The control signal output section 5 shown in FIG. 5 has two transistors 5a, output terminals (X, Y) of the light sensor pair 4b from which a detection signals are outputted, an input terminal PWMin externally inputted with a PWM signal for controlling an intensity (a current flow time) of a excitation current, an A terminal outputting a PWM control signal causing the excitation current to flow in a forward direction, and a B terminal outputting a PWM control signal causing the excitation current to flow in a reverse direction, where the respective collectors of two transistors 5a are connected to the input terminal PWMin, the respective emitters thereof are connected to the A terminal or the B terminal, and, the respective bases thereof are connected to the input terminal (X) and the ground or the input terminal (Y) and the ground via resistors r.

When a detection signal is inputted into the control signal output section 5 from the X terminal during inputting of a PWM signal from the input terminal PWMin, a predetermined bias voltage is applied to the base of one transistor 5a1, so that the collector and the emitter are made conductive to each other, and a PWM control signal by which an excitation current is caused to flow in a forward direction is outputted from the A terminal.

On the other hand, when a detection signal is inputted from the Y terminal, a predetermined bias voltage is applied to the base of the other transistor 5a2, so that the collector and the emitter are made conductive to each other, and a PWM control signal by which an excitation current is caused to flow in a reverse direction is outputted from the B terminal.

In this connection, the control signal output section 5 shown here is one example, and the present invention is not limited to this example necessarily.

Figure 6:
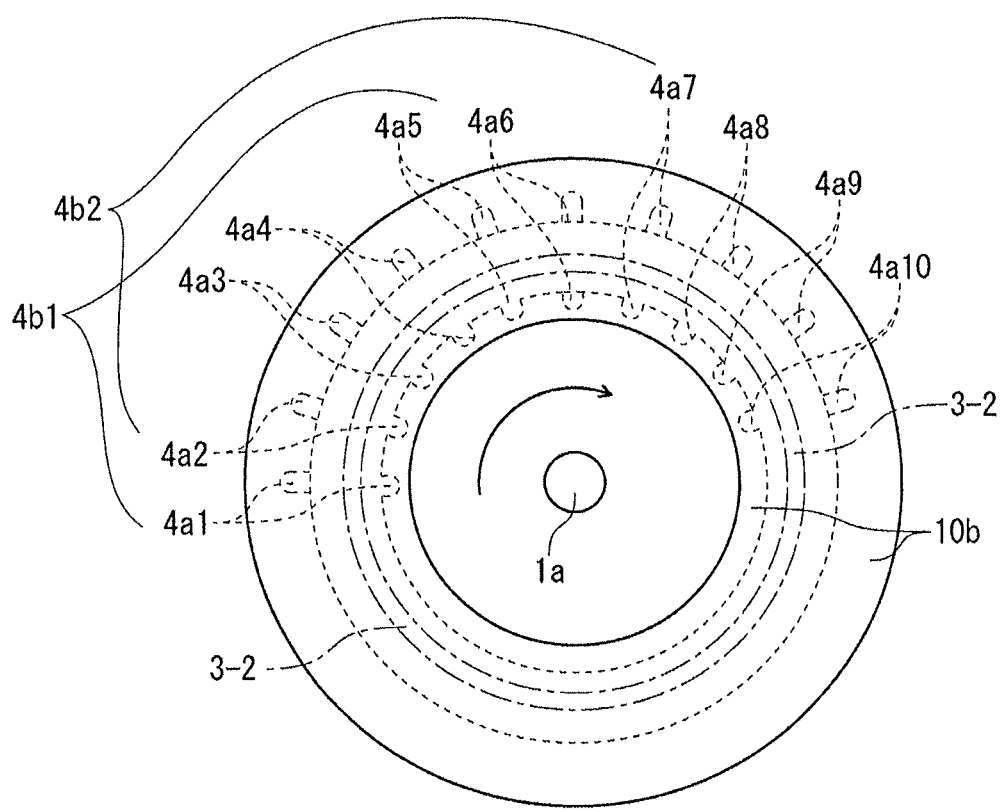
FIG. 6 is a view showing an example where light sensors for detecting transmission light are arranged on both side faces of a cylindrical body.
Figure 7:
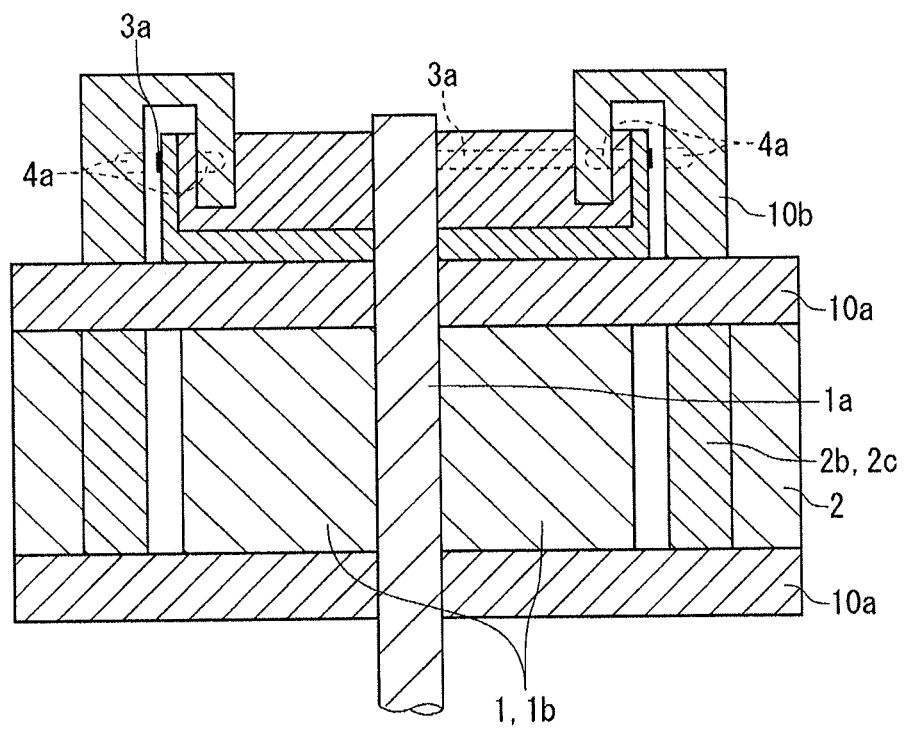
FIG. 7 is a sectional view showing a state where the cylindrical body and the light sensor are arranged in the motor main body.

FIG. 6 shows an example of a cylindrical body having light sensors for detecting transmission light disposed on both side faces of a cylindrical body, and FIG. 7 is a sectional view showing a state where the cylindrical body and light sensors are arranged in a motor main body.

A cylindrical body 3-2 shown in FIG. 6 and FIG. 7 is pivoted to the motor main body 10 via a rotation shaft 1a, and both sides of side faces thereof are covered with circular holders 10b so as to be sandwiched therebetween. Sections to be detected (slits) 3a are provided on the same track in a circumferential direction of the side face at symmetrical positions regarding the rotation shaft 1a. 10 light receiving elements are fixed and provided at positions corresponding to adjacent 10 fixed salient poles 2b on an outside inner circumference of the holders 10b sandwiching the cylindrical body 3, and 10 light emitting elements are fixed and provided on an inside outer circumference of the holder 10b so as to be opposed to the respective light receiving elements, so that 10 light sensors 4a composed of the light emitting elements and the light receiving elements opposed to each other are formed.

Also, in this embodiment, like the first embodiment, a first light sensor 4a1 and a sixth light sensor 4a6 constitute a first light sensor pair 4b1 and a second light sensor 4a2 and a seventh light sensor 4a7 constitute a second sensor pair 4b2 in a direction of arrow R. In the following, a t-th (t is an integer of 1 or more) light sensor 4at and a (t+5)-th light sensor 4a(t+5) constitute a t-th light sensor pair 4bt, and a fifth light sensor 4a5 and a tenth light sensor 4a10 constitute a fifth light sensor pair 4b5. Since one or two pairs of light sensor pairs 4b do not detect a section to be detected (slit) 3a, a corresponding control signal output section 5 does not output a PWM control signal. Thereby, a magnetic field does not occur in a corresponding fixed salient pole 2b (hereinafter, called "magnetization suspension"). Further, either ones of the light sensors of the remaining light sensor pairs 4b output detection signals, and corresponding control signal output sections 5 output control signals to the A terminals or the B terminals. Thus, directions of excitation currents are controlled and corresponding fixed salient poles 2b are magnetized to N pole or S pole.

Figure 8:
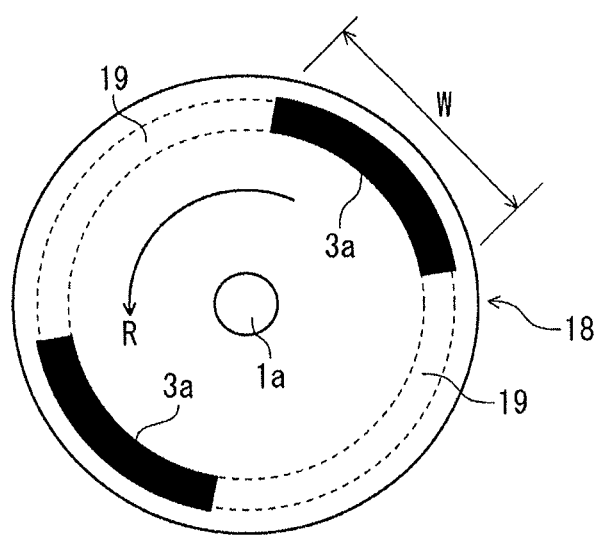
FIG. 8 is a view showing one example of a disk formed with a single track by sections to be detected in a circumferential direction of a flat face.
Figure 9:
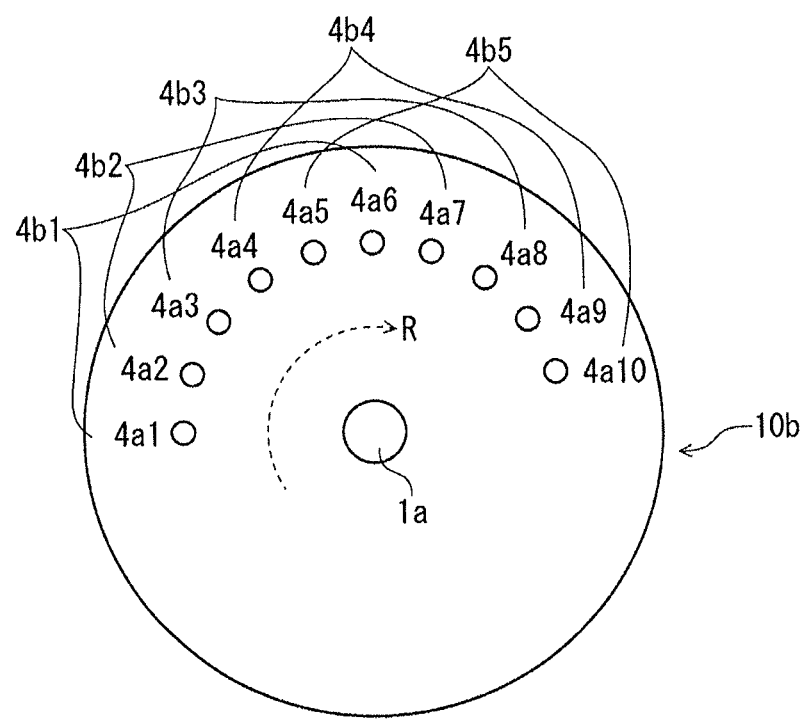
FIG. 9 is a view showing a flat face of a holder in which light sensors are arranged so as to be opposed to a single track.
Figure 10:
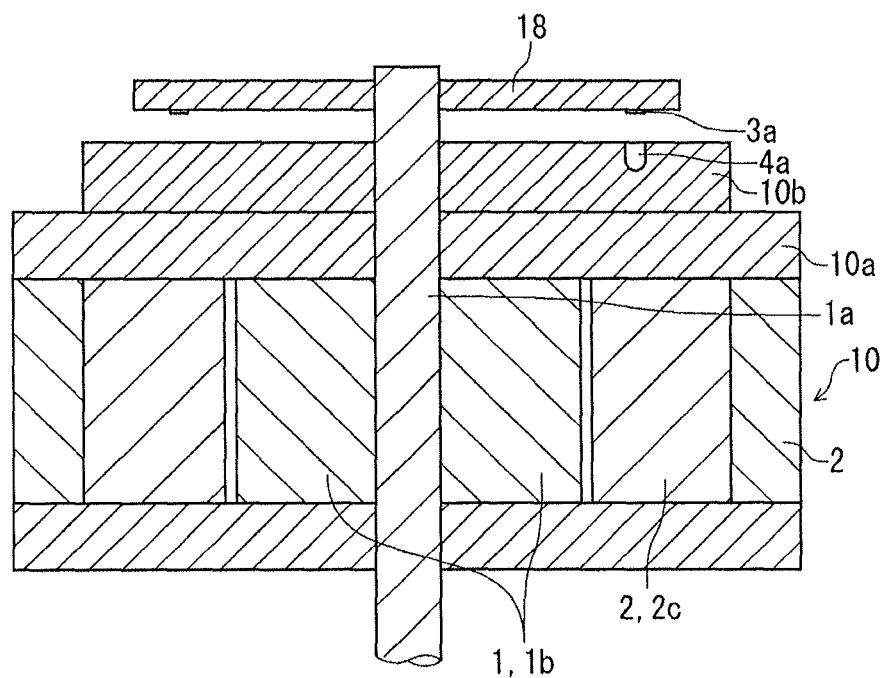
FIG. 10 is a sectional view showing a state where a disk and a holder are installed in the motor main body.

FIG. 8 is a view showing an example of a disk on which a single track composed of sections to be detected is formed in a circumferential direction of a flat face, FIG. 9 is a view showing a flat face of a holder on which light sensors are arranged so as to be opposed to the single track, and FIG. 10 is a sectional view showing a state where a disk and a holder are provided in a motor main body.

As shown in FIG. 8, a rotation shaft 1a pivoted to a rotor is positioned at a central portion of a click 18, and a pair of sections to be detected (reflection plates) 3a are provided in a circumferential direction of the flat face symmetrically regarding the rotation shaft 1a. When the disk 18 rotates, a single track 19 composed of the sections to be detected (reflection plates) 3a is formed.

As shown in FIG. 9, 10 light sensors (4a1 to 4a10) are fixed and provided on a flat face of the holder 10b at positions opposed to the single track 19 so as to be caused to correspond to respective adjacent fixed salient poles 2b.

The light emitting sensor 4a is composed of a light emitting element and a light receiving element and light from the light emitting element is reflected by a section to be detected (reflection plate) 3a and reflected light thereof is received by the light receiving element so that a detection signal is outputted.

Like the explanation regarding FIG. 3 and FIG. 6, 5 light sensor pairs (4*b*1 to 4*b*5) are formed by combining 10 light sensors (4*a*1 to 4*a*10) by twos at intervals of 5 in the direction of arrow R.

Since a circumferential length W of the section to be detected (reflection plate) 3*a* forming the single track on the flat face of the disk 18 of this embodiment is set shorter than the circumferential length of a section where the section to be detected (reflection plate) 3*a* is not provided by one or two of the salient poles 2*b*, the first light sensor pair 4*b*1 does not output a detection signal because neither of the light sensors 4*a*1 nor 4*a*6 receives reflected light. Therefore, a corresponding control signal output section 5 does not output a PWM control signal and a corresponding fixed salient pole 2*b* does not generate a magnetic field (hereinafter, called "magnetization suspension"). When the disk 18 rotates in the direction of arrow R, the light sensor pairs 4*b* which does not output a PMW control signal move one by one in the direction of arrow R, and the fixed salient pole 2*b* put in the magnetization suspension also move in the direction of arrow R by ones.

As shown with a section in FIG. 10, the motor main body 10 has a rotor 1 where rotation salient poles 1*b* are arranged symmetrically regarding a rotation shaft 1*a*, a stator 2 wound with field winding sets 2*c*, and a casing 10*a*. Further, a holder 10*b* arranged with light sensors 4*a* is fixed on the casing 10*a* such that an installation face of the holder 10*b* on which the light sensors 4*a* are arranged is positioned outside. A disk 18 whose flat face is formed with the sections to be detected 3*a* is pivoted to the rotation shaft 1*a* such that an installation face of the sections to be detected 3*a* is caused to be opposed to an installation face of the light sensors 4*a*.

Therefore, when the rotation shaft 1*a* rotates, for example, the disk 18 shown in FIG. 8 rotates in the direction of arrow R, and when the section to be detected 3*a* of the disk passes through respective light sensors 4*a* (4*a*1 to 4*a*10) arranged on the holder 10*b*, the respective light sensors 4*a* outputs detection signals so that a rotation positions of the rotation salient poles 1*b* can be detected.

Figure 11:
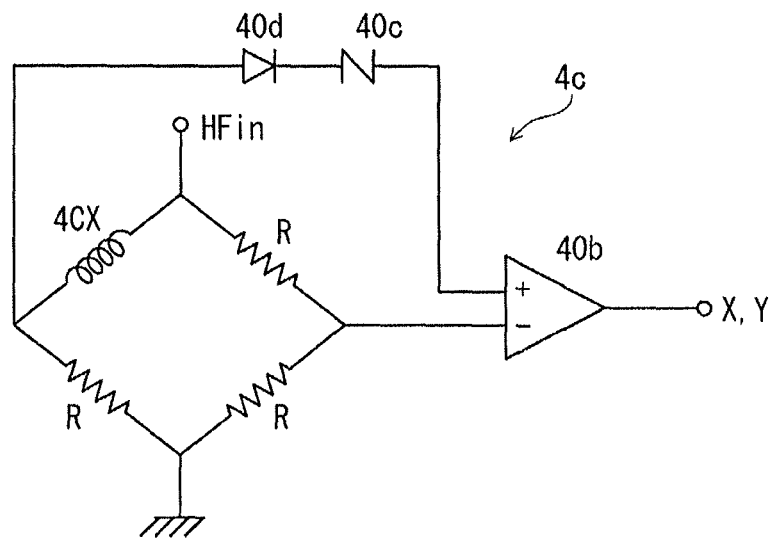
FIG. 11 is a configuration diagram of one example of a coil sensor arranged around a side face of the cylindrical body.
Figure 12:
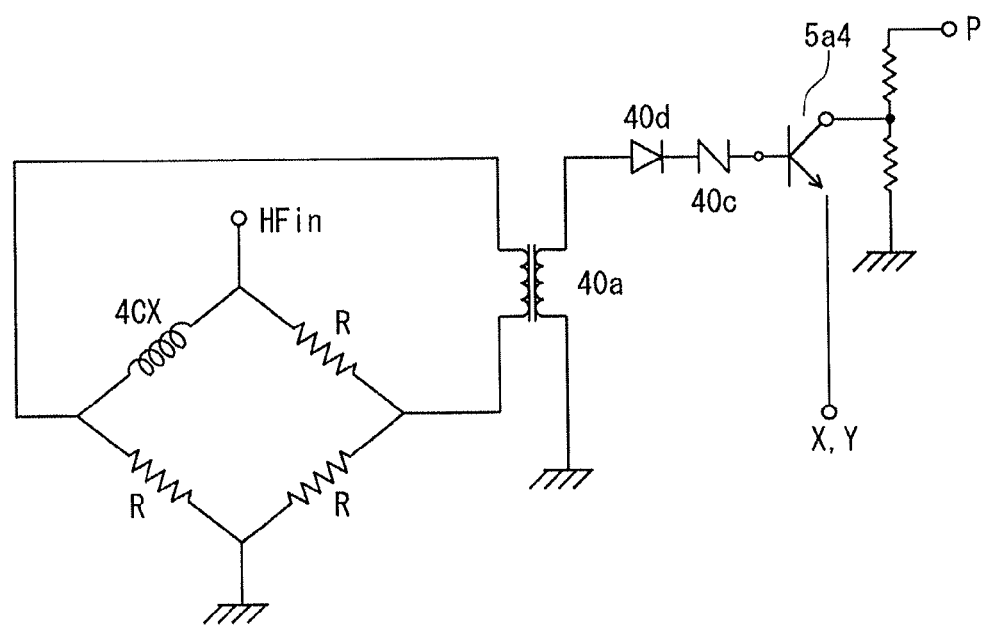
FIG. 12 is a configuration diagram of another example of a coil sensor arranged around a side face of the cylindrical body.

FIG. 11 is a configuration diagram of one example of a coil sensor arranged circumferentially on a side face of a cylindrical body, and FIG. 12 is a configuration diagram of another example of the coil sensor. In this connection, a view showing an arrangement state where light sensors are arranged circumferentially on the side face of the cylindrical body, and a sectional view showing a state where the cylindrical body and the light sensors are arranged in the motor main body are identical to FIG. 3 and FIG. 4 shown as the first embodiment, and figures and explanations thereof are omitted.

In this connection, in the cylindrical body 3-1 shown in FIG. 3, one obtained by performing vapor deposition of, for example, aluminum or tin having a high reflectivity of light to a plastic plate or a metal plate is used but, a metal plate whose inductance changes when magnetic flux of the coil is blocked or a conductor plate formed with a plated layer or a conduction layer of copper, nickel or the like is used in this example.

A coil sensor 4*c* which is one example shown in FIG. 11 has an input terminal HF in inputted with a bias voltage with a high frequency, and it has a Wheatstone bridge composed of three resistors R and a coil 4*cx*, and an operational amplifier 40*b* connected between output side terminals of the Wheatstone bridge via a noise limiter 40*c* cutting low level noises and a diode 40*d*, the operational amplifier 40*b* including an output terminal (X or Y) of a detection signal.

Since the coil 4*cx* constituting the coil sensor 4*c* is arranged so as to be opposed to sections to be detected (conductor plates) 3*a* formed on the cylindrical body 3, the inductance of the coil 4*cx* changes when magnetic flux is blocked by the section to be detected (conductor plate) 3*a*, and a potential difference between the output side terminals of the Wheatstone bridge occurs, and a detection signal of the section to be detected 3*a* is outputted from the operational amplifier 40*b*. On the other hand, when magnetic flux of the coil 4*cx* is not blocked after the section to be detected 3*a* has passed through the magnetic flux, the inductance of the coil 4*cx* does not change, and the Wheatstone bridge is balanced so that no detection signal is outputted from the operational amplifier 40*b*.

The other coil sensor 4*c* shown in FIG. 12 has an input terminal HFin inputted with a bias voltage with a high frequency, it has a Wheatstone bridge composed of three resistors R and a coils 4*cx*, and a pulse transformer 40*a* connected between output side terminals of the Wheatstone bridge, and the base of a transistor 5*a*4 is connected to the output side of the pulse transformer 40*a* via a noise limiter 40*c* cutting low level noises and a diode 40*d*. A predetermined voltage obtained by voltage-dividing a power source voltage P is applied to the collector of the transistor 5*a*4, and an output terminal (X or Y) for a detection signal is connected to the emitter.

The inductance of the coil 4*cx* constituting the coil sensor 4*c* changes when magnetic flux is blocked by a section to be detected (conductor plate) 3*a*, a voltage difference between the output side terminals of the Wheatstone bridge occurs, so that a predetermined voltage is applied to the output side of the pulse transformer 40*a*. As a result, since a bias voltage is applied to the base of the transistor 5*a*4, the collector and the emitter are made conductive to each other, so that a detection signal is outputted from an output terminal (X or Y) connected to the emitter. On the other hand, when magnetic flux of the coil 4*cx* is not blocked by passage of a small-diameter portion 3*a*, the inductance of the coil 4*cx* does not change, and the Wheatstone bridge is balanced so that no detection signal is outputted from the transistor 5*a*4.

In this connection, the coil sensor 4*c* shown hear is one example, and the present invention is not limited to this example necessarily.

Next, an operation of rotating the magnetic induction fixed magnetic pole rotor motor of this embodiment in the direction of arrow R will be described while exemplifying the motor main body shown in FIG. 2.

The motor main body 10 shown in FIG. 2 has a rotor 1 where four rotation salient poles (T1, T2, T3, T4) 1*b* are arranged symmetrically regarding a rotation shaft 1*a*, and a stator 2 where 12 fixed salient poles (F11, F12, F13, F21, F22, F23, . . . F41 . . . F43) 2*b* which are three times the number of rotation salient poles 1*b* are arranged so as to be opposed to the rotation salient poles 1*b*.

Since a field winding is wound on each fixed salient pole 2*b*, 12 field windings (c11, c12, c13, c21, c22, c23, . . . c41 . . . c43) are provided on the stator 2. Regarding four field windings obtained by combining these field windings at intervals of 3 sequentially, three sets of field winding sets (C1, C2, C3) 2*c* are formed by alternately connecting winding starts and winding terminations of the four field windings in parallel.

The detection section 20 shown in FIG. 2 has a cylindrical body 3 having a rotation shaft 1*a* common to the rotor 1, sections to be detected (reflection plates) 3*a* formed on the same track in the circumferential direction of the side face of the cylindrical body 3 symmetrically regarding the rotation shaft 1a, and 6 light sensors 4a installed so as to correspond to adjacent 6 fixed salient poles 2b at non-contacting positions opposed to the sections to be detected (reflection plates) 3a around the cylindrical body 3, where the control signal output section 5 is omitted.

In the 6 light sensors 4a, an eleventh light sensor 4a1 and a fourth light sensor 4a4 constitute a first light sensor pair 4b1, a second light sensor 4a2 and fifth light sensor 4a5 constitute a second light sensor pair 4b2, and a third light sensor 4a3 and a sixth light sensor 4a6 constitute a third light sensor pair 4b3 toward the direction of arrow R.

At the rotation position shown in FIG. 2, neither the first light sensor 4a1 nor the fourth light sensor 4a4 of the first light sensor pair 4b1 detect a section to be detected (reflection plate) 3a, a detection signal is not outputted, and a PWM control signal is outputted from neither the A terminal nor the B terminal of the first control signal output section 5. Therefore, the fixed salient poles (F11, F21, F31, F41) excited by the field winding sets 2c controlled by the PWM control signals are put in a magnetization suspension.

On one hand, regarding the second light sensor pair 4b2, the light sensor 4a5 detects the section to be detected (reflection plate) 3a and a PWM control signal is outputted from the B terminal of the second control signal output section 5. Therefore, an excitation current is controlled by the PWM control signal, the fixed salient poles (F12, F32) of the fixed salient poles (F12, F22, F32, F42) excited are magnetized to S pole, for example, and the fixed salient poles (F23, F43) connected with the field windings in a reverse direction are magnetized to N pole, for example Similarly, regarding the third light sensor pair 4b3, since the light sensor 4a6 detects the section to be detected (reflection plate) 3a and a PWM control signal is outputted from the B terminal of the third control signal output section 5, the fixed salient poles (F13, F33) are magnetized to S pole, for example, and the fixed salient poles (F23, F43) connected with the field windings in a reverse direction are magnetized to N pole, for example. As a result, the rotation salient poles 1b are subjected to attraction force in the direction of arrow R to be rotated and the cylindrical body 3 is also rotated in synchronism with the rotation of the rotation salient poles 1b.

When the rotation salient pole 1b rotationally moves by a distance corresponding to one of the fixed salient poles 2b, the first light sensor pair 4b1 detects the section to be detected (reflection plate) 3a and a PWM control signal is outputted from the A terminal of the first control signal output section 5. On one hand, since the second light sensor pair 4b2 does not detect the section to be detected (reflection plate) 3a, a PWM control signal is not outputted, and since the third light sensor pair 4b3 detects the section to be detected (reflection plate) 3a, a PWM control signal is outputted from the B terminal of the third control signal output section 5. That is, since the section to be detected 3a sequentially moves according to rotation of the rotation salient poles 1b, the terminal from which a PWM control signal is outputted is changed from the A terminal to the B terminal, while a control current is stopped temporarily just before the output of the terminal is changed.

Therefore, directions (N, S) occurring in the respective fixed salient poles 2b also sequentially move in the direction of arrow R, and the rotation salient poles (T1, T3) and the rotation salient poles (T2, T4) are always magnetized to the same magnetic poles, respectively, for example, the rotation salient poles (T1, T3) are magnetized to N pole, while the rotation salient poles (T2, t4) are magnetized to S pole. Further, the fixed salient poles 2b to which the trailing ends 1bx of the rotation salient poles (T1, T3) in the rotation direction are opposed are put into magnetization suspension, while magnetic fields in the (S) direction occur in the fixed salient poles 2b to which the leading ends 1by of the rotation salient poles (T1, T3) in the rotation direction are opposed, and the fixed salient poles 2b advanced from the former fixed salient poles 2b by one generate magnetic fields in the (S) direction, and the rotation salient poles (T1, T3) 1b magnetized to the N pole are attracted to be rotated. Further, the fixed salient poles 2b to which the trailing ends 1bx of the rotation salient poles (T2, T4) magnetized to the S pole in the rotation direction are opposed are put into magnetization suspension, while magnetic fields in the (N) direction occur in the fixed salient poles 2b to which the leading ends 1by of the rotation salient poles (T2, T4) in the rotation direction are opposed, and the fixed salient poles 2b advanced from the former fixed salient poles 2b by one, so that the rotation salient poles (T2, T4) 1b are attracted to be rotated.

Here, the conditions of the sizes of the rotation salient pole 1b, the fixed salient pole 2b and the large diameter portion 3b of the cylindrical body 3 for the case that the respective rotation salient poles 1b are always magnetized to the same magnetic pole regardless of their rotation positions, and attraction force always acts on the rotation salient poles 1b without attraction force in a reverse direction to the rotation direction acting on the rotation salient poles 1b, so that high torque is obtained at a low torque ripple are found.

If it is now assumed that a length of an opposite face of the rotation salient pole 1b to the fixed salient pole 2b in the rotation direction is represented as L0, a length of the fixed salient pole 2b in the rotation direction is represented as L1, and a slot length between the mutual fixed salient poles 2b in the rotation direction is represented as L2, a clearance between the opposite faces of the rotation salient pole 1b and the fixed salient pole 2b is considerably small, so that a length (2n*(L0+Ls) of circumference formed by the opposite face of the rotation salient pole 1b and a length (2nK*(L1+L2) of circumference formed by the opposite face of the fixed salient pole 2b can be deemed to be equal to each other.

Further, when a circumferential length of the section to be detected 3a when the section to be detected 3a arranged in the circumferential direction of the side face of the cylindrical body 3 is deemed to be arranged on the same circumference as the opposite face of the rotation salient pole 1b is represented as W and a circumferential length where the section to be detected 3a is not arranged on the same track as the track on which the section to be detected 3a is arranged is represented as G, an appearance circumferential length (W+G) of the track is equal to (2n*(L0+Ls) or 2nK*(L1+L2).

Further, since the respective 2K sensors 4 are arranged adjacent to the respective fixed salient poles 2b at positions corresponding to the respective fixed salient poles 2b, the whole length D of K sensors 4 when the sensors 4 are deemed to be arranged on the same circumference as the opposite face of the rotation salient poles 1b becomes (2K−1)*(L1+L2).

Now, in order for the respective rotation salient poles 1b to be always magnetized to the same magnetic pole regardless of the rotation positions, it is required that the rotation salient pole 1b bridges at least two fixed salient poles 2b (for example, opposed to halves of respective two fixed salient poles 2b), the length L0 in the rotation direction must be at least (L1+L2) or more (Condition 1).

Further, after the trailing end 1bx of the rotation salient pole in the rotation direction has passed through the trailing end of the fixed salient pole 2b in the rotation direction, if the direction of the magnetic field of the fixed salient pole 2b remains as it it, attraction force in the reverse rotation direction acts on the trailing end 1bx of the rotation salient pole in the rotation direction. Furthermore, even after the leading end 1by of the rotation salient pole in the rotation direction has passed through the fixed salient pole 2b, the direction of the magnetic field of the fixed salient pole 2b remains as it is, and the magnetic field of the fixed salient pole 2b advanced, by one, from the fixed salient pole 2b through which the leading end 1by of the rotation salient pole in the rotation direction has passed disappears, or when the direction of the magnetic field of the fixed salient pole 2b through which the rotation salient pole 1b has passed is the reverse direction, attraction force in the reverse rotation direction also acts on the leading end 1by of the rotation salient pole in the rotation direction, so that the rotation salient pole 1b does not rotate.

Therefore, magnetic fields (N or S) in the same direction occur in the fixed salient poles 2b (for example, three) of the plurality of fixed salient poles 2b (for example, four) to which the rotation salient pole 1b is opposed other than the fixed salient pole 2b (for example, one) to which the trailing end 1by of the rotation salient pole in the rotation direction is opposed, and the fixed salient pole 2b (for example, one) advanced, by at least one, from the fixed salient pole through which the leading end 1by of the rotation salient pole in the rotation direction has passed, while a magnetic field does not occur (disappears) in the fixed salient pole 2b to which the trailing end 1bx of the rotation salient pole in the rotation direction is opposed, namely, a distribution state of a so-called appearing and disappearing magnetic field can be adopted.

Now, when the number of fixed salient poles 2b opposed to a slot between the mutual rotation salient poles 1b is represented as m, and the number of respective sensors 4 constituting the sensor pairs 4p which do not detect a section to be detected 3a simultaneously (corresponding to [the number of control signal output sections stopping a control signal simultaneously] in the present invention, and when a suspension portion is provided, which is approximately equal to the number obtained by converting a circumferential length of the suspension portion to the width of the fixed salient pole 2b) is represented as p, L0 being set to about (K−m)*(L1+L2) or about (K−p)*(L1+L2) (Condition 2), and p being set to 1 or more and m or less and W being set to [L0+L2+(m−p)*(L1+L2) (Condition 3) can be satisfied.

A positional relationship between the cylindrical body in which 10 sensors are arranged and the rotation salient poles and fixed salient poles of the motor main body and magnetized states of the fixed salient poles will be described below while exemplifying the case where n is 2 and K is 5.

Figure 13:
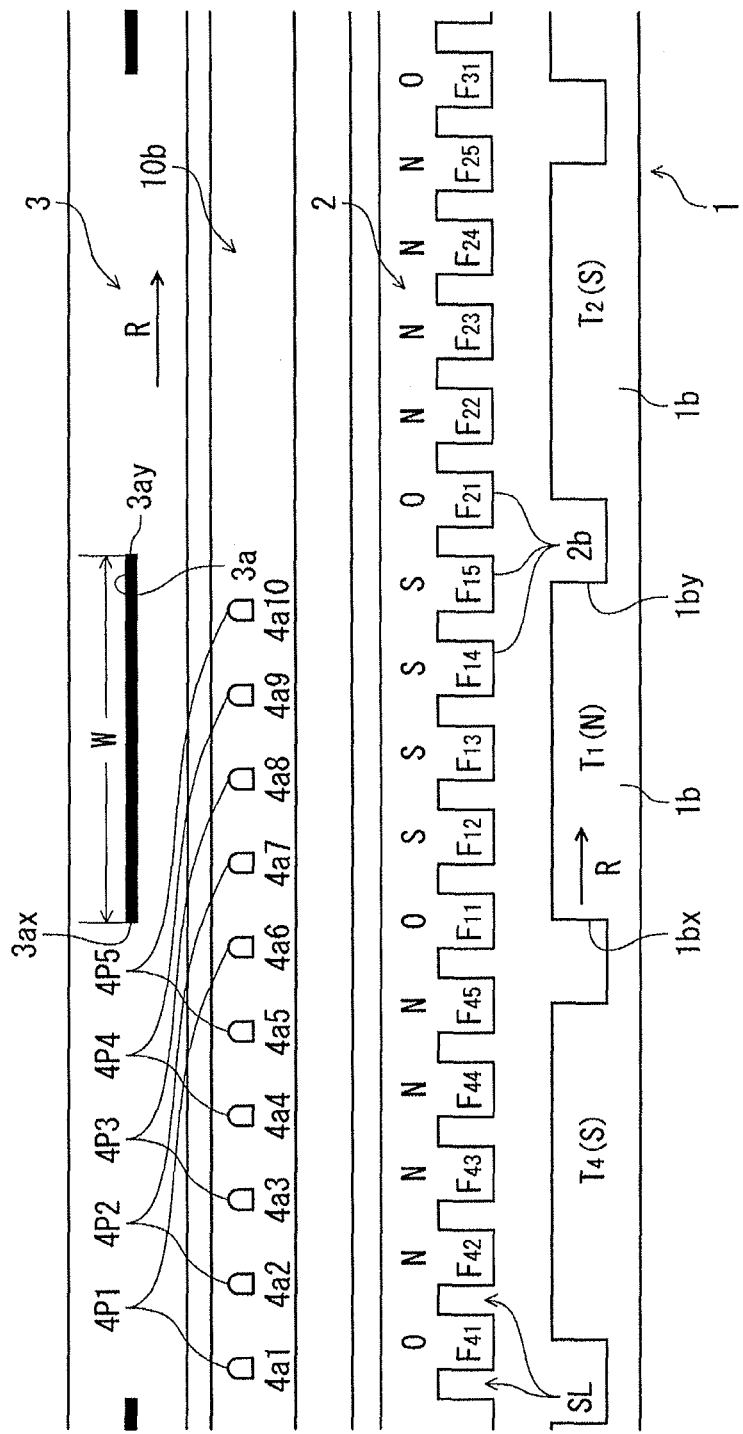
FIG. 13 is an illustrative diagram showing an example of a case where a motor main body set such that n is 2, k is 5, m is 1, and P is 1 is rotated in a direction of arrow R.
Figure 14:
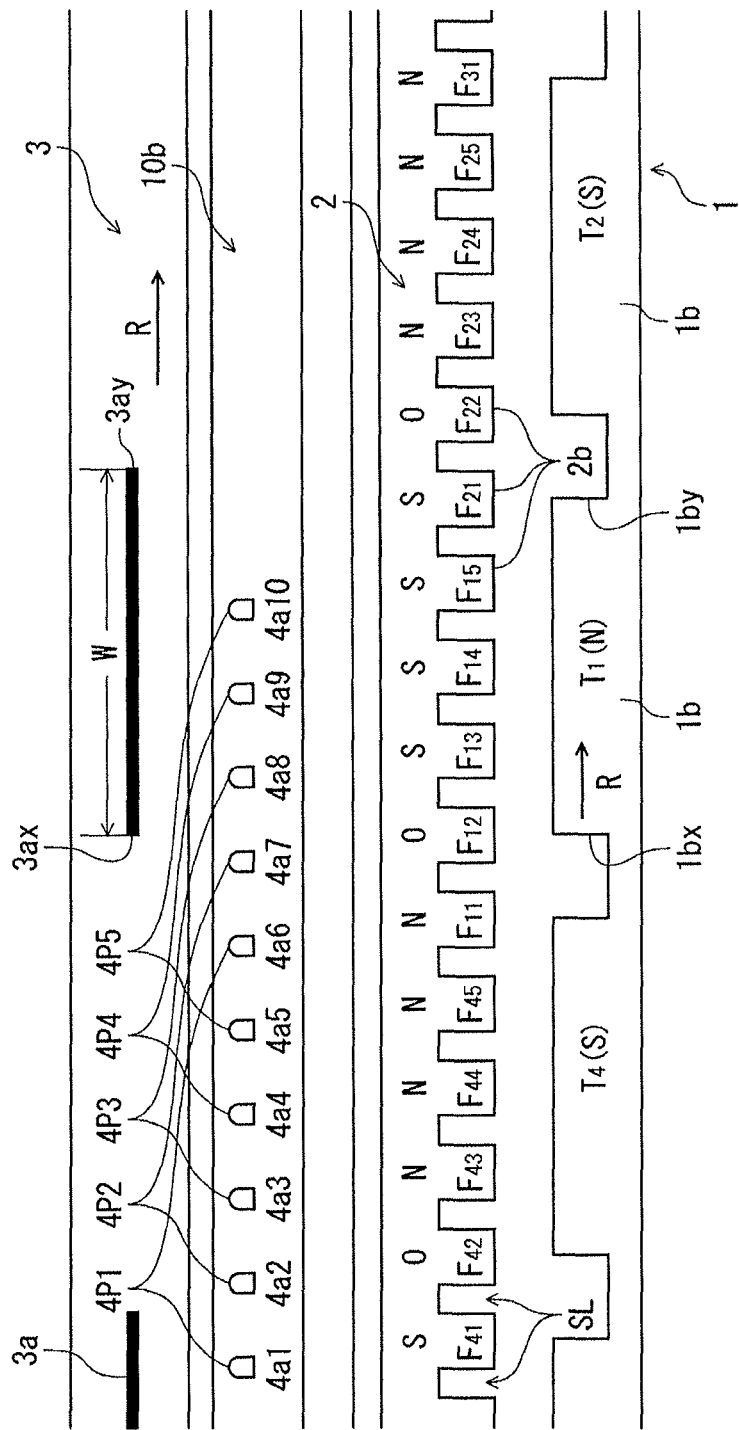
FIG. 14 is an illustrative diagram showing an example of a case where a motor main body set such that n is 2, k is 5, m is 1, and P is 1 is rotated in a direction of arrow R.

FIG. 13 and FIG. 14 are illustrative diagrams showing an example of a case of rotating a motor main body where n is set to 2, K is set to 5, m is set to 1, and P is set to 1 in a direction of arrow R. In FIG. 13 and FIG. 14, L0 is set to (K−m)*(L1+L2), namely, 4*(L1+L2), and W is set to [L0+L2+(m−p)*(L1+L2)], namely, [4*(L1+L2)+(L2)].

In this connection, in this example, the respective sensors 4 are arranged at corresponding positions of the stator 2, and the section to be detected 3a is arranged such that a trailing end 3ax thereof in the rotation direction is located at a position corresponding to the trailing end 1bx of the rotation salient pole 1b in the rotation direction and the leading end 3ay thereof in the rotation direction is located at a position advanced from the leading end 1by of the rotation salient pole in the rotation direction by only a distance corresponding to L2. Therefore, magnetic fields in the same direction can be caused to occur in the respective fixed salient poles 2b to which the rotation salient poles 1b are opposed, and the respective fixed salient poles 2b advanced from the fixed salient poles 2b through which the leading ends 1by of the rotation salient poles in the rotation direction have passed by one. Further, the respective fixed salient poles 2b to which the respective trailing ends 1by of the rotation salient poles in the rotation direction are opposed can be put in magnetization suspension.

In FIG. 13, since the sensor pair 4p1 does not detect the section to be detected 3a, the fixed salient poles (F11, F21, F31, F41) corresponding to the sensor pair 4p1 falls into magnetization suspension. Further, since the sensor pairs 4p2, 4p3, 4p4, and 4p5 detect the section to be detected 3a to output a PWM control signal to the B terminal, magnetic fields in the (S) direction occur in corresponding fixed salient poles (F12, F12, F14, F15, F32, . . . F35) 2b, and magnetic fields in the (N) direction occurs in the fixed salient poles (F22 . . . F25, F42 . . . F45) 2b excited by the field winding set where starting ends and terminating ends are connected in parallel in a reverse direction.

On one hand, since the rotation salient poles (T1, T3) 1b are always magnetized to N pole and the rotation salient poles (T2, T4) 1b are always magnetized to S pole, the rotation salient poles (T1, T3) 1b and the rotation salient poles (T2, T4) 1b are attracted in the direction of arrow R.

FIG. 14 is a diagram showing a state where the cylindrical body 3 and the rotor 1 shown in FIG. 13 have been moved in the direction of arrow R by a distance (L1+L2).

In FIG. 14, since the sensor pair 4p1 detects the section to be detected 3a and outputs a PWM control signal to the A terminal, magnetic fields in the (N) direction occur in corresponding fixed salient poles (F11, F31), and magnetic fields in the (S) direction occur in the fixed salient poles (F21, F41) excited by the field winding set where starting ends and terminating ends are connected in parallel in a reverse direction. Since the sensor pair 4p2 does not detect the section to be detected 3a, corresponding fixed salient poles (F12, F22, F32, F42) falls into magnetization suspension. Further, since the sensor pairs 4p3, 4p4, and 4p5 detect the section to be detected 3a and output PWM control signal to the B terminal, magnetic fields in the (S) direction occur in corresponding fixed salient poles (F13, F14, F15, F32, . . . F35) 2b, and magnetic fields in the (N) direction occur in the fixed salient poles (F23 . . . F25, F43 . . . F45) 2b excited by the field winding set where starting ends and terminating ends are connected in parallel in a reverse direction.

Further, since the rotation salient poles (T1, T3) 1b are always magnetized to N pole and the rotation salient poles (T2, T4) 1b are always magnetized to S pole, the rotation salient poles (T1, T3) 1b and the rotation salient poles (T2, T4) 1b are attracted in the direction of arrow R like the case shown in FIG. 10. The cylindrical body 3 and the rotor 1 are rotationally moved in the direction of arrow R by repeating similar operation.

Figure 15:
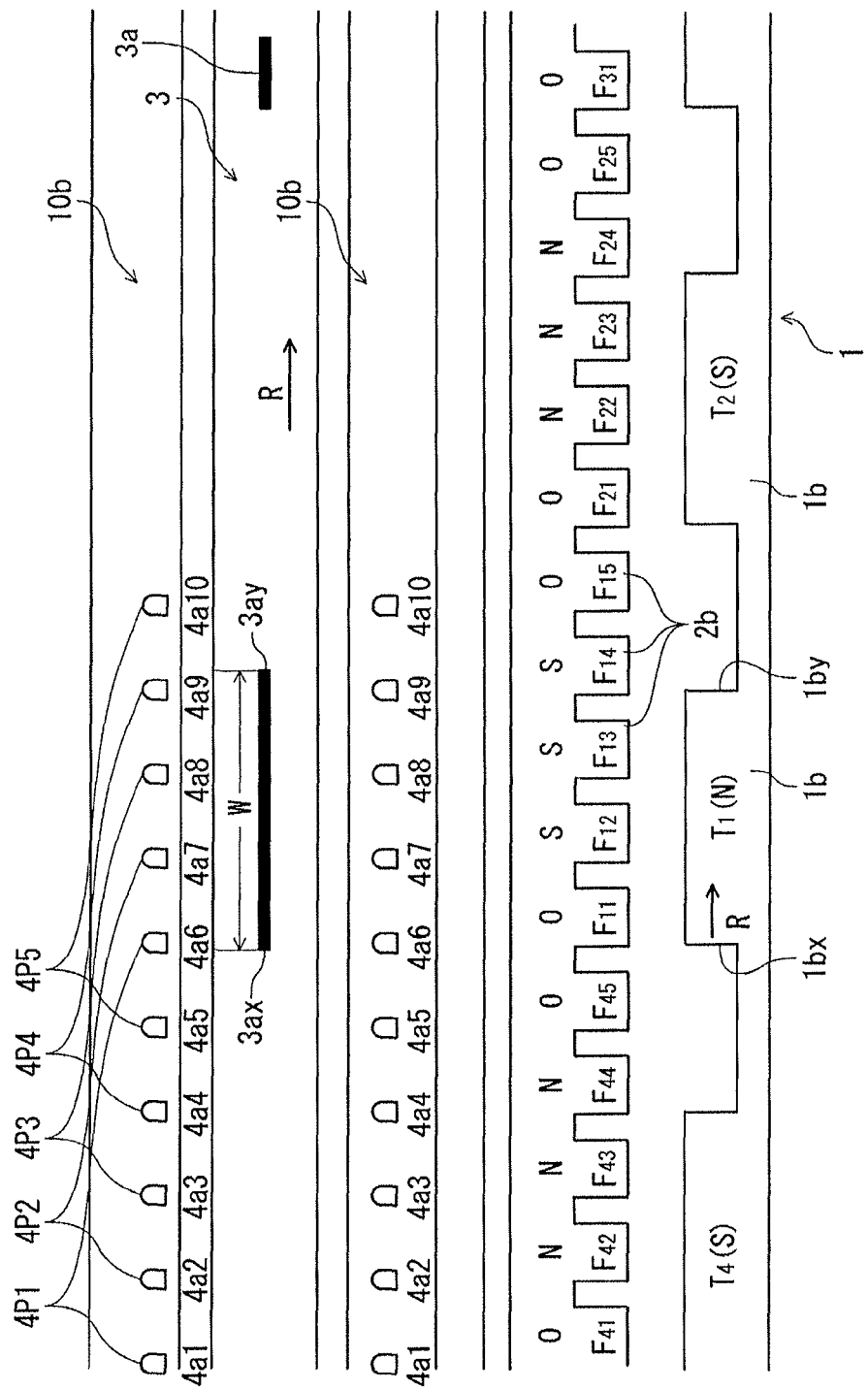
FIG. 15 is an illustrative diagram showing an example of a case where a motor main body set such that n is 2, k is 5, m is 2, and P is 2 is rotated in a direction of arrow R.
Figure 16:
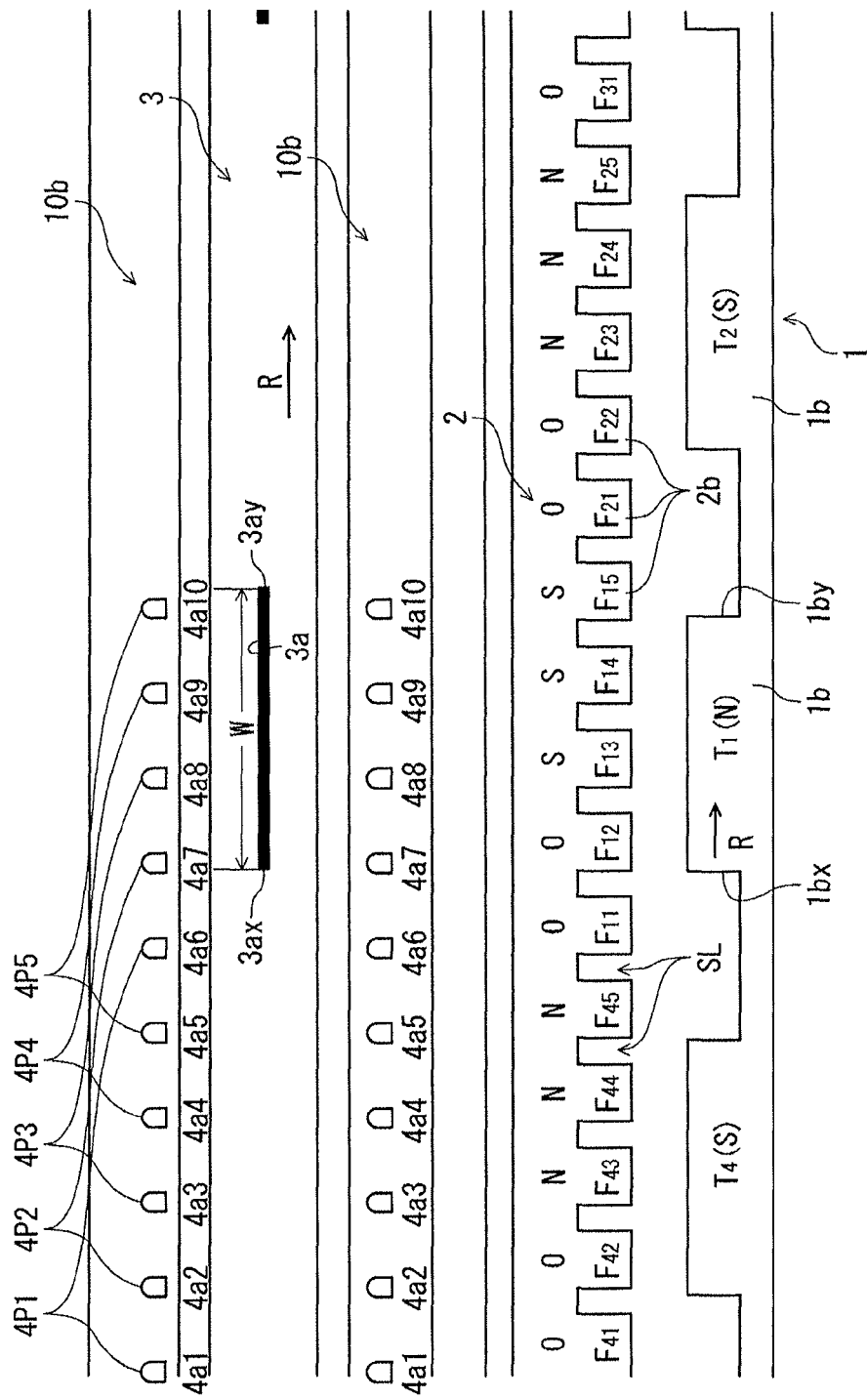
FIG. 16 is an illustrative diagram showing an example of a case where a motor main body set such that n is 2, k is 5, m is 2, and P is 2 is rotated in a direction of arrow R.

FIG. 15 and FIG. 16 are illustrative views showing an example of a case of rotating a motor main body where n is set to 2, K is set to 5, m is set to 2, and p is set to 2 in the direction of arrow R.

In FIG. 15 and FIG. 16, L0 is set to (K−m)*(L1+L2), namely, 3*(L1+L2), and W is set to [L0+L2+(m−p)*(L1+L2)], namely, [3*(L1+L2)+L2].

Also in this example, the respective sensors 4 are arranged at corresponding positons of the stator 2, and the section to be detected 3a is arranged such that the trailing end 3bx thereof in the rotation direction is located at a position corresponding to the trailing end 1*bx* of the rotation salient pole in the rotation direction and the leading end 3*by* thereof in the rotation direction is located at a corresponding position advanced from the leading end 1*by* of the rotation salient pole in the rotation direction by a distance corresponding to L2. Therefore, in this example, magnetic fields in the same direction occur in the respective fixed salient poles 2*b* advanced from the fixed salient poles 2*b* through which the leading ends 1*by* of the rotation salient poles in the rotation direction have passed by one, and the respective fixed salient poles 2*b* to which the trailing ends 1*bx* of the rotation salient poles in the rotation direction are opposed can be put in magnetization suspension.

In FIG. 15, since the sensor pairs 4*p*1 and 4*p*5 do not detect the section to be detected 3*a*, corresponding fixed salient poles (F11, F21, F31, F41, F15, F25, F35, F45) fall into magnetization suspension.

Further, since sensor pairs 4*p*2, 4*p*3, and 4*p*4 detect the section to be detected 3*a* and output a PWM control signal to the B terminal, magnetic fields in the (S) direction occur in corresponding fixed salient poles (F12, F13, F14, F32, . . . F34), and magnetic fields in the (N) direction occur in the fixed salient poles (F22 . . . F24, F42 . . . F44) excited by the field winding set where starting ends and terminating ends are connected in parallel in a reverse direction.

On one hand, since the rotation salient poles (T1, T3) 1*b* are always magnetized to N pole and the rotation salient poles (T2, T4) 1*b* are always magnetized to S pole, the rotation salient poles (T1, T3) 1*b* and the rotation salient poles (T2, T4) 1*b* are attracted in the direction of arrow R.

FIG. 16 is a diagram showing a state where the cylindrical body 3 and the rotor 1 shown in FIG. 15 have been moved in the direction of arrow R by a distance (L1+L2).

In FIG. 16, since the sensor pairs 4*p*1 and 4*p*2 do not detect the section to be detected 3*a*, corresponding fixed salient poles (F11, F21, F31, F41, F12, F22, F32, F42) fall into magnetization suspension.

Further, since the sensor pairs 4*p*3, 4*p*4, and 4*p*5 detect the section to be detected 3*a* and output a PWM control signal to the B terminal, magnetic fields in the (S) direction occur in corresponding fixed salient poles (F13, F14, F15, F33, . . . F35), and magnetic fields in the (N) direction occur in the fixed salient poles (F23 . . . F25, F43 . . . F45) excited by the field winding set where starting ends and terminating ends are connected in parallel in a reverse direction.

On one hand, since the rotation salient poles (T1, T3) 1*b* are always magnetized to N pole and the rotation salient poles (T2, T4) 1*b* are always magnetized to S pole, the rotation salient poles (T1, T3) 1*b* and the rotation salient poles (T2, T4) 1*b* are attracted in the direction of arrow R.

As described above, in the magnetic induction fixed magnetic pole rotor motor of this embodiment, since each rotation salient pole is opposed to a plurality of fixed salient poles and magnetic fields in the same direction occur in these fixed salient poles, while each rotation salient pole sequentially moves according to rotation of the rotor, the respective rotation salient poles are always magnetized to the same magnetic pole regardless of their rotation positons. Further, since the fixed salient pole to which the trailing end of each rotation salient pole in the rotation direction is opposed falls into magnetization suspension, and even if the leading end of each rotation salient pole in the rotation direction has passed through the leading end of the fixed salient pole, magnetic fields in the same direction occur in the fixed salient poles advanced from the fixed salient pole, so that attraction force in the rotation direction always acts on the respective rotation salient poles and a high torque at a low torque ripple can be obtained. Further, the rotation salient poles 1*b* and the fixed salient poles 2*b* are even in number and they are arranged symmetrically regarding the rotation shaft 1*a*, and the respective rotation salient poles are always magnetized to the same magnetic pole, while they are subjected to attraction forces from the respective fixed salient poles 2*b* opposed thereto regardless of the rotation positions of the respective rotation salient poles, so that rotation fluctuation, noises, and vibrations are suppressed.

The magnetic induction fixed magnetic pole rotor motor of this embodiment does not have functions of control for performing reverse rotation and regeneration control, but it can be utilized in a motor for a power-assisted two-wheeled vehicle, a power-assisted bicycle, or an air conditioner, a fan, a disk drive or the like which is not required to have a retreating function.

Second Embodiment

A magnetic induction fixed magnetic pole rotor motor of a second embodiment has a switching section for performing switching in a control section inputted with a PWM control signal outputted from sensor pairs and switching of a rotation direction of the rotor can be freely performed by the switching section, which is different from the magnetic induction fixed magnetic pole rotor motor of the first embodiment. However, the motor main body and the detection section, the power-feeding control section to the field winding sets, and the function in the case where the magnetic induction fixed magnetic pole rotor motor main body is rotated in a forward direction are equal to those of the magnetic induction fixed magnetic pole rotor motor of the first embodiment. Therefore, repetitive explanation is omitted, and different points will be described below.

Figure 17:
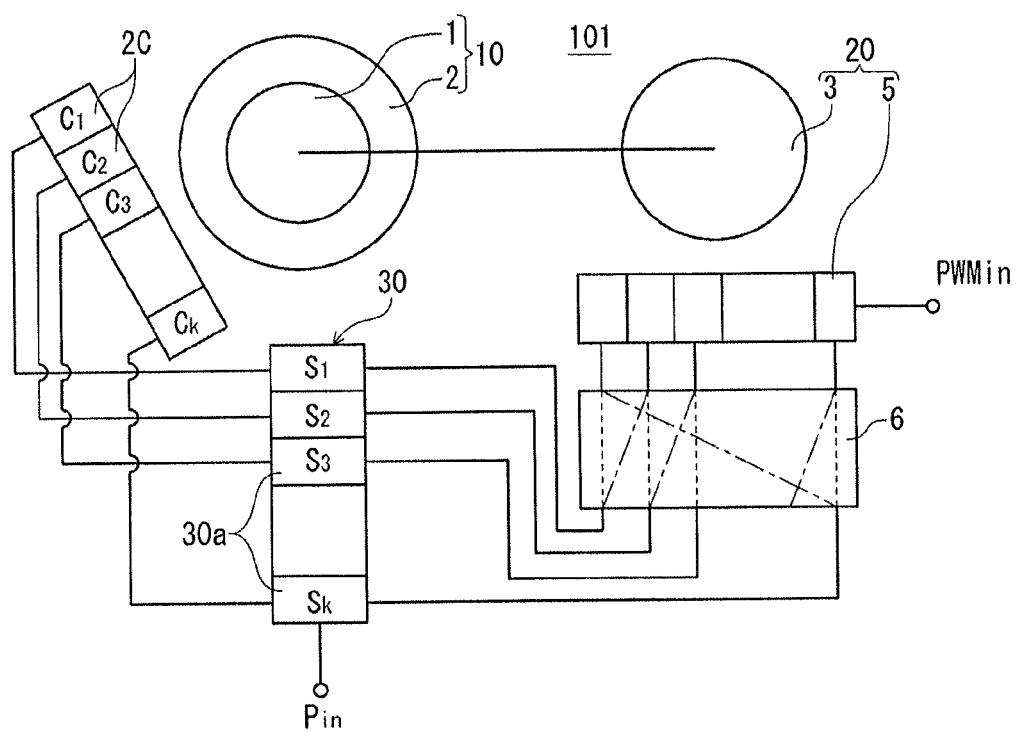
FIG. 17 is a diagram showing a magnetic induction fixed magnetic pole rotor motor of a second embodiment.

FIG. 17 is a diagram showing a magnetic induction fixed magnetic pole rotor motor of a second embodiment.

A magnetic induction fixed magnetic pole rotor motor 101 shown in FIG. 17 has a motor main body 10 having a rotor 1 and a stator 2, a detection section 20 provided with a cylindrical body 3 having sections to be detected 3*a* arranged in a circumferential direction of a side face thereof, K sensor pairs 4*p* (not shown) arranged so as to be opposed to the sections to be detected 3*a* on a circumference of the side face of the cylindrical body 3, and K control signal output sections 5 for generating control signals based upon detection signals outputted from the sensor pairs 4*p*, a control section 30 having K switching circuits (S1, S2 . . . Sk) 30*a*, and a switching section 6 for switching a rotation direction of the rotor between a forward direction and a reverse direction.

The rotor 1 has 2n rotation salient poles, while the stator 2 has 2nK fixed salient poles. Respective fixed salient poles are magnetized to N pole or S pole in response to directions of excitation currents fed to K sets of field winding sets (C1, C2, . . . Ck) 2*c*.

The sensor pairs 4*p* are obtained by combining, by twos, 2K sensors 4 arranged at non-contacting positions opposed to a track in a circumferential direction of a side face of the cylindrical body 3 so as to be caused to correspond to adjacent 2K fixed salient poles, and when the sensor pairs 4*p* detect the section to be detected 3*a*, they output detections signals to the X terminals or the Y terminals. In this connection, as the sensor 4, either one of the light sensor 4*a* or the coil sensor 4*c* explained in the first embodiment with reference to FIG. 6 to FIG. 10 is used.

Here, as the sections to be detected 3a of this embodiment, ones formed on the side face of the cylindrical body 3 are used, but the sections to be detected 3a may be ones formed on a flat face of the disk 18.

The control signal output section 5 is provided with the A terminal and the B terminal, and it outputs a PWM control signal from either one of the A and B terminals in response to a detection signal outputted from the sensor pair 4p when a PWM signal pulse-modulated is inputted into the control signal output section 5 from an input terminal PWMin.

The control circuit 30a is configured such that a switching element is operated to ON or OFF according to a PWM control signal inputted from the control signal output section 5 to control a direction and an intensity (a current flow time) of an excitation current fed from a direct-current power source Pin to each field winding set 2c thereby magnetizing each fixed salient pole to N pole or S pole.

The switching section 6 has a plurality of switching contacts, and it switches an input destination of a PWM control signal outputted from the A terminal or the B terminal of the control signal output section 5 from a control circuit 30a for forward rotation to a control circuit 30a for reverse rotation or from the control circuit 30a for reverse rotation to the control circuit 30a for forward rotation.

Here, the switching section 6 of this embodiment is constituted of a relay having a number of contacts, but it is not required to be constituted of the relay necessarily, and it may be constituted of an electronic circuit formed on an IC chip or a microcomputer, for example.

Figure 18:
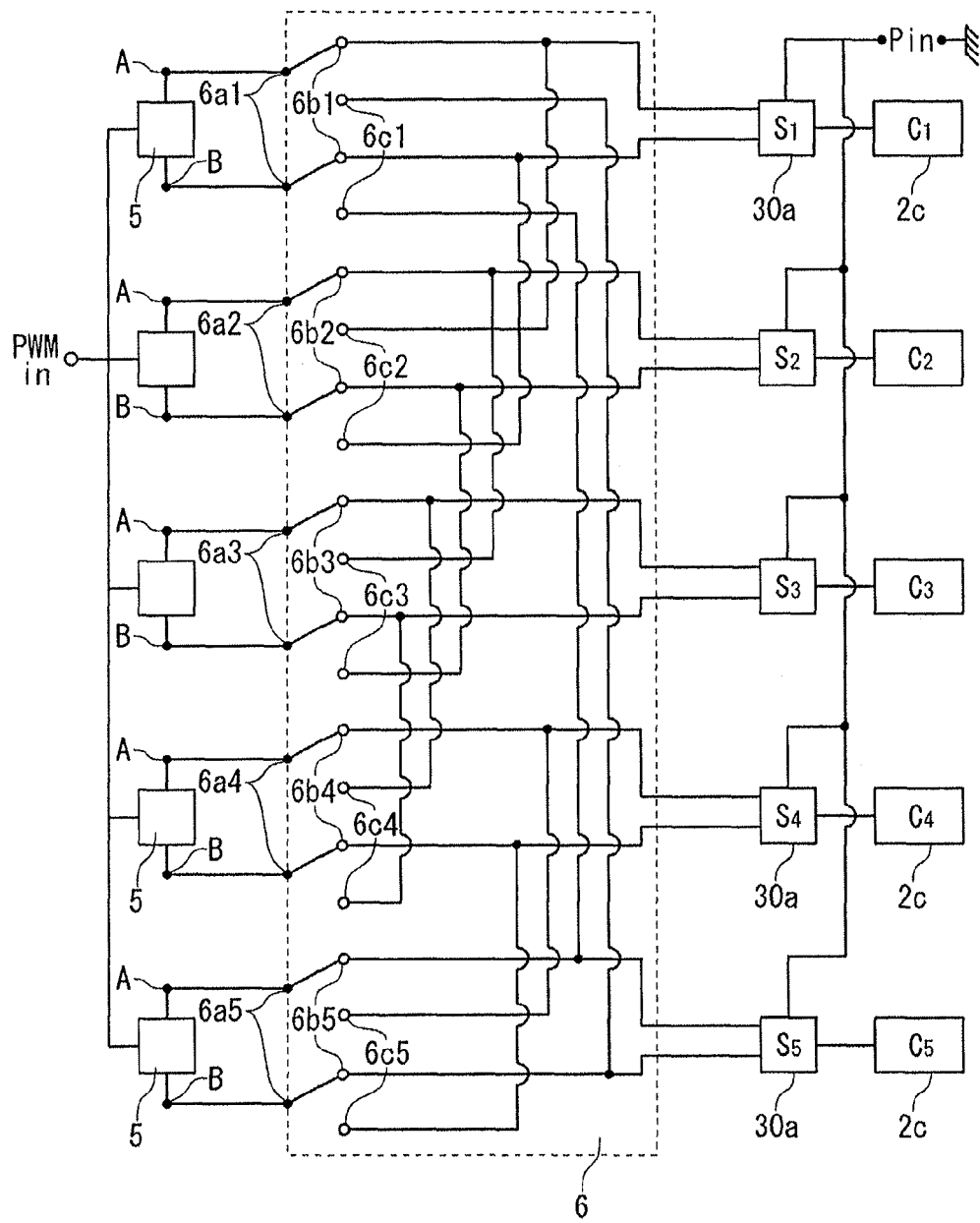
FIG. 18 is a diagram showing one example of a switching portion applied to a case where excitation currents of field winding sets are controlled by five sensor pairs.

FIG. 18 is a diagram showing one example of a switching section applied when excitation currents of field winding sets are controlled by five sensor pairs.

In FIG. 18, the switching section 6 is provided with 5 sets of input terminals (6a1, 6a2, . . . 6a5) and 10 sets of switching contacts (6b1, 6c1, 6b2, 6c2 . . . 6b5, 6c5) which perform switching of output destinations of PWM control signals inputted from the respective input terminals (6a1, 6a2, . . . 6a5) to ones of twos all together.

One switching contact (6b1) of a set of switching contacts (6b1, 6c1) is connected to a control circuit (S1) 30, while the other switching contact (6c1) is connected to a control circuit (S5) 30. In that case, since a PWM control signal for controlling an excitation current of field windings identical in winding start or winding termination is inputted into the power-feeding control circuit (S5) 30 for controlling an excitation current of field windings originally different in winding start or winding termination, the A terminal and the B terminal is reversed on the wiring by the other switching contact (6c1).

Further, one switching contact (6b2) of a set of switching contacts (6b2, 6c2) is connected to a control circuit (S2) 30, while the other contact (6c2) is connected to a control circuit (S1) 30.

In the following, similarly, one switching contact (6b5) of a set of switching contacts (6b5, 6c5) is connected to the control circuit (S5) 30, while the other switching contact (6c5) is connected to a control circuit (S4) 30.

When the switching section 6 receives a command for forward rotation, switching to one switching contacts (6b1, 6b2, . . . 6b5) side in unison is performed in the switching section 6, and when the switching section 6 receives a command for reverse rotation, switching to the other switching contacts (6c1, 6c2, . . . 6c5) side in unison is performed in the switcher switch 6.

As a result, the power-feeding control circuits (S1, S2, S3, S4, S5) 30a which are input destinations of respective PWM control signals outputted from the A terminals or B terminals of the control signal output sections 5 are switched in unison, so that distribution states of appearing and disappearing magnetic fields in the respective fixed salient poles 2b become the same as the case where distribution states at forward rotation are moved in a reverse rotation direction one by one as they are.

That is, a distribution state of a magnetic field similar to a distribution state of a magnetic field appearing and disappearing in a forward rotation direction in the fixed salient poles 2b to which the respective rotation salient poles 1b are opposed and the fixed salient poles 2b advanced, by one, from the fixed salient poles 2b through which the respective leading ends 1by of the rotation salient poles in a forward rotation direction have passed becomes a distribution state of a magnetic field appearing and disappearing in a reverse rotation direction as it is, so that the respective rotation salient poles 1b are attracted in the reverse rotation direction (in the direction of arrow L) to be rotated in a reverse direction.

Here, an example of the switching section 6 for switching input destinations of 5 sets of power-feeding control circuits 30a inputted with PWM control signals outputted from the respective 5 control signal output sections 5 to the power-feeding control circuits 30a which are original input destinations of rotation signals outputted from the sensor pairs 5 advanced in the L direction by ones from the original input destinations in the R direction in response to a command for switching the rotation of the motor main body 10 from the R direction to the L direction is shown, but the switching section 6 is not limited to this example necessarily, and the switching section 6 can be similarly applied to a case having three or more control signal output sections 5 and three or more sets of control circuits 30a.

Figure 19:
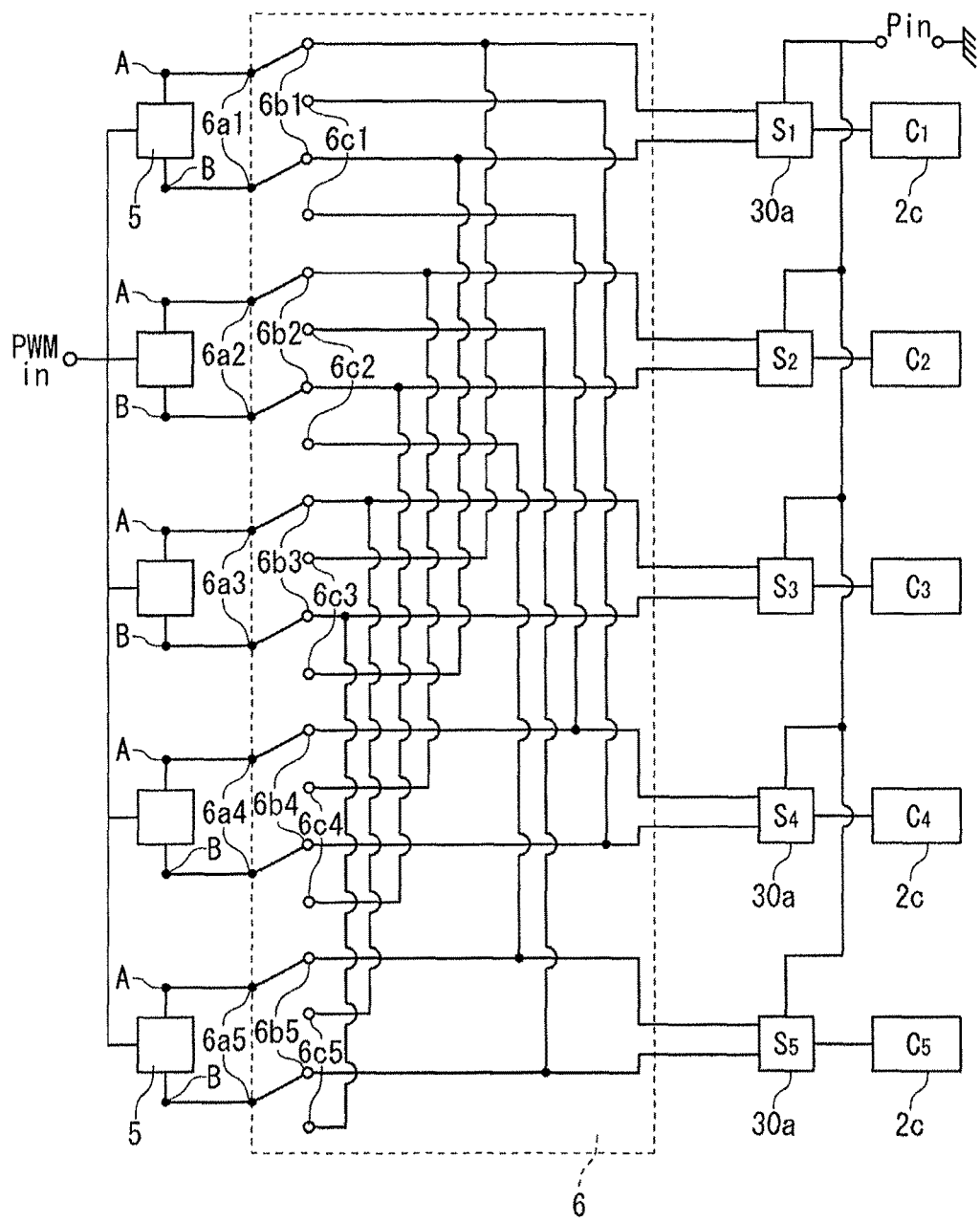
FIG. 19 is a diagram showing another example of a switching portion applied to a case where excitation currents of field winding sets are controlled by five sensor pairs.

FIG. 19 is a diagram showing another example of a switching section applied when excitation currents of field winding sets are controlled by five sensor pairs.

In FIG. 19, a switching section 6 is provided with 5 sets of input terminals (6a1, 6a2, . . . 6a5) and 10 sets of switching contacts (6b1, 6c1, 6b2, 6c2 . . . 6b5, 6c5) which perform switching of output destinations of PWM control signals inputted from the respective input terminals (6a1, 6a2, . . . 6a5) to ones of twos all together like the switching section shown in FIG. 18, where a switching contact (6b1) of a set of switching contacts (6b1, 6c1) and a switching contact (6b2) of a set of switching contacts (6b2, 6c2) are connected to a control circuit (S1) 30 and a control circuit (S2) 30, respectively. On the other hand, a switching contact (6c1) and a switching contact (6c2) are connected to a control circuit (S4) 30 and a control circuit (S5) 30, respectively, but wirings are performed such that the A terminals and the B terminals are connected in a reverse manner. This is because PWM signals are inputted into the power-feeding control circuits (S4, S5) 30 for originally controlling excitation currents of field windings different in winding start or winding termination.

In the other sets, a switching contact (6b3) and a switching contact (6c3) of switching contacts (6b3, 6c3), a switching contact (6b4) and a switching contact (6c4) of switching contacts (6b4, 6c4), and a switching contact (6b5) and a switching contact (6c5) of switching contacts (6b5, 6c5) are connected to a control circuit (S3) 30 and the control circuit (S1) 30, a control circuit (S4) 30 and the control circuit (S2) 30, and the control circuit (S5) 30 and the control circuit (S3) 30, respectively.

In these cases, since PWM control signals are inputted into the power-feeding control circuits (S1, S2, S3) 30 for controlling excitation currents of field windings identical in winding start or winding terminal, the A terminals and the B terminals are not required to be connected in a reverse manner.

When the switching section 6 receives a command for forward rotation, switching to one switching contacts (6$b$1, 6$b$2, . . . 6$b$5) side in unison is performed in the switching section 6, and when the switching section 6 receives a command for reverse rotation, switching to the other switching contacts (6$c$1, 6$c$2, . . . 6$c$5) side in unison is performed in the switcher switch 6.

As a result, simultaneous switching of the power-feeding control circuits 30$a$ which are input destinations of the respective PWM control signals inputted from the control signal output sections 5 takes place, and distribution states of magnetic field appearing and disappearing in the respective fixed salient poles 2$b$ become the same as the case where distribution states at a forward rotation are moved in a reverse rotation direction by twos.

The directions of the magnetic fields become the same state as the state where they have been moved from the case of the forward rotation by twos.

That is, in the switching section 6 of this example, since an input destination of a PWM control signal is switched from the original input destination in the R direction to an input destination advanced by two in the L direction, distribution states of magnetic fields appearing and disappearing in the forward rotation direction in the fixed salient poles 2$b$ to which the respective rotation salient poles 1$b$ are opposed and the fixed salient poles 2$b$ advanced, by one or two, from the fixed salient poles through which the leading ends 1$by$ of the rotation salient poles in the forward rotation direction have passed can be shifted to distribution states of a magnetic fields appearing and disappearing in the reverse rotation direction as they are.

Figure 20:
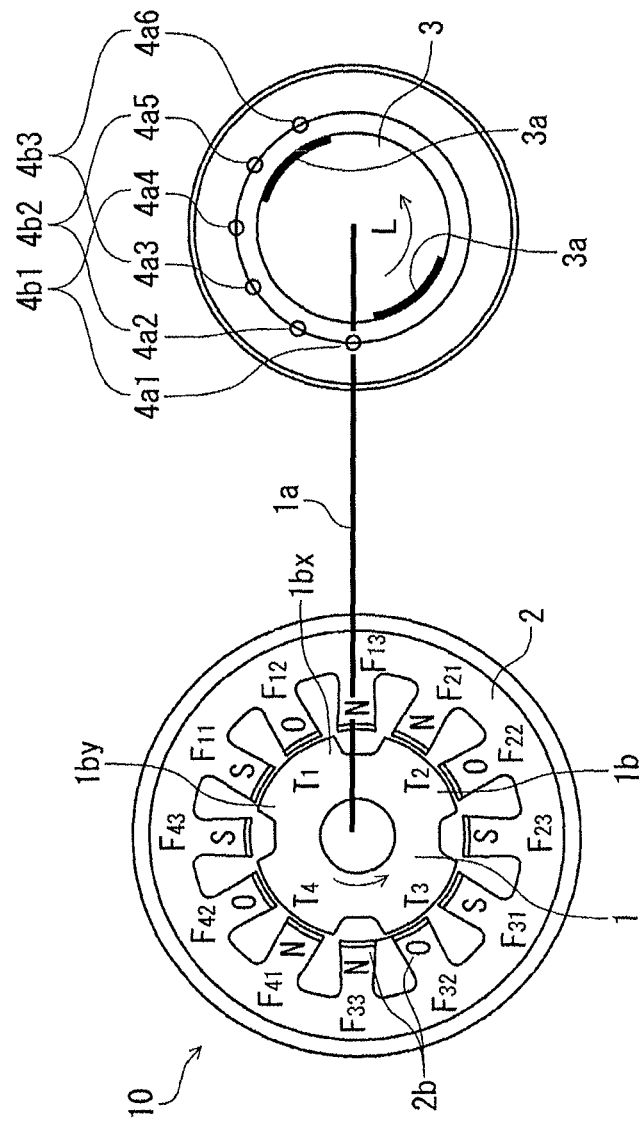
FIG. 20 is an illustrative view showing a case where the motor main body shown in FIG. 2 is rotated reversely.

FIG. 20 is an illustrative view showing a case where the motor main body shown in FIG. 2 is rotated in a reverse direction.

Here, since it is necessary to shift the distribution states of magnetic fields in the forward rotation in the reverse rotation direction by twos as they are, at most 3 sets of switching contacts are used in the switching section 6 shown in FIG. 19.

Therefore, when switching of the switching section 6 is performed in order to rotate the motor main body reversely, the switching contact (6$c$3), the switching contact (6$c$1), and the switching contact (6$c$2) are connected to the control circuit (S1) 30, the control circuit (S2) 30, and the control circuit (S3) 30, respectively, but the switching contacts (6$c$1, 6$c$2) are connected such that the A terminals and the B terminals are reversed. As a result, distribution states of magnetic fields appearing and disappearing in the respective fixed salient poles 2$b$ become equal to distribution states obtained by shifting the distribution states shown in FIG. 2 in the reverse direction (in the direction of arrow L) by two as they are.

Therefore, the rotation salient poles (T1, T3) 1$b$ magnetized to N pole are attracted in the direction of arrow L and the rotation salient poles (T2, T4) 1$b$ magnetized to S pole are also attracted in the direction of arrow L, so that the motor main body is rotated reversely.

Figure 21:
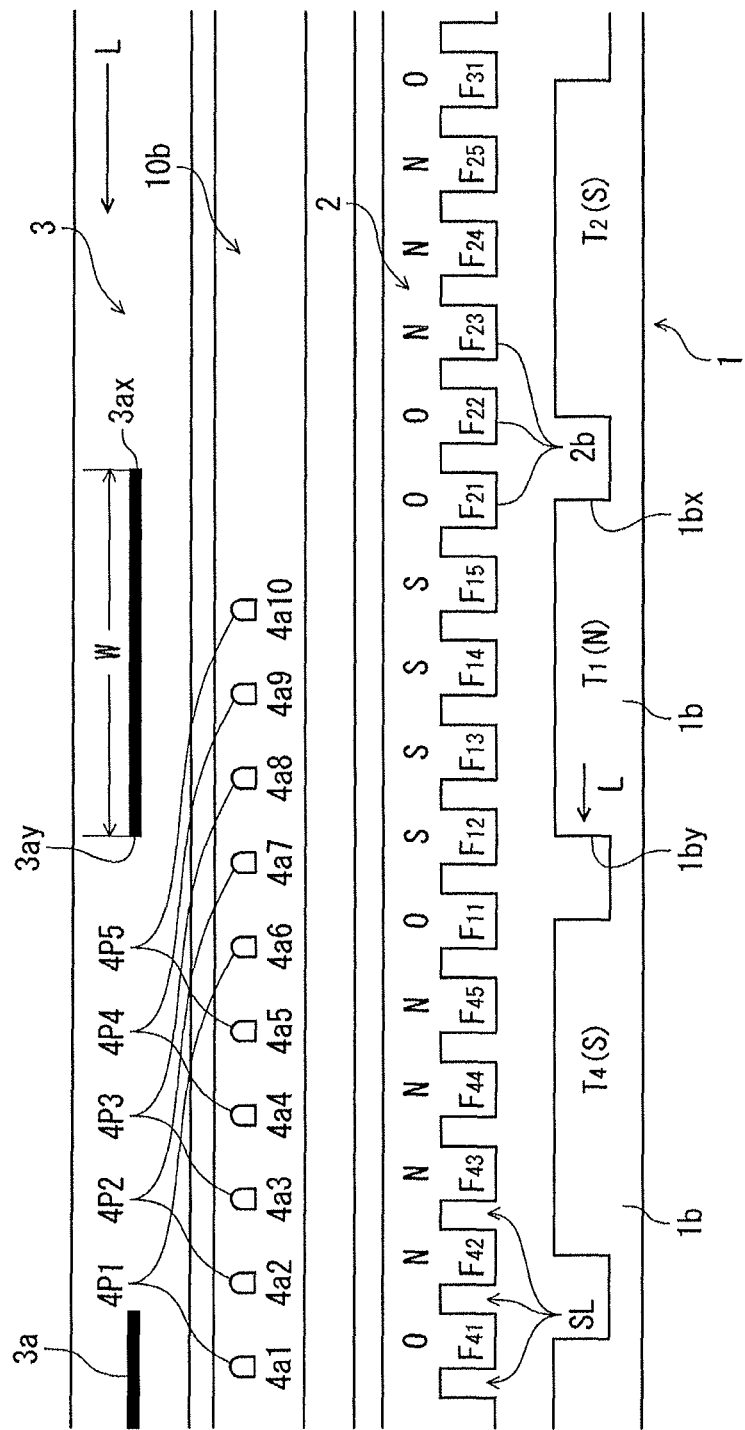
FIG. 21 is an illustrative view showing a case where the motor main body shown in FIG. 4 is rotated reversely in the first embodiment.
Figure 22:
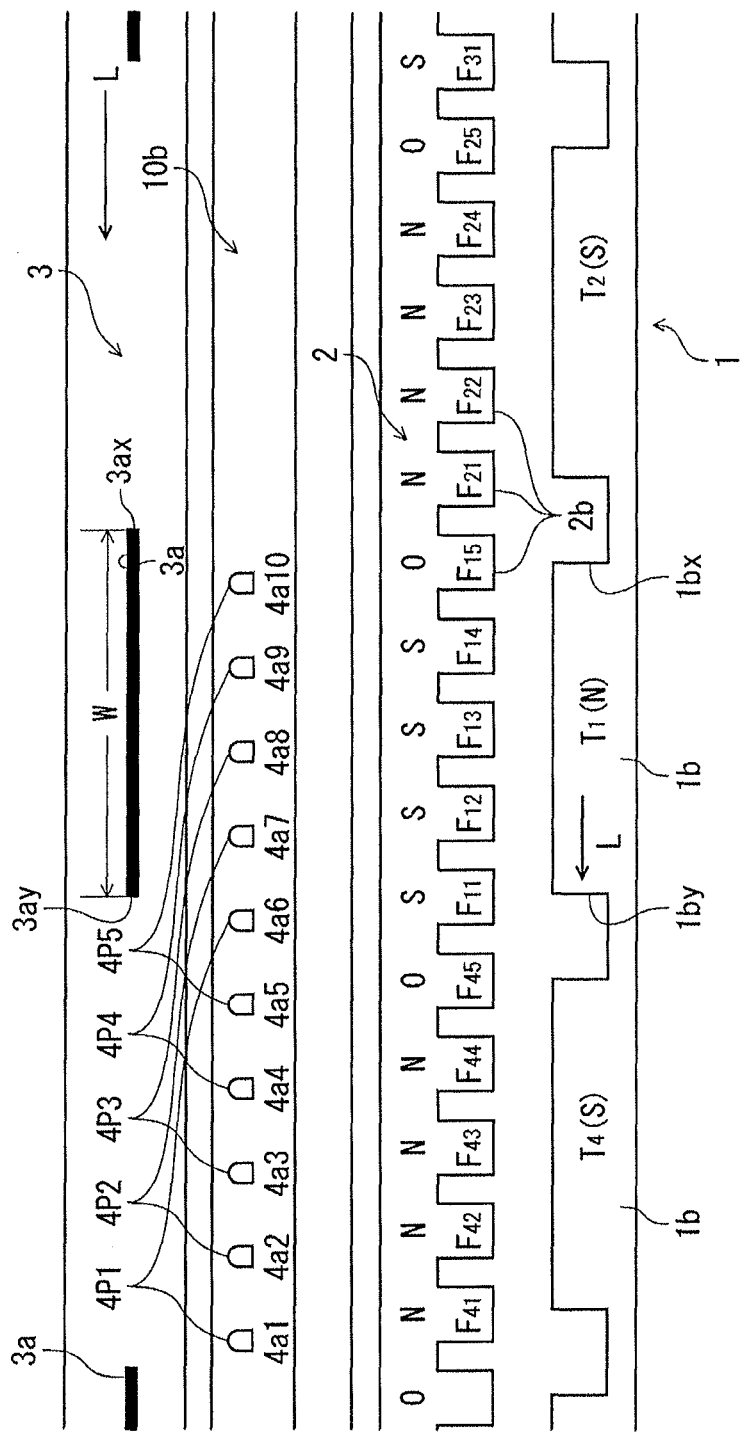
FIG. 22 is an illustrative view showing a case where the motor main body shown in FIG. 4 is rotated reversely in the first embodiment.

FIG. 21 and FIG. 22 are illustrative diagrams showing a case where the motor main body shown in FIG. 4 is rotated reversely in the first embodiment, FIG. 21 showing a state where switching of the switching section has been performed at the rotation position shown in FIG. 16 and FIG. 22 showing a state where movement has been made from the rotation position shown in FIG. 21 in the direction of arrow L by a distance corresponding to one (L1+L2) of the fixed salient poles.

Here, since it is necessary to shift a distribution state of a magnetic field in the forward rotation in the reverse rotation direction by one, the switching section 6 shown in FIG. 18 is used.

As shown in FIG. 21, the sensor pair 4$p$1 detects the section to be detected 3$a$ and the control signal output section 5 outputs a PWM control signal to the A terminal. Since the sensor pair 4$p$2 does not detect the section to be detected 3$a$, the control signal output section 5 does not output a PWM control signal. Since the sensor pairs 4$p$3, 4$p$4, and the 4$p$5 detect the section to be detected 3$a$, the control signal output sections 5 output PWM control signals to the B terminals.

Now, when switching of the switching section 6 is performed in order to rotate the motor main body reversely, the switching contact (6$c$1) performs reversing between the A terminal and the B terminal on the wiring to be connected to the control circuit (S5) 30, the switching contact (6$c$2) is connected to the control circuit (S1) 30, and the control contacts (6$c$3, . . . 6$c$5) are likewise connected to the control circuits (S2, . . . S4)30. Therefore, the PWM control signal is inputted into the control circuit 30$a$ advanced, by one in the reverse rotation direction, from the case of the forward rotation.

As a result, distribution states of magnetic fields appearing and disappearing in the respective fixed salient poles 2$b$ become equal to distribution states obtained by shifting the distribution states shown in FIG. 14 in the reverse direction (in the direction of arrow L) by one as they are.

Therefore, the rotation salient poles (T1, T3) 1$b$ magnetized to N pole are attracted in the direction of arrow L and the rotation salient poles (T2, T4) 1$b$ magnetized to S pole is also attracted to the direction of arrow L, so that the motor main body is rotated reversely.

FIG. 22 is a diagram showing a state where the cylindrical body 3 and the rotor 1 shown in FIG. 21 have been moved in the direction of arrow L by a distance corresponding to one (L1+L2) of the fixed salient poles.

As shown in FIG. 22, since the sensor pair 4$p$1 does not detect the section to be detected 3$a$, the control signal output section 5 does not output a PWM control signal but since the sensor pairs 4$p$2, 4$p$3, 4$p$4, and 4$p$5 detect the section to be detected 3$a$, the control signal output sections 5 output PWM control signals to the B terminals. Like FIG. 21, since the PWM control signals are inputted into the control circuits 30$a$ advanced in the reverse rotation direction by one from the case of the forward rotation, distribution states of magnetic fields appearing and disappearing in the respective fixed salient poles 2$b$ become equal to distribution states obtained by shifting the distribution states shown in FIG. 21 in the reverse direction (in the direction of arrow L) by a distance corresponding to one of the fixed salient poles as they are.

Therefore, the rotation salient poles (T1, T3) 1$b$ magnetized to N pole are attracted in the direction of arrow L and the rotation salient poles (T2, T4) 1$b$ magnetized to S pole are also attracted in the direction of arrow L so that the motor main body is rotated reversely.

Figure 23:
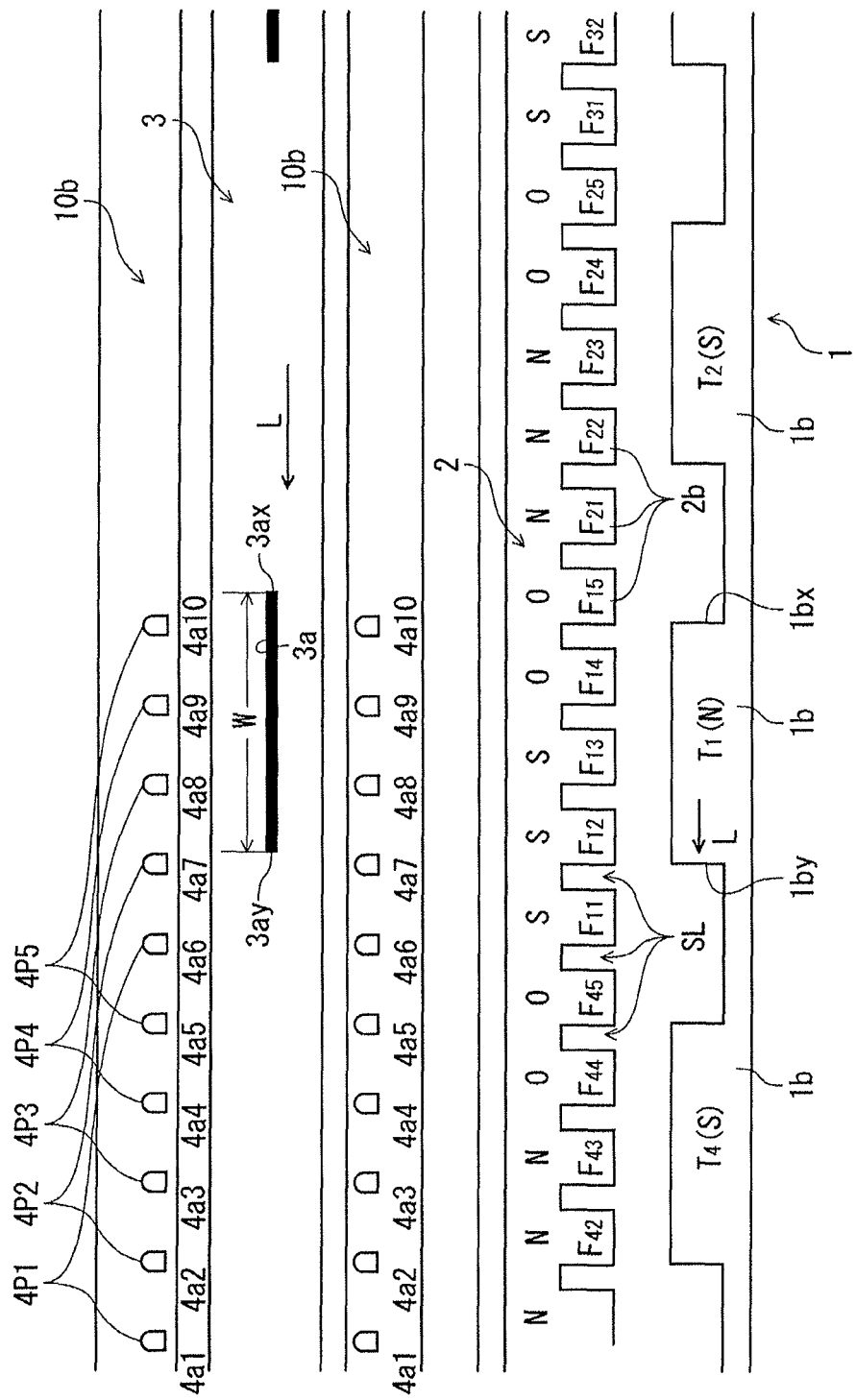
FIG. 23 is an illustrative view showing a case where the motor main body shown in FIG. 7 is rotated reversely in the first embodiment.
Figure 24:
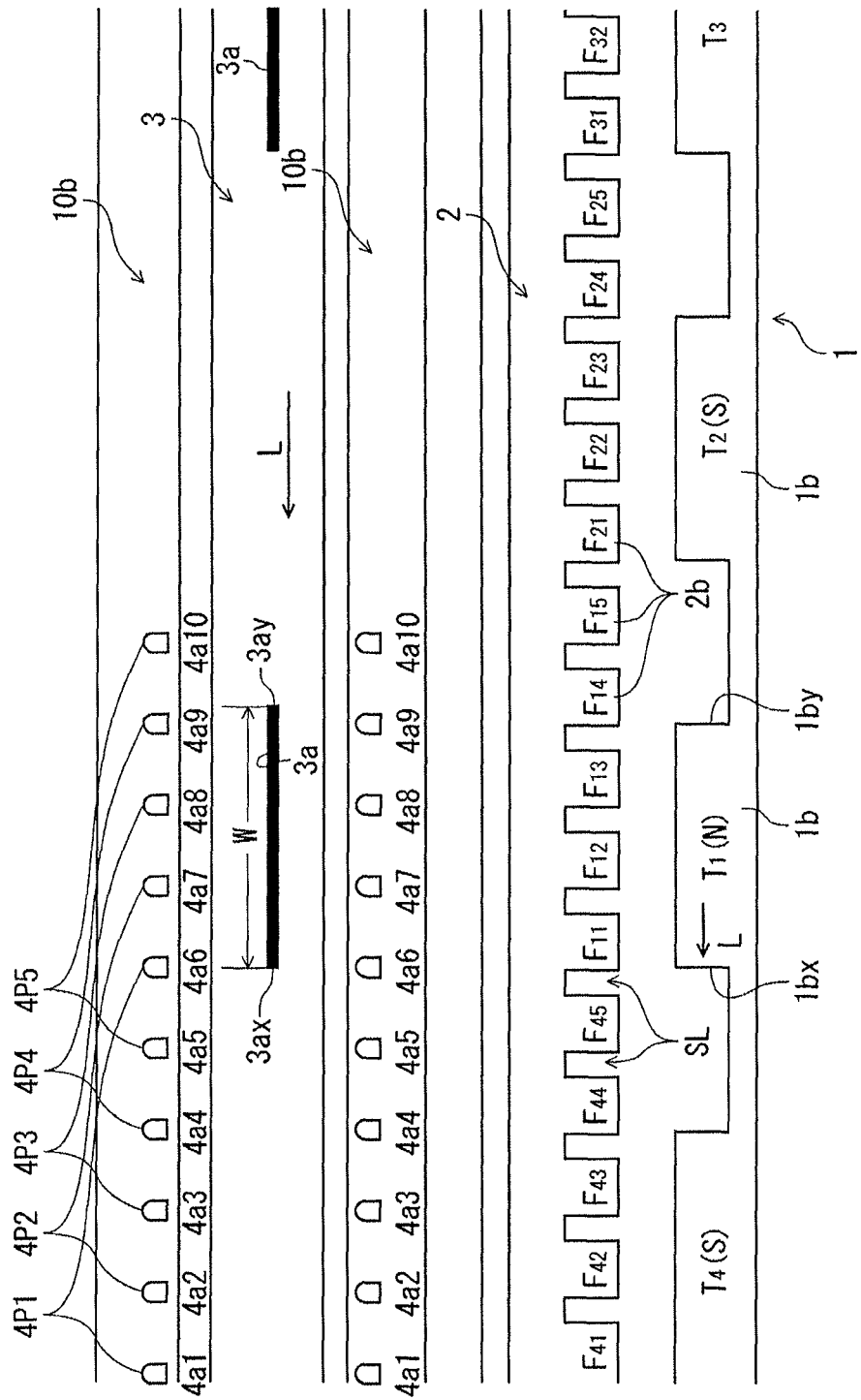
FIG. 24 is a diagram showing a state where movement corresponding to one (L1+L2) of fixed salient poles has been made from a rotation position shown in FIG. 23 in a direction of arrow L.

FIG. 23 and FIG. 24 are illustrative diagrams showing a case where the motor main body shown in FIG. 7 is rotated reversely in the first embodiment, FIG. 23 showing a state where switching of the switching section has been performed at the rotation position shown in FIG. 16 and FIG. 24 showing a state where movement has been made from the rotation position shown in FIG. 23 in the direction of arrow L by a distance corresponding to one (L1+L2) of the fixed salient poles.

Here, since it is necessary to shift a distribution state of a magnetic field in the forward rotation in the reverse rotation direction by two, the switching section 6 shown in FIG. 19 is used.

As shown in FIG. 23, since the sensor pairs 4p1 and 4p2 do not detect the section to be detected 3a, the control signal output sections 5 do not output PWM control signals, but since the sensor pairs 4p3, 4p4, and 4p5 detects the section to be detected 3a, the control signal output sections 5 output PWM control signals to the B terminals.

Now, when switching of the switching section 6 is performed in order to rotate the motor main body reversely, the switching contacts (6c1, 6c2) reverse the A terminals and the B terminals on the wirings to be connected to the control circuit (S4) 30 and the control circuit (S5) 30, respectively, and the switching contacts (6c3, . . . 6c5) are connected to the control circuit (S1, . . . S3) 30, respectively. Therefore, PWM control signals are inputted to the control circuits 30a advanced by two in the rotation direction from the case of the forward rotation.

As a result, distribution states of magnetic fields appearing and disappearing in the respective fixed salient poles 2b become equal to distribution states obtained by shifting the distribution states shown in FIG. 16 in the reverse direction (in the direction of arrow L) by twos as they are.

Therefore, the rotation salient poles (T1, T3) 1b magnetized to N pole are attracted in the direction of arrow L and the rotation salient poles (T2, T4) 1b magnetized to S pole are also attracted in the direction of arrow L so that the motor main body is rotated reversely.

FIG. 24 is a diagram showing a state where the cylindrical body 3 and the rotor 1 shown in FIG. 23 have been moved in the direction of arrow L by a distance corresponding to (L1+L2).

As shown in FIG. 24, since the sensor pairs 4p1 and 4p5 do not detect the section to be detected 3a, the control signal output sections 5 do not output PWM control signals, but since the sensor pairs 4p2, 4p3, and 4p4 detects the section to be detected 3a, the control signal output sections 5 output PWM control signals to the B terminals. Like FIG. 23, since the PWM signals are inputted into the control circuits 30a advanced in the reverse rotation direction by two from the case of the forward rotation, distribution states of magnetic fields appearing and disappearing in the respective fixed salient poles 2b become equal to distribution states obtained by shifting the distribution states shown in FIG. 23 in the reverse direction (in the direction of arrow L) by a distance corresponding to one of the fixed salient poles as they are.

Therefore, the rotation salient poles (T1, T3) 1b magnetized to N pole are attracted in the direction of arrow L and the rotation salient poles (T2, T4) 1b magnetized to S pole are also attracted in the direction of arrow L so that the motor main body is rotated reversely.

As described above, in the magnetic induction fixed magnetic pole rotor motor of this embodiment, since each rotation salient pole is opposed to a plurality of fixed salient poles and magnetic fields in the same direction occur in these fixed salient poles, while the respective rotation salient poles sequentially moves according to rotation of the rotator, the respective rotation salient poles are always magnetized to the same magnetic pole regardless of their rotation positions. Further, since the fixed salient pole to which the trailing end of each rotation salient pole in the rotation direction is opposed falls into magnetization suspension, and even if the leading ends of the respective rotation salient poles in the rotation direction have passed through the leading ends of the fixed salient poles, magnetic fields in the same direction occur the fixed salient poles advanced from the fixed salient poles, so that attraction force in the rotation direction always acts on the respective rotation salient poles and a high torque at a low torque ripple can be obtained. Further, the rotation salient poles 2b and the fixed salient poles 1b are even in number and they are arranged symmetrically regarding the rotation shaft 1a, and the respective rotation salient poles are always magnetized to the same magnetic pole, while they are subjected to attraction forces from the respective fixed salient poles 2b opposed thereto regardless of the rotation positions of the respective rotation salient poles, so that rotation fluctuation, noises, and vibrations are suppressed.

Since the magnetic induction fixed magnetic pole rotor motor of this embodiment can be freely changed regarding its rotation direction, it can be utilized as a motive power for an electric vehicle and various industrial machines.

Third Embodiment

A magnetic induction fixed magnetic pole rotor motor of a third embodiment is identical to the magnetic induction fixed magnetic pole rotor motor of the first embodiment regarding such a point that the motor main body, the detection section (including the sensor pairs, and the control signal output sections), and the power-feeding control section are provided, and it is identical to the magnetic induction fixed magnetic pole rotor motor of the second embodiment regarding such a point that the switching section for changing the rotation direction of the rotor by performing switching of the control circuit which is the input destination of a control signal is provided. However, the magnetic induction fixed magnetic pole rotor motor of the third embodiment is different from the magnetic induction fixed magnetic pole rotor motors of the first embodiment and the second embodiment regarding such a point that the sensor pairs constituting the detection section are constituted of K (here, five) light sensor pairs provided so as to be opposed to respective two tracks formed in a circumferential direction on a flat face of a disk by the sections to be detected and such a point that a means for generating a command signal in response to a command, a mean for regenerating power induced in the field windings to perform charging, a means for preventing burnout of a field winding, and the like are provided. Therefore, the different points will be mainly described below.

Figure 25:
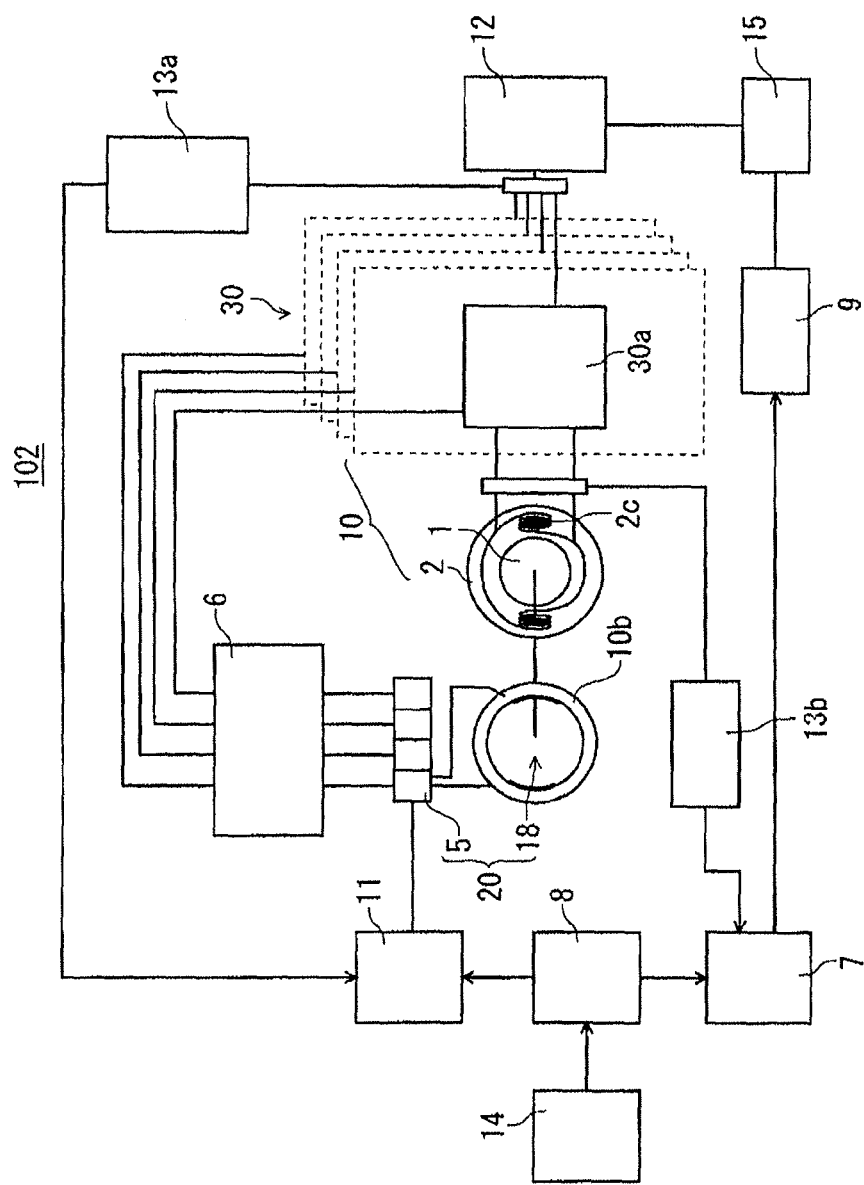
FIG. 25 is a function block diagram showing a magnetic induction fixed magnetic pole rotor motor of a third embodiment.

FIG. 25 is a function block diagram showing the magnetic induction fixed magnetic pole rotor motor of the third embodiment. A magnetic induction fixed magnetic pole rotor motor 102 of this embodiment shown in FIG. 25 is provided with a command signal generation section 8, a regeneration signal generation section 7, a regeneration power control section 9, an overload detection section 13a, an overload detection section 13b, a charging section 15, a chopper signal generation section 14, and a rotation signal generation section 11 in addition to the motor main body 10, the detection section 20, the power-feeding control section 30, and the switching section 6.

The motor main body 10 is provided with a rotor 1 having 2n rotation salient poles and a stator 2 having 2nK fixed salient poles wound with field windings, and K sets of field winding sets 2c are formed by combining the field windings by 2n fields windings at intervals of k to connect them in parallel (in series).

The detection section 20 has a disk 18 pivoted to the rotor 1 and having two tracks formed in a circumferential direction of a circular flat face thereof by sections to be detected 3a1 and 3a2 (not shown), a holder 10b arranged with K light sensor pairs 4p (not shown) composed of 2K light sensors 4a (not shown) arranged so as to correspond to the respective adjacent 2K fixed salient poles 2b at positions corresponding to the respective two tracks formed on the disk 18, and K control signal output sections 5 outputting PWM control signals for excitation currents of the field winding sets 2c based upon detection signals outputted from the respective light sensor pairs 4p.

The control signal output section 5 has input terminals (X, Y) of detection signals outputted from the respective 5 (K) light sensor pairs 4b (not shown) obtained by combining 10 (2K) light sensors 4a (not shown) provided in two rows so as to be opposed to two tracks by twos arranged in the different rows, and output terminals (A, B) of PWM control signals, and it operates according a PWM control signal inputted from the rotation signal generation section 11. A PWM control signal is outputted from either one of the A terminal and the B terminal in response to a light sensor 4a which has detected the section to be detected 3a. In this connection, when the section to be detected 3a is not detected by the light sensor pair 4b, a PWM control signal is not outputted.

The chopper signal generation section 14 generates rectangular waves with a predetermined cycle, performs full wave rectification to generate chopper signals and input the generated chopper signals into the command signal generation section 8.

The command signal generation section 8 generates, when a force exceeding a predetermined threshold value (for example, a neutral of an acceleration pedal in an automobile) is applied, a first command signal where a characteristic value of a linear element changes in proportion to the intensity of the force as a command for accelerating rotation, and, when the force once exceeding the threshold value becomes the threshold or less, a second command signal where the characteristic value of the linear element changes in proportion to the intensity of the force less than the threshold value as a command for decelerating rotation.

When a first command signal is inputted into the rotation signal generation section 11 from the command signal generation section 8, the rotation signal generation section 11 detects a PWM rotation signal (corresponding to the "rotation signal" in this invention) with a duty ratio corresponding to the first command signal to input the same into the control signal output section 5 of the detection section 20.

The power-feeding control section 30 has K switching circuits 30a, and each switching circuit 30a controls a direction of an excitation current fed from a direct-current power source 12 to the field winding set 2c depending on whether a PWM control signal inputted from a corresponding control signal output section 5 is one from the A terminal or the B terminal, and controls a current flow time in response to a pulse width of the PWM control signal.

The switching circuit 30a has four switching elements, where a switching element to be turned ON/OFF is changed among the switching elements depending on whether the input PWM control signal is from the A terminal or the B terminal, so that the direction of an excitation current fed to the field winding set 2c is switched, and when no PWM control signal is inputted, current flow of the excitation current is stopped.

The switching section 6 has K switching contacts for switching the switching circuits 30a inputted with PWM control signals outputted from the respective K control signal output sections 5 to ones of predetermined forward rotation switching contacts and reverse rotation switching contacts in unison.

When the second command signal is inputted into the regeneration signal generation section 7 from the command signal generation section 8, the regeneration signal generation section 7 outputs a pulse width modulation signal (corresponding to the "regeneration signal" in this invention, which is hereinafter called "PWM regeneration signal") with a duty ratio corresponding to the second command signal.

After current flow from the direct-current power source 12 to the field winding set 2c is stopped, the regeneration power control section 9 rectifies power induced in the field winding set 2c based upon a PWM control signal inputted from the regeneration signal generation section 7 to store the same in a large-capacity capacitor.

The charging section 15 charges electric charges stored in the large-capacity capacitor of the regeneration power control section 9 into a secondary battery of the direct-current power source 12.

The overload detection section 13a detects the intensity of an excitation current flowing in the field winding set 2c, and lowers a duty ratio of a PWM regeneration signal outputted from the rotation signal generation section 11 to suppress a excitation current when the excitation current exceeds a threshold value, while restoring the duty ratio of the PWM regeneration signal when the excitation current becomes equal to or lower than the threshold value.

Further, after current flow from the direct-current power source 12 to the field winding set 2c is stopped, the overcurrent detection section 13b detects a regeneration current flowing in the field winding set 2c, and lowers the duty ratio of the PWM regeneration signal outputted from the regeneration signal generation section 7 to suppress the regeneration current when the detected regeneration current exceeds a threshold value, while restoring the duty ratio of the PWM regeneration signal when the regeneration current becomes the threshold value or less.

In such a case that the magnetic induction fixed magnetic pole rotor motor 102 of this embodiment is mounted on an electric vehicle, for example, when a driver steps on an acceleration pedal corresponding to the "command signal generation section 8" of this embodiment in order to start the vehicle, a first command signal where a characteristic value of a linear element changes is generated, and when the first command signal is inputted into the rotation signal generation section 11, a PWM rotation signal with a duty ratio corresponding to a torque accelerating rotation is generated. The generated PWM rotation signal is inputted into the control signal output section 5 generating a PWM control signal for controlling an excitation current fed to the field winding set 2c. When the control signal output section 5 is inputted with a detection signal outputted from the sensor pair 4p from the X terminal or the Y terminal when detecting the large-diameter portion 3b or the small-diameter portion 3a of the cylindrical body 3, it outputs a PWM control signal from the A terminal or the B terminal according to the terminal (X, Y) inputted with the detection signal, and it does not output a PWM control signal when being not inputted with a detection signal. The respective PWM control signals are inputted into respective corresponding control circuits 30a for forward rotation, and the respective control circuits 30a control directions of excitation currents flowing in the field winding sets 2c depending on whether the PWM control signal are inputted from the A terminal of the control signal output section 5 or is inputted from the B terminal, and they stop excitation currents when the PWM control signals are not inputted.

As a result, while the fixed salient poles 2b excited by excitation currents of the respective field winding sets 2c are magnetized to N pole or S pole, they are once put in magnetization suspension when their magnetic poles are changed. Magnetic fields of fixed salient poles, opposed to the trailing ends of the respective rotation salient poles in the rotation direction, of the plurality of fixed salient poles opposed to the respective rotation salient poles disappear, and since magnetic fields in the same direction occur in the remaining fixed salient poles and the fixed salient poles advanced, by at least one, from the fixed salient poles through which the leading ends of the respective rotation salient poles in the rotation direction have passed, the respective rotation salient poles are magnetized to the same magnetic pole regardless of their rotation positions, so that they are rotated because attraction force always acts thereon.

When the acceleration pedal is released, the first command signal is stopped, and the PWM control signal is also stopped, so that currents flowing in the field winding sets 2c are stopped. On one hand, when the acceleration pedal is released, the second command signal is generated, so that the regeneration signal generation section 7 generates a PWM regeneration signal corresponding to the second command signal and the PWM regeneration signal is inputted into the regeneration power control section 9. Further, power is induced in the field winding set 2c due to kinetic energy rotating by inertia even after current flowing is stopped. The regeneration power control section 9 stores power induced in the field winding set 2c in a large-capacity capacitor based upon the PWM regeneration signal and consumes the same. As a result, regeneration braking acts on the motor main body 10 and regeneration braking similar to engine braking is added.

Further, when switching of the switching section 6 is performed in order to reverse the rotation direction to back the vehicle up, the PWM control signal outputted from the control signal output section 5 is inputted into the control circuit 30 for reverse rotation, so that subsequently an operation similar to that in the case of the forward rotation is performed.

Figure 26:
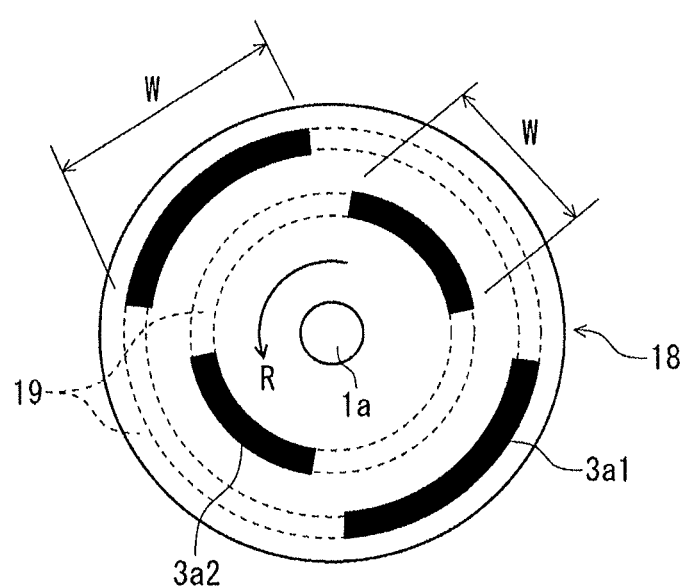
FIG. 26 is a view showing an example of a disk formed with two tracks by sections to be detected in a circumferential direction of a flat face.
Figure 27:
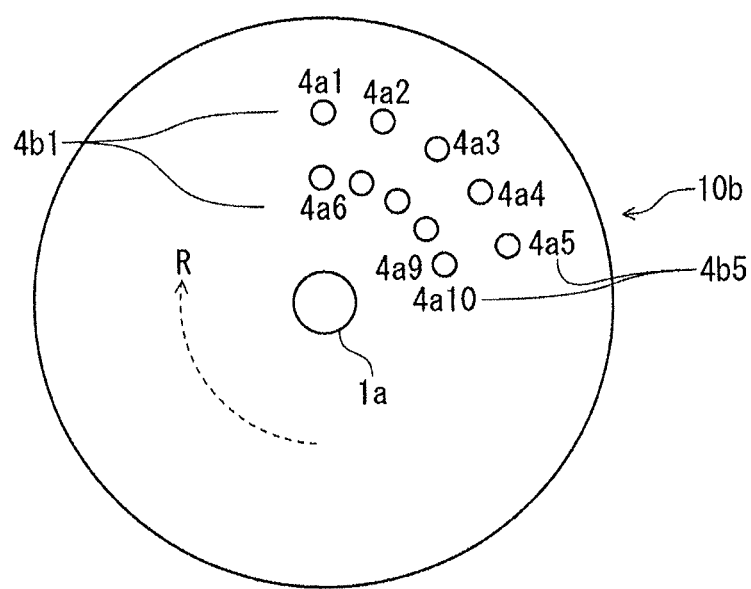
FIG. 27 is a diagram showing a flat face of a holder where light sensor pairs have been arranged so as to be opposed to two tracks.
Figure 28:
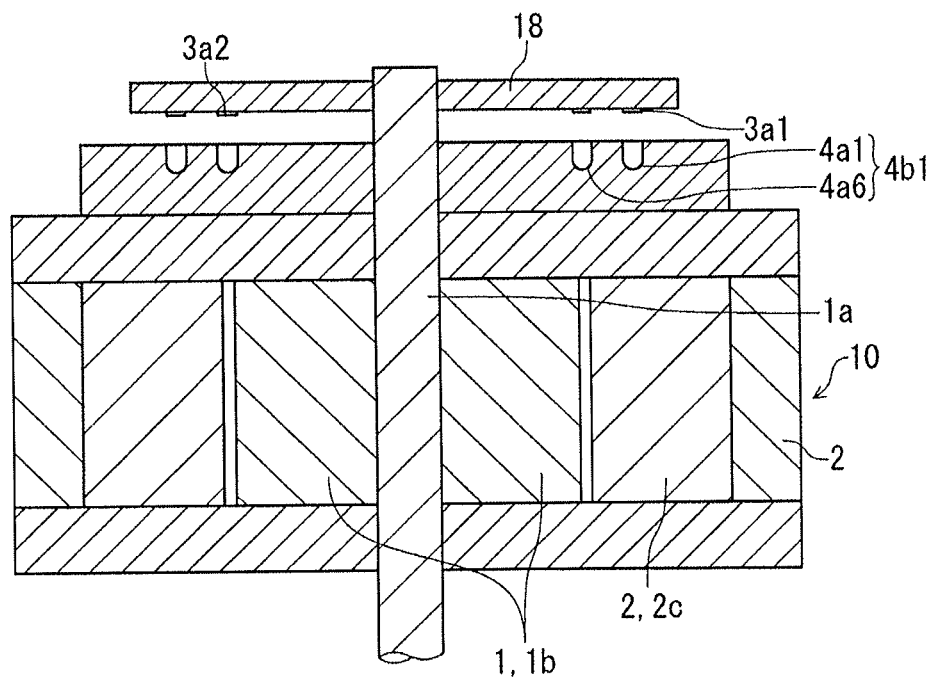
FIG. 28 is a sectional view showing a state where a disk and a holder have been installed in the motor main body.

FIG. 26 is a view showing an example of a disk on which two tracks have been formed in a circumferential direction of a flat face by sections to be detected, FIG. 27 is a view showing a flat face of a holder where light sensor pairs are arranged so as to be opposed to two tracks, and FIG. 28 is a sectional view showing a state where a disk and a holder have been arranged in a motor main body.

As shown in FIG. 26, there is a rotation shaft 1a pivoted to a rotor at a central portion of a disk 18, and two tracks 19 composed of sections to be detected are formed around the rotation shaft 1a. Sections to be detected (reflection plates) (3a1, 3a2) are formed on each track 19 symmetrically regarding the rotation shaft 1a so as to be spaced from each other at predetermined interval, and the sections to be detected (3a1, 3a2) on each track 19 are provided at different positions.

As shown in FIG. 27, light sensors (4a1 to 4a5, 4a6 to 4a10) are arranged on the flat face of the holder 10b at the same rotation positions so as to be opposed to respective adjacent 5 fixed salient poles 2b at positions opposed to the respective two tracks 19 of the disk 18. Light sensor pairs (4b1 to 4b5) are constituted of sets composed of two light sensors (4a1 and 4a6, . . . 4a5 and 4a10) opposed to each other on the different tracks 19 and combined to each other.

Respective circumferential lengths W of the respective sections to be detected (reflection plates) 3a1 and 3a2 forming two tracks 19 on the flat face of the disk 18 of this embodiment (when the sections to be detected 3a1 and 3a2 are regarded to be arranged on the same circumference as the opposed face of the rotation salient poles 1b) are set shorter than circumferential lengths of portions where the section to be detected (reflection plate) 3a is not arranged by a distance corresponding to one or two of the fixed salient poles 2b. Therefore, neither the light sensors 4a1 nor 4a6 receive reflected light so that the first light sensor pair 4b1 does not output a detection signal. Thereby, a corresponding control signal output section 5 does not output a PWM control signal and a corresponding fixed salient pole 2b falls into a magnetization suspension. The fixed salient pole 2b put in the magnetization suspension moves according to rotation of the disk 18.

As shown in FIG. 28, the motor main body 10 has a rotor 1 where rotation salient poles 1b are arranged symmetrically regarding the rotation shaft 1a, a stator 2 wound with field winding sets 2c, and a casing 10a. A holder 10b in which light sensors 4a are arranged is fixed to the casing 10a such that an installation face of the light sensors 4a is directed outside. Further, the disk 18 formed with the sections to be detected 3a on the flat face is pivoted to the rotation shaft 1a such that an installation face of the section to be detected 3a is opposed to an installation face of the light sensors 4a.

Therefore, when the disk 18 is rotated according to rotation of the rotation shaft 1a, the sections to be detected 3a1 and 3a2 are detected by the respective light sensor pairs (4a1 to 4b5) so that detection signals are outputted. The respective control signal output sections 5 output control signals for controlling a direction of an excitation current depending on whether detection signals are inputted from the X terminals or the Y terminals from either ones of the A terminals and the B terminals.

Next, one example of an electronic circuit realizing a main functional block of the magnetic induction fixed magnetic pole rotor motor of the third embodiment explained in FIG. 25 will be described.

Figure 29:
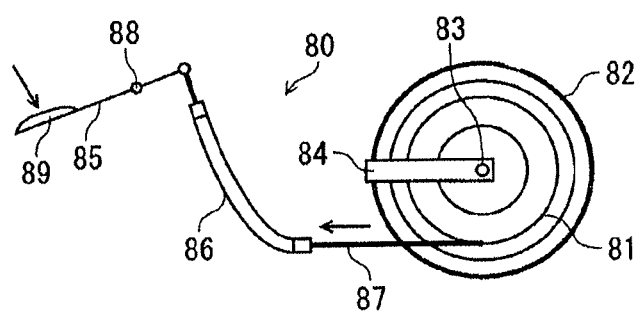
FIG. 29 is a side view of an acceleration pedal showing one example of a command signal generation section of this embodiment.
Figure 30:
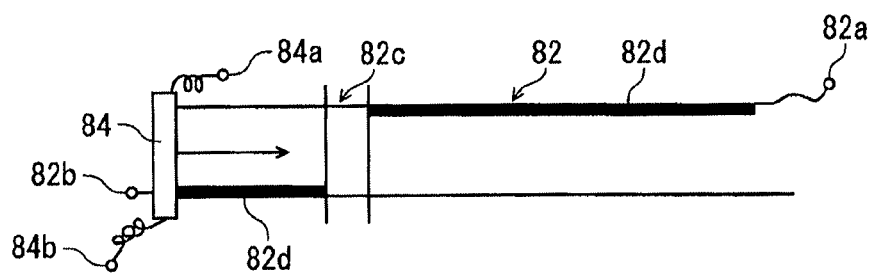
FIG. 30 is a developed view of a sliding resistor associated with the acceleration pedal.

FIG. 29 is a side view of an acceleration pedal showing one example of the command signal generation section of this embodiment, and FIG. 30 is a developed view of a sliding resistor linked with the acceleration pedal.

A control pedal 80 shown with the side view in FIG. 29 is provided with sliding resistors 82 provided at both circumference edges of a drum outer circumference sandwiching a neutral zone, a drum rotation shaft 83 freely rotating, a slide lead 84 rotating according to rotation of the rotation shaft 83 to slide the sliding resistor 82, and a wire 87 whose one end is coupled to a rod-shaped body 85 and whose intermediate portion is supported by a flexible tube 86, the other end thereof wound on a take-up guide 81 of the drum being connected to the slide lead 84. The rotation shaft 83 is biased in a counterclockwise direction by a spring (not shown), and the rod-shaped body 85 is supported at an intermediate portion thereof by a supporting point 88, a pedal 89 subjected to an external force being provided at the other end of the rod-shaped body 85.

When the pedal 89 is pushed in an arrow direction to be applied with a force, the wire 87 is pulled out corresponding to the intensity of the force applied, and the slide lead 84 and the rotation shaft 83 are rotated in a clockwise direction so that the slide lead 84 slides the sliding resistor 82. At this time, a resistant value between lead wires 84*a* and 84*b* of the slide lead 84 and lead wires 82*a* and 82*b* of the sliding resistor 82 changes.

In this connection, such a configuration is adopted here that the drum is fixed and the rotation shaft 83 rotates together with the slide lead 84, but such a configuration can be adopted that the drum itself rotates. Further, the slide resistor 82 is not required on the outer periphery of the drum necessarily.

The slide resistor 82 shown in the developed view in FIG. 30 is provided with strip-like sliding faces 82*d* having a resisting body on one side edges of both sides sandwiching the neutral zone 82*c*, and it is configured such that the slide lead 84 slides on the sliding face 82*d* so that a resistance value between the lead wires 84*a* and 84*b* of the slide lead 84 and the lead wires 82*a* and 82*b* of the sliding resistor 82 is changed. The sliding face 82*d* on the upper side in FIG. 30 is for generating a first command signal and the sliding face 82*d* on the lower side in FIG. 30 is for generating a second command signal. On the sliding face 82*d* on the upper side, no resistor body is formed up to the neutral zone 82*c* and a resistor body is formed on the right side from the neutral zone 82*c*. On one hand, on the sliding face 82*d* on the lower side, a resistor body is formed up to the neutral zone 82*c* and no resistor body is formed on the right side from the neutral zone 82*c*.

In FIG. 30, when the slide lead 84 moves rightward (in a direction of arrow), the resistance value remains in the maximum value without being changed up to the neutral zone 82*c* on the sliding face 82*d* on the upper side, and when the slide lead 84 further moves from the neutral zone 82*c* rightward, the resistance value gradually becomes small from the maximum value down to zero. On one hand, on the sliding face 82*d* on the lower side, the resistance value gradually becomes large from zero and it becomes the maximum value after the neutral zone 82*c*. Next, when the slide lead 84 moves from the right side to the left side, the resistance value of the sliding face 82*d* on the upper side gradually becomes large from zero to reach the maximum in the vicinity of the neutral zone 82*c*, and the resistance value remains in the maximum value without being changed even if the sliding face 82*d* on the upper side moves beyond the neutral zone 82*c*. On one hand, the resistance value of the sliding face 82*d* on the lower side remains in the maximum value up to the neutral zone 82*c*, and when the sliding face 82*d* on the lower side further moves leftward, the resistance value gradually becomes small to reach zero.

The change of the sliding face 82*d* on the upper side is reflected in the rotation signal generation section 60, so that a duty ratio of a rotation signal to be outputted changes. Further, the change of the resistance value of the sliding face 82*d* on the lower side is reflected in the regeneration signal generation section 7.

Here, the rotation signal generation section 60 and the regeneration signal generation section 7 are provided with time constant circuits, for example, and duty ratios of a rotation signal and a regeneration signal pulse-modulated and outputted can be changed by changing the voltages supplied to the time constant circuits by changes of the resistance values of the sliding resistors 82. In this connection, in this embodiment, the intensity of applied force is converted into a change of the resistance value of the sliding resistor 82 for generation of a command signal, but it is unnecessary to perform conversion to the change of the resistance value necessarily, and conversion to a change of capacitance, a change of inductance, change of voltage or the like can be reflected in the rotation signal generation section 60 or the regeneration signal generation section 7.

Figure 31:
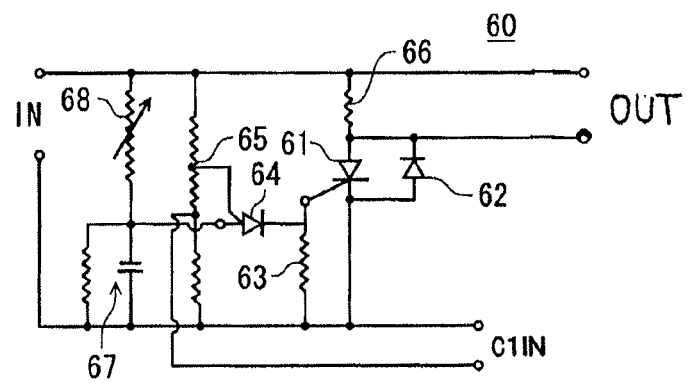
FIG. 31 is a diagram of a power controller showing one example of a rotation signal generation section of this embodiment.

FIG. 31 is a diagram showing a power controller showing one example of the rotation signal generation section of this embodiment.

A power controller 60 shown in FIG. 31 is composed of an SCR (thyristor) 61, a free wheel diode 62 bypassing a surge voltage, a resistor 63 obtaining a gate voltage of the SCR 61, a PUT (programmable unijunction transistor) 64 for controlling a duty ratio of a chopper signal by the SCR 61, a dividing resistor 65, a dummy load resistor 66, a time constant circuit 67 for controlling a rising time of the PUT 64, a variable resistor 68 (change of a resistance value corresponds to the first command signal) for adjusting a voltage supplied to the time constant circuit 67, an input terminal IN inputting a chopper signal outputted from a chopper signal generator 50, an output terminal OUT outputting a rotation signal with a predetermined duty ratio, and an input terminal C1IN of an overload signal warning that an excitation current flowing in a field winding is excessive.

When a constant or more force is applied to a pedal 89 of the control pedal 80, a first command signal changing the resistance value of the sliding resistor 82 is outputted. Thereby, when the resistance value of the variable resistor 68 is changed, the voltage of the time constant circuit 67 is changed, the rising time of the PUT 64 is also changed, so that the duty ratio of the chopper signal by the SCR 61 is changed. As a result, a rotation signal with a duty ratio corresponding to the first command signal is outputted from the output terminal OUT.

Further, when an overload signal is inputted from the input terminal C1IN, an operation voltage of the PUT 64 is raised, so that a rising voltage of the PUT 64 set by the first command signal is raised, and the duty ratio is decreased. As a result, a rotation signal with a reduced duty ratio is outputted from the output terminal OUT.

Figure 32:
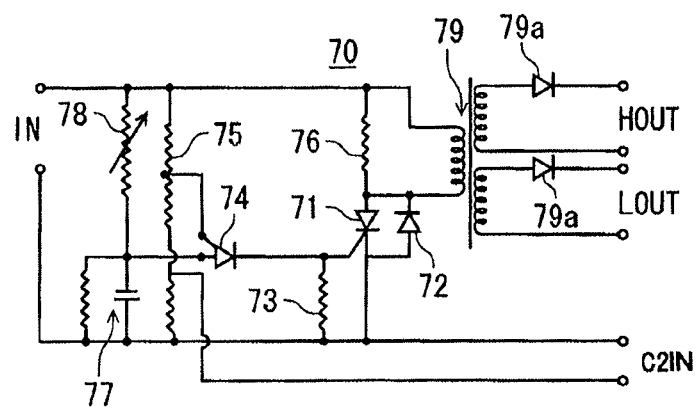
FIG. 32 is a diagram of a regeneration brake controller showing one example of a regeneration signal generation section of this embodiment.

FIG. 32 is a diagram of a regeneration brake controller showing one example of the regeneration signal generation section of this embodiment. A regeneration brake controller 70 shown in FIG. 32 is a circuit similar to the power controller 60. The regeneration brake controller 70 is different from the power controller 60 regarding such a point that a pulse transformer 79 is connected to the dummy resistor 66 in the regeneration brake controller 70 and such a point that an overcurrent signal warning that a regeneration current is excessive is inputted into the input terminal C2IN of an overcurrent signal therein, but the both are the same besides these points. Therefore, regarding common circuit parts between the both, explanation is omitted by using numbers of 70s instead of numbers of 60s and using numbers of one digit as common numbers between the both, and only different points between the both will be described.

When a chopper signal is inputted from the input terminal IN, a high-voltage chopper signal with a duty ratio (high-voltage regeneration signal) corresponding to a second command signal (change of the resistance value of the variable resistor 78 corresponds to the second command signal) and a low-voltage chopper signal (low-voltage regeneration signal) are outputted to a first output terminal HOUT and a second output terminal LOUT, respectively. The pulse transformer 79 is configured such that when a regeneration signal with a predetermined duty ratio is inputted into a primary side thereof, a high-voltage regeneration signal and a low-voltage regeneration signal are individually outputted to a secondary side thereof. In this connection, a diode 79*a* blocking counter flow is connected to the secondary side. In this connection, an operation of the regeneration brake controller 70 when an overcurrent signal is inputted into the input terminal C2 N is the same as the operation of the power controller 60 when an overcurrent signal voltage is inputted into the power controller 60, explanation of which is omitted.

Figure 33:
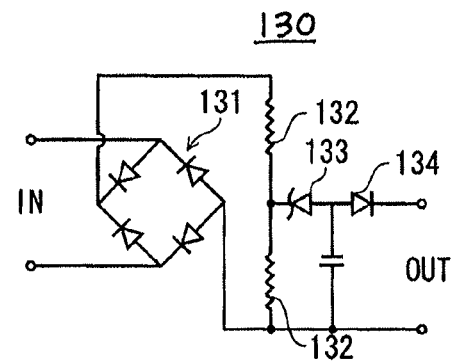
FIG. 33 is a diagram of an overload signal generator (or an overcurrent signal generator) showing one examples of an overload detection section and an overcurrent detection section of this embodiment, respectively.

FIG. 33 is a diagram showing an overload signal generator (or an overcurrent signal generator) showing one examples of the overload detection section and the overcurrent detection section of this embodiment.

An overload signal generator (or an overcurrent signal generator) 130 shown in FIG. 33 is provided with an input terminal IN inputted with an overvoltage detected in response to an excitation current (or a regeneration current), a full-wave rectifier 131, a voltage-dividing resistor 132, a Zener diode 133, a counter-flow preventing diode 134, and an output terminal OUT.

When an overvoltage is inputted into the input terminal, it is full-wave rectified by the full-wave rectifier 131, and is voltage-divided by the voltage-diving resistor 132. When the divided voltage exceeds the operation voltage of the Zener diode 133 (corresponding to the threshold value in this invention), the Zener diode 133 is made conductive. An overload signal (or overcurrent signal) is outputted to the output terminal OUT via the counter-flow preventing diode 134.

Figure 34:
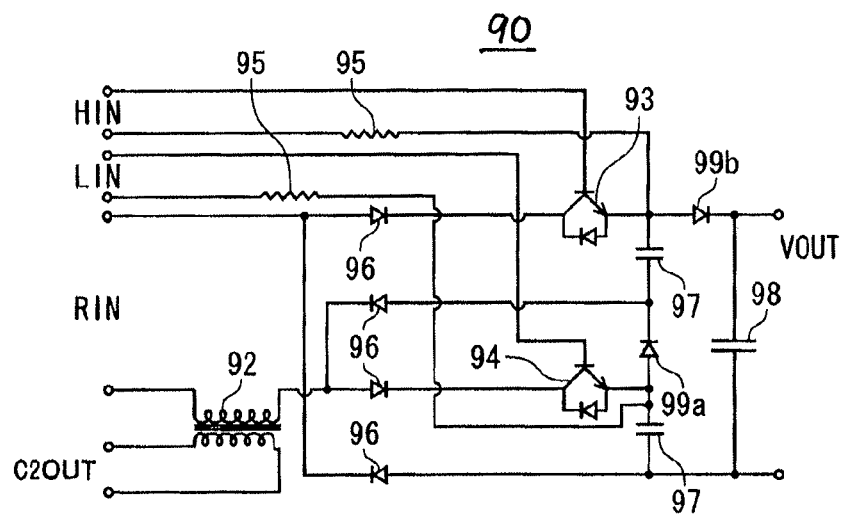
FIG. 34 is a diagram of a regeneration power controller showing one example of a regeneration power control section of this embodiment.

FIG. 34 is a diagram of a regeneration power controller showing one example of the regeneration power control section of this embodiment.

A regeneration power controller 90 shown in FIG. 34 is for performing voltage-doubler rectification to a regeneration power induced in the field winding set 2c to output the voltage-doubler rectified regeneration power, and it is provided with an input terminal RIN inputted with a regeneration power, input terminals HIN and LIN inputted with a high-voltage regeneration signal and a low-voltage regeneration signal outputted from the regeneration brake controller 70, a detection transformer 92 detecting a regeneration current, an output terminal C2OUT outputting the detected regeneration current, a pair of switching elements 93 and 94 made conductive by the respective high-voltage regeneration signal and low-voltage regeneration signal, safety resistors 95 controlling currents of the gates and the cathodes of the pair of switching elements 93 and 94, four diodes 96 performing full-wave rectification to positive and negative respective regeneration currents of a regeneration power, primary capacitors 97 charged with rectified positive and negative respective regeneration currents individually, a large-capacitor capacitor 98 obtaining voltage-doubler charges by charges charged in the primary capacitors 97, and an output terminal VOUT of a voltage-doubler.

When the pair of switching elements 93 and 94 are inputted with a high-voltage regeneration signal and a low-voltage regeneration signal, they are intermittently made conductive corresponding to duty ratios of the regeneration signals and regeneration powers are charged into the primary capacitors 97 only during their conduction states. Charges charged into the primary capacitors 97 are stored in the large-capacity capacitor 98 via diodes 99a and 99b.

Here, the reason why the output is made to voltage-doubler is because when charges in the large-capacity capacitor 98 are charged into the secondary battery of the direct-current power source 14, the charging voltage is made to a proper voltage higher than the voltage of the secondary battery.

After a pressing member 89 in the command signal generation section 8 of this embodiment is stepped on above a certain level, when a force applied to the pressing member 89 is made weak, the second command signal is outputted, and regeneration brake serves. Since the degree of strength of the regeneration brake changes according to an amount of consumption of the regeneration power, when times where the switching elements 93 and 94 are conductive are short (when duty ratios are small), the regeneration brake serves weak, and when the switching elements 93 and 94 are conductive are long (when duty ratios are large), the regeneration brake serves strong, so that a feeling similar to that of the engine brake can be obtained in application to an acceleration pedal of an electric vehicle.

Figure 35:
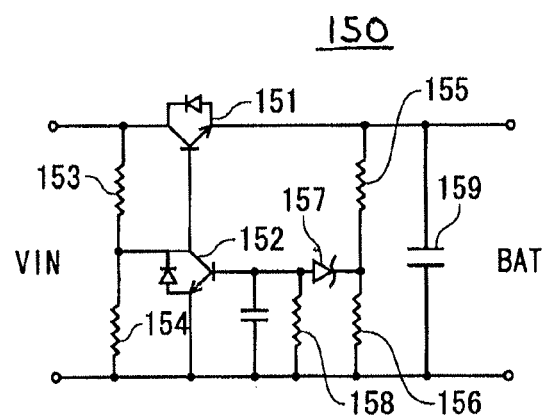
FIG. 35 is a diagram of a battery charge voltage controller showing one example of a charging section of this embodiment.

FIG. 35 is a diagram of a battery charge voltage controller showing one example of the charging section of this embodiment. A battery charge voltage controller 150 shown in FIG. 35 is provided with input terminals VIN inputted with a voltage doubler from the output terminals VOUT of the regeneration power controller 90, output terminals BAT connected to the secondary battery, two switching elements 151 and 152, resistors 153 and 154 keeping the gate voltage of the first switching element 151 zero, voltage-dividing resistors 155 and 156 dividing the voltage of the secondary battery to set a charging voltage, a Zener diode 157, a resistor 158 holding the gate voltage of the second switching element 152 in zero when the Zener diode 157 is OFF, and a large-capacity capacitor 159 storing charges corresponding to a load fluctuation.

When the voltage of the secondary battery rises, the voltages of the voltage-dividing resistors 155 and 156 reach charge-completion voltages, and the Zener diode 157 is made conductive, the second switching element 152 is made conductive, the gate voltage of the first switching element 151 becomes zero, and charging is completed.

Fourth Embodiment

A magnetic induction fixed magnetic pole rotor motor of a fourth embodiment is different in a switching method of a rotation direction from the magnetic induction fixed magnetic pole rotor motor of the third embodiment, but the both are the same other than the difference. That is, the third embodiment and the fourth embodiment are different in such a point that in the third embodiment, the method for performing switching among the control circuits which are the input destinations of K control signals outputted from the detection section having K sensor pairs in response to a command about a rotation direction is used, but in the fourth embodiment, a method where K reverse rotation sensor pairs are further provided in addition to K forward rotation sensor pairs and switching of power feeding to the respective sensor pairs to either ones of the forward rotation sensor pairs and the reverse rotation sensor pairs is performed in response to a command for a rotation direction by a power-feeding switcher is used. Therefore, the switching method of a rotation direction performed by a detection section having 2K sensor pairs and the power-feeding switcher will be mainly described below.

Figure 36:
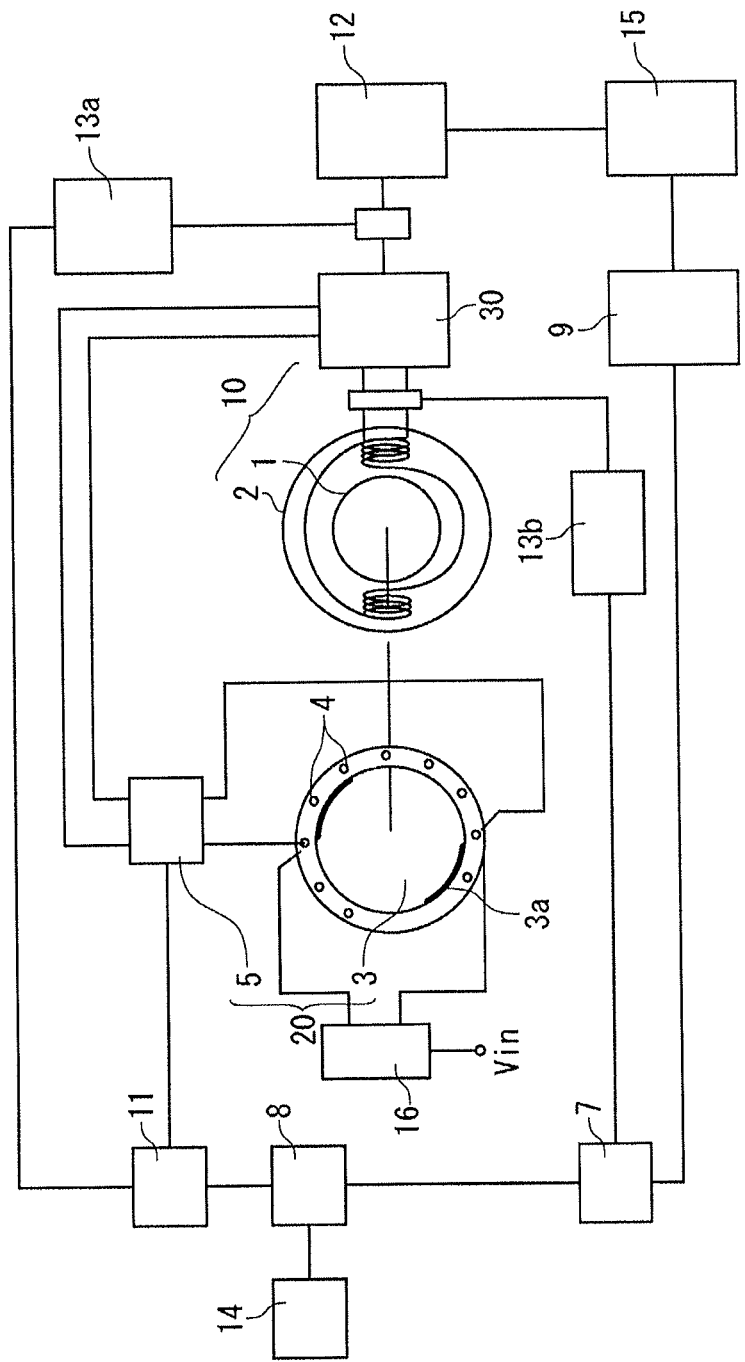
FIG. 36 is a function block diagram showing a magnetic induction fixed magnetic pole rotor motor of a fourth embodiment.

FIG. 36 is a function block diagram showing the magnetic induction fixed magnetic pole rotor motor of the fourth embodiment. A magnetic induction fixed magnetic pole rotor motor 103 of this embodiment shown in FIG. 36 is provided with a motor main body 10, a detection section 20 provided with a cylindrical body 3 having sections to be detected, K forward rotation sensor pairs 4R, K reverse rotation sensor pairs 4L, and control signal output sections 5 outputting control signals in response to detection signals of respective sensor pairs, a power-feeding switcher 16 switching power-feeding from a actuation power source to either ones of the forward rotation sensor pairs 4R and the reverse rotation sensor pairs 4L, a power-feeding control section 30 controlling a direction and an intensity of an excitation current, a chopper signal generation section 14, a command signal generation section 8 generating acceleration/deceleration signal, a rotation signal generation section 11 generating a rotation signal based upon an acceleration command signal, a regeneration signal generation section 7 generating a regeneration signal based upon a deceleration command signal, a regeneration power control section 9, an overload detection section 13a, an overcurrent detection section 13b, and a charging section 15.

The motor main body 10 is provided with a rotor 1 having 2n rotation salient poles and a stator 2 having 2nK fixed salient poles wound with field windings, and K sets of field winding sets 2c are formed by combining the field windings by 2n field windings at intervals of K to connect them in parallel (in series).

When the rotation signal generation section 11 is inputted with a first command signal from the command signal generation section 8, it outputs a PWM rotation signal with a duty ratio corresponding to the first command signal (corresponding to the "rotation signal" in this invention) to input the same into the control signal output section 5 of the control signal output section 20.

The detection section 20 has a cylindrical body 3 where sections to be detected 3a are arranged on a side face thereof in a circumferential direction, which is pivoted to the rotor 1 to be rotated in synchronism with the rotor 1, 2K forward rotation sensors 4R and 2K reverse rotation sensors 4L detecting a section to be detected 3a to output a detection signal, and K control signal output sections 5 controlling directions and intensities of excitation currents fed to the respective field winding sets 2c based upon detection signals outputted from K respective forward rotation sensor pairs 4pR or K reverse rotation sensor pairs 4pL.

In this connection, K sensor pairs 4p are formed by combining 2K sensors 4 of the forward rotation sensor pairs 4R and 2K sensors 4 of the reverse rotation sensor pairs 4L by twos, respectively.

The power-feeding switcher 16 has switching contacts, and feeds currents to the respective forward rotation sensor pairs 4R by performing switching of the switching contacts to the side of the forward rotation sensor pairs 4R when receiving a command of a rotation direction for forward rotation and feeds currents to the respective reverse rotation sensor pairs 4L by performing switching of the switching contacts to the side of the reverse rotation sensor pair 4L when receiving a command of a rotation direction for reverse rotation. The respective sensor pairs 4p on the side fed with currents are actuated, so that the respective rotation salient poles 1b detect timings at which the respective fixed salient poles 2b pass through the rotation salient pole 2b.

The control signal output section 5 has input terminals (X, Y) of detection signals outputted from the respective K sensor pairs 4p for the forward rotation and the respective K sensor pairs 4p for the reverse rotation, and output terminals (A, B), either one thereof outputting a PWM control signal for controlling a direction and an intensity of an excitation current caused to be fed to each field winding set 2c in response to the inputted detection signal. That is, when a section to be detected 3a is detected by K sensor pairs 4p, a PWM control signal is outputted, and when no section to be detected 3a is detected, a PWM control signal is not outputted. Therefore, in the control signal output section 5, a PWM control signal is outputted from one of the A terminal or the B terminal in response to the sensor 4 of the sensor pair 4p which has detected the section to be detected 3a.

The power-feeding control section 30 has K switching circuits 30a, and each switching circuit 30a controls the direction of an excitation current fed from the direct-current power source 12 to the field winding set 2c depending on whether the PWM control signal is inputted from the A terminal of the control signal output section 5 or inputted from the B terminal, and controls a power-feeding time in response to a pulse width of the PWM control signal.

Figure 37:
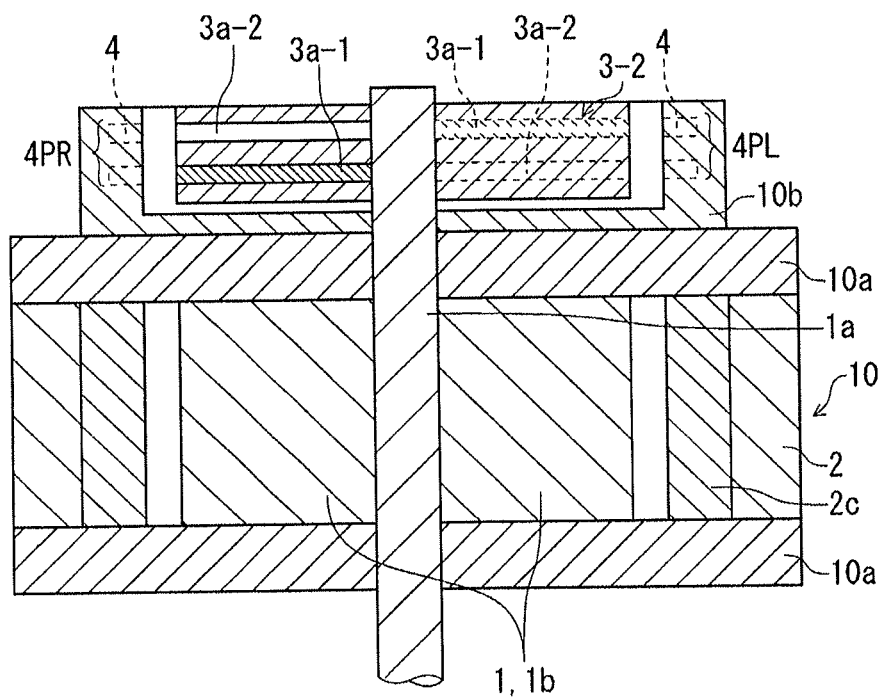
FIG. 37 is a sectional view of a state where a detection portion has been installed on the motor main body.
Figure 38:
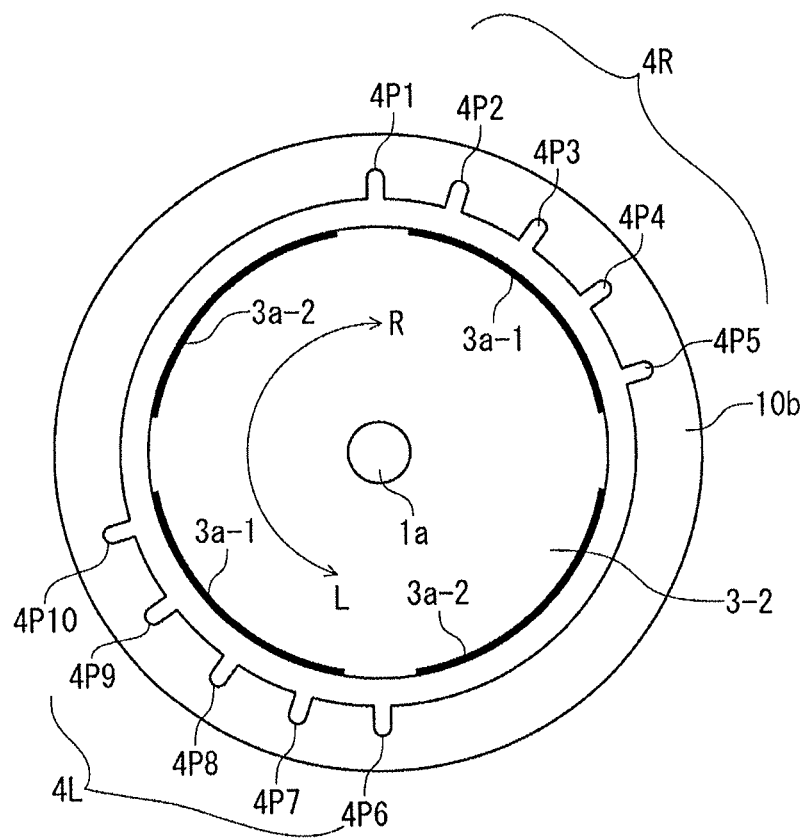
FIG. 38 is a view showing one example of a cylindrical body where K forward rotation sensor pairs and K reverse rotation sensor pairs have been arranged.

FIG. 37 and FIG. 38 are views showing the detection section (cylindrical body) having 2K sensor pairs of this embodiment, FIG. 37 being a sectional view of a state where a detection section has been provided in a motor main body and FIG. 38 being a view showing one example of a cylindrical body where K forward rotation sensor pairs and K reverse rotation sensor pairs have been arranged.

As shown in FIG. 37 and FIG. 38, the motor main body 10 has a rotor 1 where rotation salient poles 1b are arranged symmetrically regarding a rotation shaft 1a, a stator 2 wound with field winding sets 2c, and a casing 10a. Further, a cylindrical body 3-2 is pivoted to the rotation shaft 1a so as to rotate in synchronism with the rotation shaft 1a. Sections to be detected (reflection plates) 3a reflecting light are formed on respective two tracks on a side face of the cylindrical body 3-2.

A holder 10b is attached to the casing 10a so as to cover the cylindrical body 3-2, 5 forward rotation sensor pairs (4p1 to 4p5) are arranged on an inner circumferential face of the holder 10b opposed to the respective two tracks of the cylindrical body 3-2 so as to be caused to correspond to respective adjacent 5 fixed salient poles 2b, and 5 sensor pairs (4p6 to 4p10) serving as reverse rotation sensor pairs 4L are arranged at positions symmetrical with the forward rotation sensor pairs 4R regarding the rotation shaft 1a.

The sensor pairs 4p are each composed of two sensors 4 arranged at the same position on two tracks in a circumferential direction of the side face of the cylindrical body 3-2. The respective sensors 4 constituting the sensor pairs 4p are arranged at positions corresponding to adjacent 5 fixed salient poles 2b.

In this connection, a light sensor 4a composed of a light emitting element and a light receiving element integrally formed with each other is used as the sensor 4, but the sensor 4 is not required to be the light sensor 4a necessarily, and a coil sensor may be used.

On one hand, a pair of section to be detected (reflection plates) 3a1 and a pair of sections to be detected (reflection plates) 3a2 are installed on two tracks of the cylindrical body 3-2 at positions different from each other and spaced from one another by an interval corresponding to one of the fixed salient poles 2b.

Therefore, each sensor pairs 4p is configured such that one sensor 4 detects the section to be detected 3a1 or the section to be detected 3a2 alternately to output detection signals to one of the X terminal and the Y terminal alternately through a non-detection time, and the control signal output section 5 outputs control signals from one of the A terminal and the B terminal alternately though a down time.

In the cylindrical body 3 of this embodiment, the sections to be detected 3a1 and 3a2 are formed on the respective two tracks, but sections to be detected 3a may be formed on many tracks. Though one sensor pair 4p is arranged at the same rotation position on the track, a plurality of sensor pairs 4p may be arranged.

Figure 39:
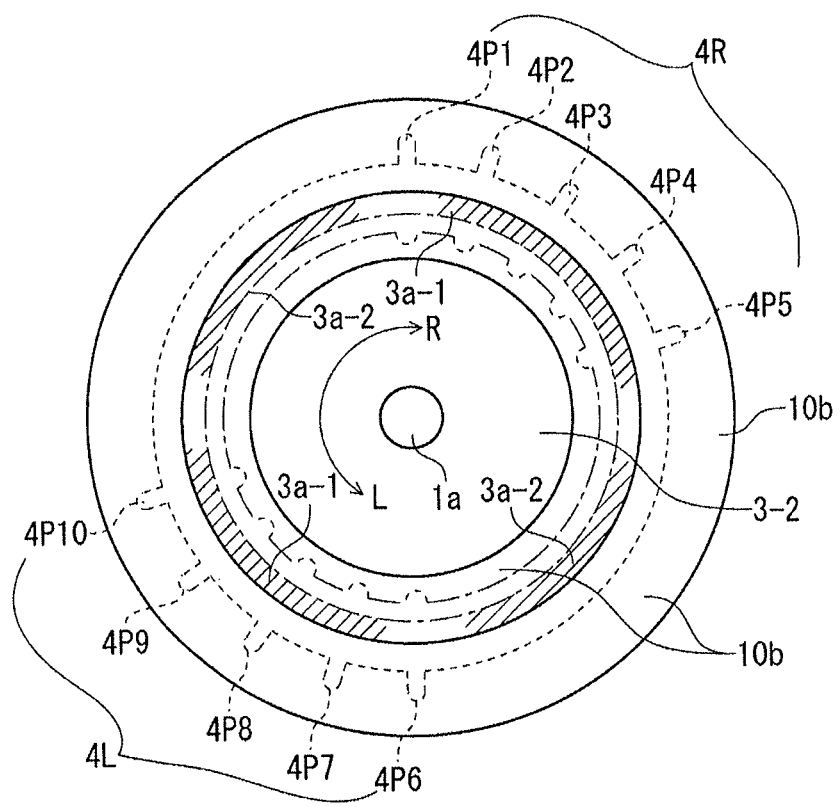
FIG. 39 is a view showing another example of a cylindrical body where K forward rotation light sensor pairs and K reverse rotation light sensor pairs have been arranged.

FIG. 39 is a view showing another example of the cylindrical body where K forward rotation light sensor pairs and K reverse rotation light sensor pairs have been arranged. In this connection, a sectional view of a state where the detection section (cylindrical body) has been installed in the motor main body has the same structure as one shown in FIG. 7 except that two tracks are formed on the cylindrical body as shown in FIG. 37 (figure is omitted). That is, light sensors 4a are formed by fixing and installing, for example, light receiving elements on an inner circumference outside the holder 10b installed so as to cover both side faces of the cylindrical body 3-2 in a sandwiching manner, fixing and installing, for example, light emitting elements on an outer circumference inside the holder 10b so as to be opposed to the light receiving elements. Further, as shown in FIG. 38 and FIG. 39, a pair of sections to be detected (slits) 3a1 and a pair of sections to be detected (slits) 3a2 are provided in the respective two tracks of the cylindrical body 3-2 at positions different from one another so as to be spaced from the fixed salient poles 2b by a distance corresponding to the fixed salient poles 2b.

Therefore, in each sensor pair 4ap, each sensor 4a detects the sections to be detected (3a1, 3a2) alternately, outputs detection signals from one of the X terminal and the Y terminal alternately through a non-detection time, and the control signal output section 5 outputs control signals from one of the A terminal and the B terminal alternately through a down time.

Figure 40:
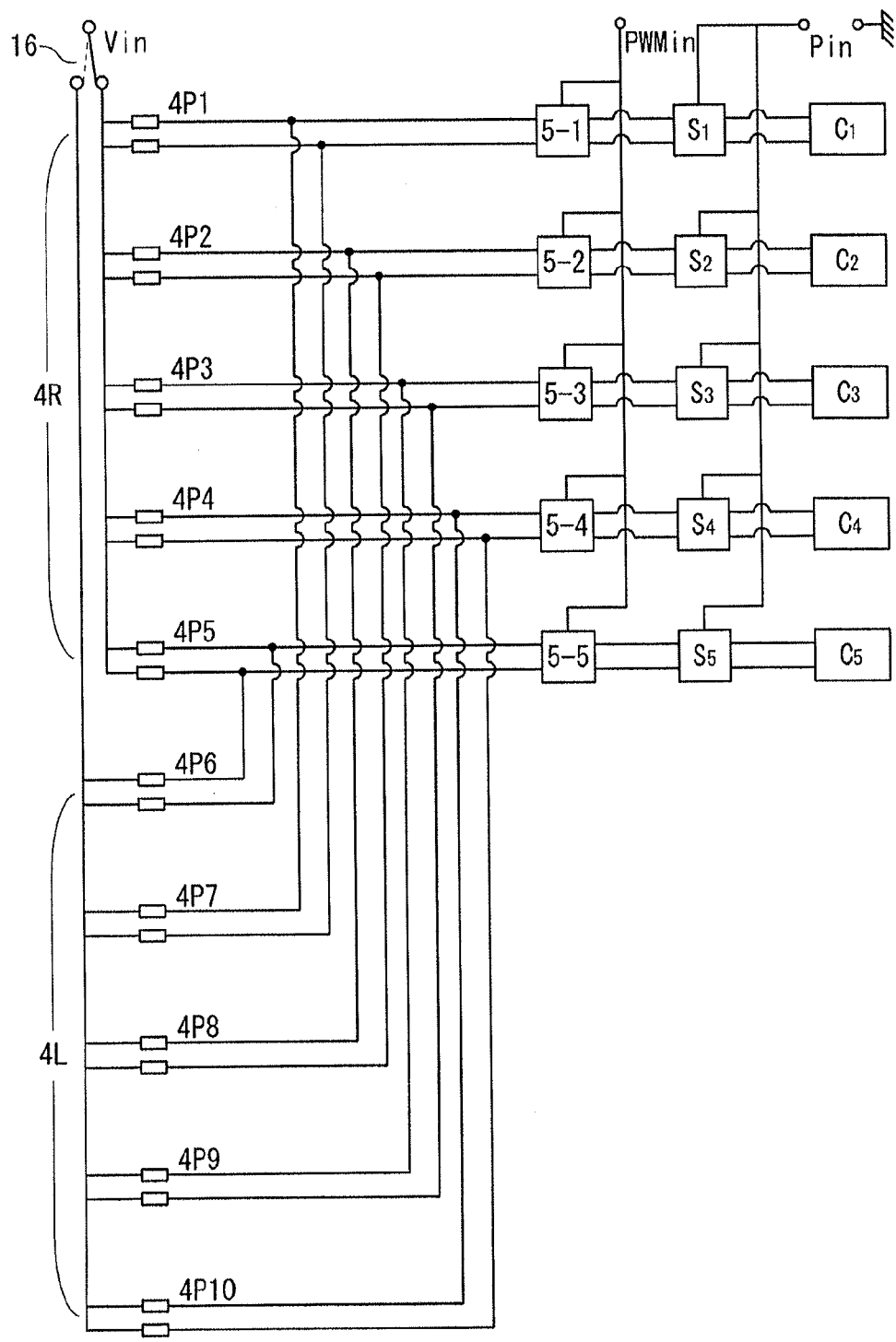
FIG. 40 is a diagram showing an operation of switching of a power-feeding switcher as one example.
Figure 41:
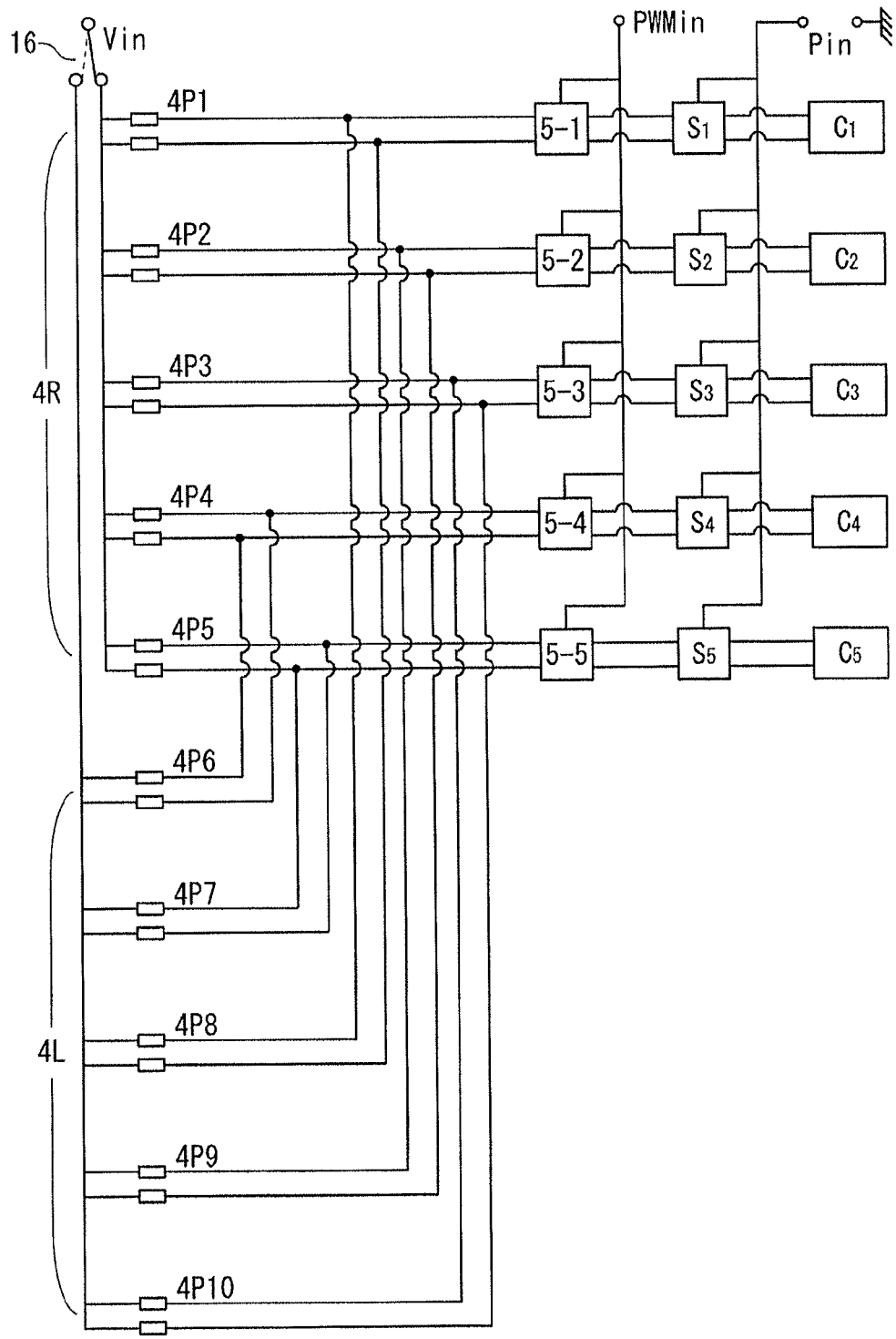
FIG. 41 is a diagram showing an operation of switching of a power-feeding switcher as one example.

FIG. 40 and FIG. 41 are diagrams showing one example of an operation of switching performed by a power-feeding switcher.

FIG. 40 and FIG. 4 both show examples where a forward rotation sensor 4R composed of 5 sensor pairs (4p1 to 4p5) and a reverse rotation sensor 4L composed 5 sensor pairs (4p5 to 4p10) are arranged on a side face of the cylindrical body 3-2 in a circumferential direction. In this connection, the sensor pairs (4p1 to 4p5) are composed of 10 sensors 4, and the light sensor pairs (4p6 to 4p10) are also formed of 10 sensors 4.

The respective 5 forward rotation sensor pairs (4p1 to 4p5) and the respective 5 reverse rotation sensor pairs (4p6 to 4p10) are connected to 5 control signal output sections (5-1 to 5-5), the respective 5 control signal output sections (5-1 to 5-5) are connected to 5 control circuits (S1 to S5), and the respective 5 control circuits (S1 to S5) are connected to 5 field winding sets (C1 to C5). The respective 5 control circuits (S1 to S5) are fed with power from the direct-current power source Pin, and the respective 5 control signal output sections (5-1 to 5-5) are inputted with pulse-modulated rotation signals PWMin, and the 5 sensor pairs (4p1 to 4p5) and the 5 sensor pairs (4p6 to 4p10) are fed with electromotive powers from individual systems via the power-feeding switcher 16.

The example shown in FIG. 40 is wired such that the sensor pair 4p1 and the sensor pair 4p7 share the control signal output section 5-1, the sensor pair 4p2 and the sensor pair 4p8 share the control signal output section 5-2, the sensor pair 4p3 and the sensor pair 4p9 share the control signal output section 5-3, the sensor pair 4p4 and the sensor pair 4p10 share the control signal output section 5-4, and the sensor pair 4p5 and the sensor pair 4p6 share the control signal output section 5-5. Therefore, when the power feeding switcher 16 is switched from the forward rotation to the reverse rotation, a detection signal detected by each sensor pair 4p is regarded as a detection signal detected by the sensor pair 4p arranged at a position advanced from the case of the forward rotation in the reverse rotation direction by one, and a control signal is outputted from the control signal output section 5.

Further, the example shown in FIG. 41 is wired such that the sensor pair 4p1 and the light sensor pair 4p8 share the control signal output section 5-1, the sensor pair 4p2 and the sensor pair 4p9 share the control signal output section 5-2, the sensor pair 4p3 and the sensor pair 4p10 share the control signal output section 5-3, the sensor pair 4p4 and the sensor pair 4p6 share the control signal output section 5-4, and the sensor pair 4p5 and the sensor pair 4p7 share the control signal output section 5-5. Therefore, when the power feeding switcher 16 is switched from the forward rotation to the reverse rotation, a detection signal detected by each sensor pair 4p is regarded as a detection signal detected by the sensor pair 4p arranged at a position advanced from the case of the forward rotation in the reverse rotation direction by two, and a control signal is outputted from the control signal output section 5.

Here, the example shown in FIG. 37 where respective 5 forward rotation sensor pairs 4p and respective 5 reverse rotation sensor pairs 4p are arranged symmetrically regarding the rotation shaft 1a at same positions opposed to two tracks on the side face of the cylindrical body 3-2 in the circumferential direction has been described, but, as shown in FIG. 4 and FIG. 7, a case where forward rotation and reverse rotation sensor pairs 4p are arranged symmetrically regarding the rotations shaft 1a by sensors 4 arranged in one row in a circumferential direction of a side face of the cylindrical body 3-1 can be adopted similarly.

Figure 42:
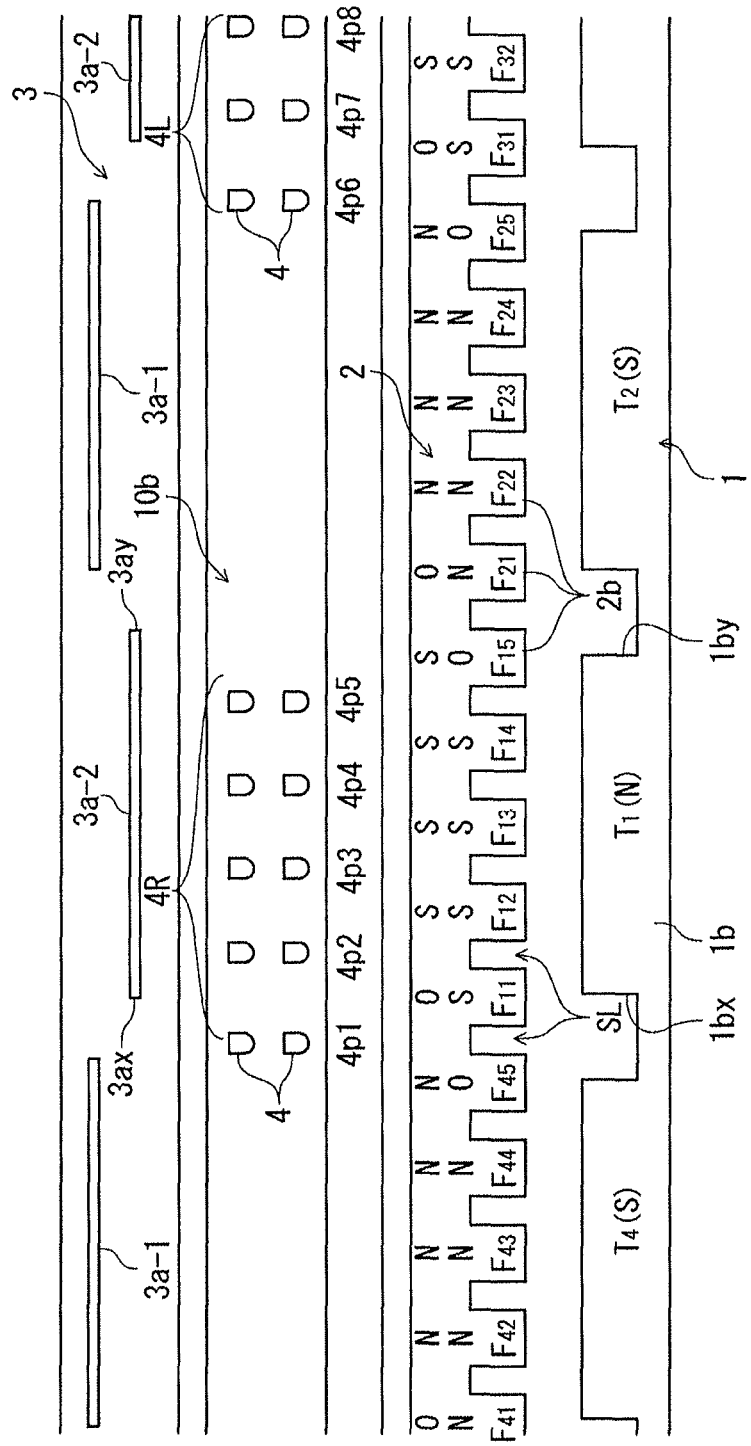
FIG. 42 is an illustrative view showing an operation when the motor main body is rotated forward or rotated reversely.
Figure 43:
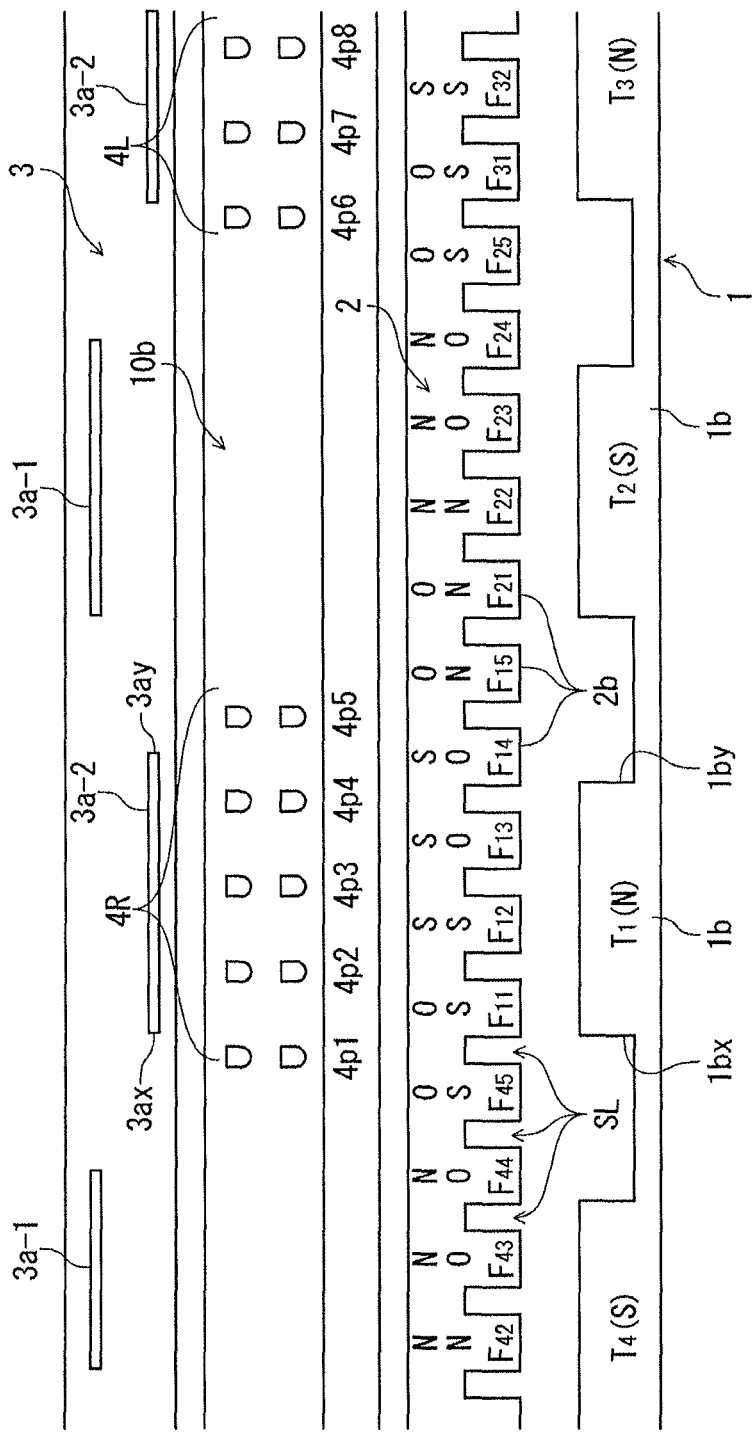
FIG. 43 is an illustrative view showing an operation when the motor main body is rotated forward or rotated reversely.

FIG. 42 and FIG. 43 are illustrative diagrams showing an operation of the case where the motor main body is rotated in a forward direction and in a reverse direction.

FIG. 42 is an illustrative diagram of a case where the motor main body where n is set to 2, K is set to 5, m is set to 1, and P is set to 1 is rotated forward and rotated reversely.

In FIG. 42, 4 rotation salient poles (T1 to T4) are arranged, 20 fixed salient poles (F11 to F45) are arranged, and two sections to be detected (reflection plates) 3a of the cylindrical body 3 are arranged on each of two tracks in the circumferential direction of the side face. The length L0 of the rotation salient pole is set to (K−m)*(L1+L2), namely, 4*(L1+L2), the length W of the section to be detected 3a is set to [L0+L2+(m−p)*(L1+L2)], namely, [4*(L1+L2)+L2].

Further, sensor pairs 4p are formed by arranging respective sensors 4 at the same positions of two tracks so as to be caused to correspond to the stator 2. The sections to be detected 3a are alternately arranged on the two tracks such that trailing ends 3bx thereof in the forward rotation direction are at the same rotation positions as the trailing ends 1bx of the rotation salient poles in the forward rotation direction and leading ends 3by thereof in the rotation direction are at positions advanced from the leading ends 1by of the rotation salient poles in the rotation direction only by L2.

Such a configuration is adopted that the sensor pairs of the sensor pairs 4p positioned on an upper stage in the figure detect the sections to be detected 3a on an upper stage illustrated of two tracks, while the sensor pairs of the sensor pairs 4p positioned on a lower stage in the figure detect the sections to be detected 3a on a lower stage illustrated of two tracks.

Therefore, the magnetic fields in the same direction are caused in the respective fixed salient poles 2b to which the rotation salient poles 1b are opposed, and the respective fixed salient poles 2b advanced, by one, from the fixed salient poles 2b through which the leading ends 1by of the rotation salient poles in the rotation direction have passed, so that the respective fixed salient poles 2b to which the trailing ends 1by of the respective rotation salient poles in the rotation direction are opposed can be put in magnetization suspension. Further, when the section to be detected 3a is detected by the sensors 4 of the sensor pairs 4p positioned on the upper stage, a detection signal is outputted from the X terminal and a control signal is outputted from the A terminal of the control signal output section 5, and when the section to be detected 3a is detected by the sensors 4 of the sensor pairs 4p positioned on the lower stage, a detection signal is outputted from the Y terminal and a control signal is outputted from the B terminal of the control signal output section 5.

As a method for sharing the forward rotation sensors 4R and the reverse rotation sensors 4L of the control signal output section 5 in the motor main body 10 of this example, the example shown in FIG. 40 is adopted.

When the switching contact of the power-feeding switcher 16 in FIG. 40 is positioned on the side of the forward rotation sensors 4R, the sensor pair 4p1 in FIG. 38 or FIG. 39 does not detect the section to be detected 3a, so that the fixed salient poles (F11, F21, F31, F41) corresponding to the sensor pair 4p1 fall into magnetization suspension, as the direction of a magnetic field is shown in the upper stage of respective fixed salient poles 2b. Further, the sensor pairs (4p2 to 4p5) detect the section to be detected 3a to output PWM control signals to the B terminals, so that magnetic fields in the (S) direction occur in corresponding fixed salient poles (F12 to F15, F32 to F35) 2b, and magnetic fields in the (N) direction occur in the fixed salient poles (F22 to F25, F42 to F45) 2b excited by the field winding sets where starting ends and trailing ends have been connected in a reverse direction in parallel.

On one hand, since the rotation salient poles (T1, T3) 1b are always magnetized to N pole and the rotation salient poles (T2, T4) 1b are always magnetized to S pole, the rotation salient poles (T1, T3) 1b and the rotation salient poles (T2, T4) 1b are attracted in the right direction in the figure.

When the rotation salient poles (T1 to T4) rotate in a clockwise direction (move in the right direction in the figure), magnetic distributions of the respective fixed salient poles (F11 to F45) also move according to the rotation, so that the rotation salient poles (T1 to T4) continue to rotate forward in a clockwise direction.

On one hand, when the switching contact of the power-feeding switcher 16 is positioned on the side of the reverse rotation sensors 4L, a detection signal obtained by the sensor pair 4p1 is inputted into a control signal output section 5 advanced from the respective forward rotation sensors 4R by one in the reverse rotation direction. Therefore, magnetic field distributions of the fixed salient poles excited by the field winding sets become equal to ones moved in the reverse rotation direction from the case of the forward rotation by ones. That is, since the magnetic field distributions of the respective fixed salient poles 2b corresponding to the sensor pairs 4p are as shown in the lower stage of the respective fixed salient poles 2b, the rotation salient poles (T1, T3) 1b and the rotation salient poles (T2, T4) 1b are attracted in the left direction in the figure.

When the rotation salient poles (T1 to T4) rotate in a counterclockwise direction (move in the left direction in the figure), the magnetic field distributions of the respective fixed salient poles (F11 to F45) also move in accordance with the rotation, so that the rotation salient poles (T1 to T4) continue to rotate in the counterclockwise direction.

FIG. 43 is an illustrative diagram where a motor main body where n is set to 2, K is set to 5, m is set to 2, and P is set to 2 is rotated in a forward direction and rotated in a reverse direction.

In FIG. 43, L0 is set to (K−m)*(L1+L2), namely, 3*(L1+L2), and the length W of the section to be detected 3a is set to [L0+L2+(m−p)*(L1+L2)], namely, [3*(L1+L2)+L2].

Further, the respective sensors 4 are arranged at the same positions of the two tracks so as to be caused to correspond to the stator 2 to form the sensor pairs 4p. The sections to be detected 3a are alternatively arranged on two tracks such that the trailing ends 3bx thereof in the forward rotation direction are at the same rotation positions as the trailing ends 1bx of the rotation salient poles in the forward rotation direction and the leading ends 3by thereof in the rotation direction are at positions advanced from the leading ends 1by of the rotation salient poles in the rotation direction by L2. Such a configuration is adopted that ones of the sensor pairs 4p on the upper stage detect the sections to be detected 3a on the illustrated upper stage of two tacks, and ones of the sensor pairs 4p on the illustrated lower stage detect the sections to be detected 3a on the illustrated lower stage of two tacks.

Therefore, magnetic fields in the same direction are caused to occur in the respective fixed salient poles 2b to which the rotation salient pole 1b is opposed and the fixed salient poles 2b advanced, by one, from the fixed salient poles 2b through which the leading ends 1by of the rotation salient poles in the rotation direction have passed, so that the fixed salient poles 2b to which the respective trailing ends 1bx of the rotation salient poles in the rotation direction are opposed can be put in magnetization suspension. Further, when the sections to be detected 3a are detected by the sensors 4 of the sensor pairs 4p on the upper stage, detection signals are outputted from the X terminals, and control signals are outputted from the A terminals of the control signal output sections 5, and when the section to be detected 3a are detected by the sensors 4 of the sensor pairs 4p on the lower stage, detection signal are outputted from the Y terminals, and control signals are outputted from the B terminals of the control signal output sections 5.

As a method for sharing the forward rotation sensors 4R and the reverse rotation sensors 4L of the control signal output section 5 in the motor main body 10 of this example, the example shown in FIG. 41 is adopted.

When a switching contact in the power-feeding switcher 16 is positioned on the side of the forward rotation sensors 4R, the sensor pairs 4p1 and 4p5 do not detect the section to be detected 3a, so that the fixed salient poles (F11, F15, F21, F25, F31, F35, F41, F45) corresponding to the sensor pairs (4p1, 4p5) fall into magnetization suspension, as the direction of the magnetic field is shown on the upper stage of the respective fixed salient poles. Further, since the sensor pairs (4p2 to 4p4) detect the section to be detected 3a to output PWM control signals to the B terminals, magnetic fields in the (S) direction occur in corresponding fixed salient poles (F12 to F14, F32 to F34) 2b, and magnetic fields in the (N) direction occur in the fixed salient poles (F22 to F24, F42 to F44) 2b excited by the field winding set where starting ends and terminating ends are connected in a reverse direction in parallel.

On one hand, since the rotation salient poles (T1, T3) 1b are always magnetized to N pole and the rotation salient poles (T2, T4) 1b are always magnetized to S pole, the rotation salient poles (T1, T3) 1b and the rotation salient poles (T2, T4) 1b are attracted in the right direction in the figure.

When the rotation salient poles (T1 to T4) rotate in a clockwise direction (move in the right direction in the figure), magnetic field distributions of respective fixed salient poles (F11 to F45) also move in accordance with the rotation, so shat the rotation salient poles (T1 to T4) continue to rotate in the clockwise direction.

On one hand, when the switching contact of the power-feeding switcher 16 is positioned on the side of the reverse rotation sensors 4L, detection signals from the sensor pairs 4p are inputted into the control signal output sections 5 advanced from the respective forward rotation sensors 4R by two in the reverse rotation direction. Therefore, magnetic field distributions of the fixed salient poles excited by the field winding sets become equal to those moved from the case of the forward rotation in the reverse rotation direction by twos. That is, since the direction of the magnetic fields of the respective fixed salient poles 2b corresponding to the sensor pairs 4p becomes such as shown on the lower stage of the respective fixed salient poles, the rotation salient poles (T1, T3) 1b and the rotation salient poles (T2, T4) 1b are attracted in the left direction in the figure. When the rotation salient poles (T1 to T4) rotate in a counterclockwise direction (move in the left direction in the figure), magnetic field distributions of respective fixed salient poles (F11 to F45) also move in accordance with the rotation, so shat the rotation salient poles (T1 to T4) continue to rotate in the counterclockwise direction.

Fifth Embodiment

A magnetic induction fixed magnetic pole rotor motor of a fifth embodiment is different in a switching method of a rotation direction from the magnetic induction fixed magnetic pole rotor motor of the fourth embodiment, but the both are the same other than the difference. That is, the fifth embodiment and the fourth embodiment are different such a point that in the fourth embodiment, a method where K forward rotation sensor pairs and K reverse rotation sensor pairs are provided, switching of power feeding to the respective sensor pairs to either one of the forward rotation sensor pairs and the reverse rotation sensor pairs is performed in response to a command of a rotation direction, and the control signal output sections and members subsequent thereto are shared by members for forward rotation and for reverse rotation is used, but in the fifth embodiment, a method where the forward rotation sensor pairs and the reverse rotation sensor pairs hold control signal output sections individually, input of a rotation signal into the control signal output section is switched to either one of the forward rotation control signal output section and the reverse rotation control signal output section by a sensor switcher, and the power-feeding control sections (control circuits) and members subsequent thereto are shared by members for forward rotation and for reverse rotation is used. Therefore, the configuration of the whole magnetic induction fixed magnetic pole rotor motor and a switching method of a rotation direction performed by the sensor switcher which are different from those of the fourth embodiment will be described and repetitive explanation about the configuration of the detection section, the operation in the case of rotating the motor main body forward and rotating the same reversely, and the like is omitted.

Figure 44:
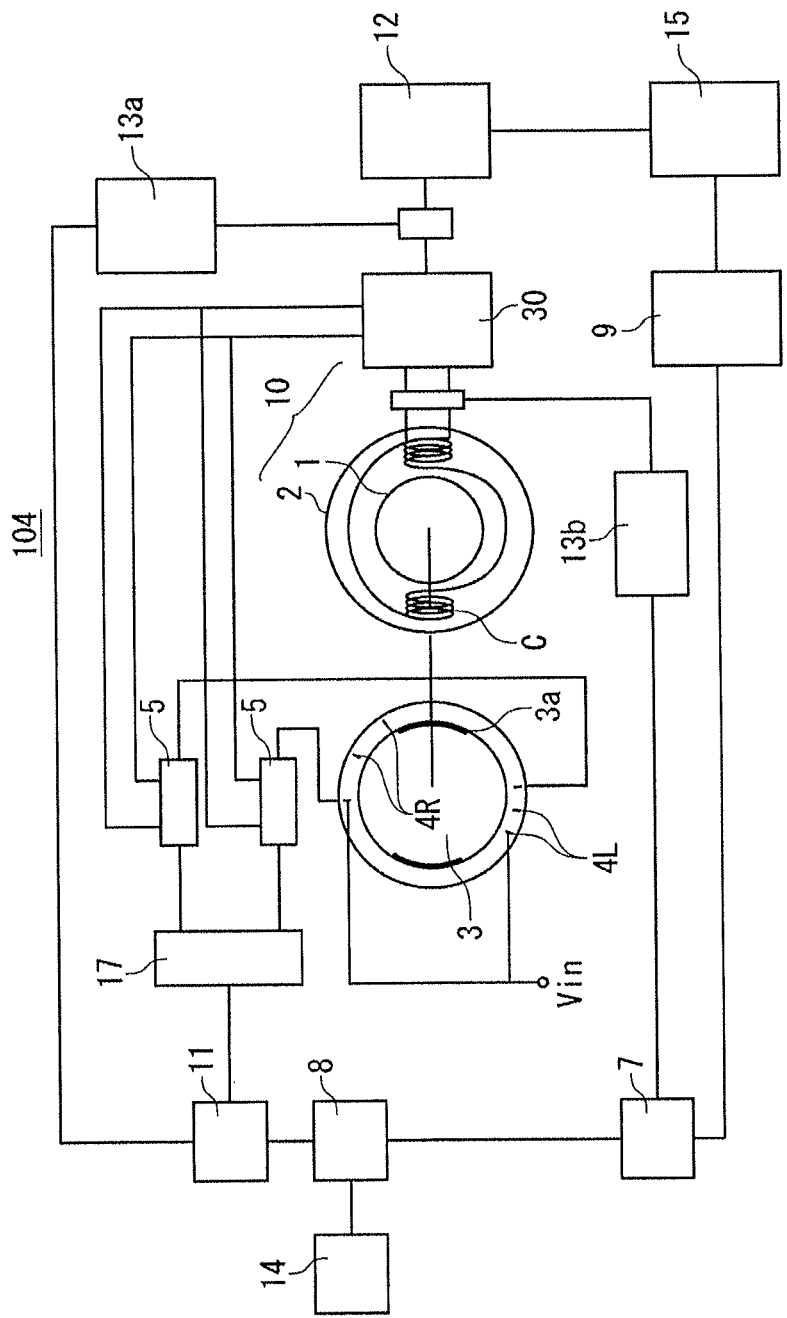
FIG. 44 is a function block diagram showing a magnetic induction fixed magnetic pole rotor motor of a fifth embodiment.

FIG. 44 is a function block diagram showing the magnetic induction fixed magnetic pole rotor motor of the fifth embodiment.

A magnetic induction fixed magnetic pole rotor motor 104 of this embodiment shown in FIG. 44 is provided with a motor main body 10, a detection section 20 provided with a cylindrical body 3 having sections to be detected 3a, K forward rotation sensor pairs 4R, K reverse rotation sensor pairs 4L, and control signal output sections 5 outputting control signals in response to detection signals of respective sensors 4, a power-feeding control section 30 controlling directions and intensities of excitation currents, a chopper signal generation section 14, a command signal generation section 8 generating acceleration/deceleration signals, a rotation signal generation section 11 generating a rotation signal based upon an acceleration command signal, a regeneration signal generation section 7 generating a regeneration signal based upon a deceleration command signal, a regeneration power control section 9, an overload detection section 13a, an overcurrent detection section 13b, a charging section 15, and a sensor switcher 17 switching the control signal output section 5 which is an input destination of a rotation signal generated in the rotation signal generation section 11 between the forward rotation sensors 4R side and the reverse rotation sensors 4L side.

Therefore, when the sensor switcher 17 is switched from the forward rotation sensors 4R side to the reverse rotation sensors 4L side on reception of a command of a rotation direction, the reverse rotation sensors 4L are actuated instead of the forward rotation sensors 4R, control signals outputted from the reverse rotation sensors 4L are inputted to predetermined power-feeding control sections 30. As a result, the directions and the intensities of excitation currents of the respective field magnetic winding sets (C1 to C5) are controlled, and magnetic field distributions of respective fixed salient poles are shifted in the reverse rotation direction by one or two from the magnetic field distributions in the forward rotation, so that the rotor rotates reversely, as shown in FIG. 39 to FIG. 41.

Figure 45:
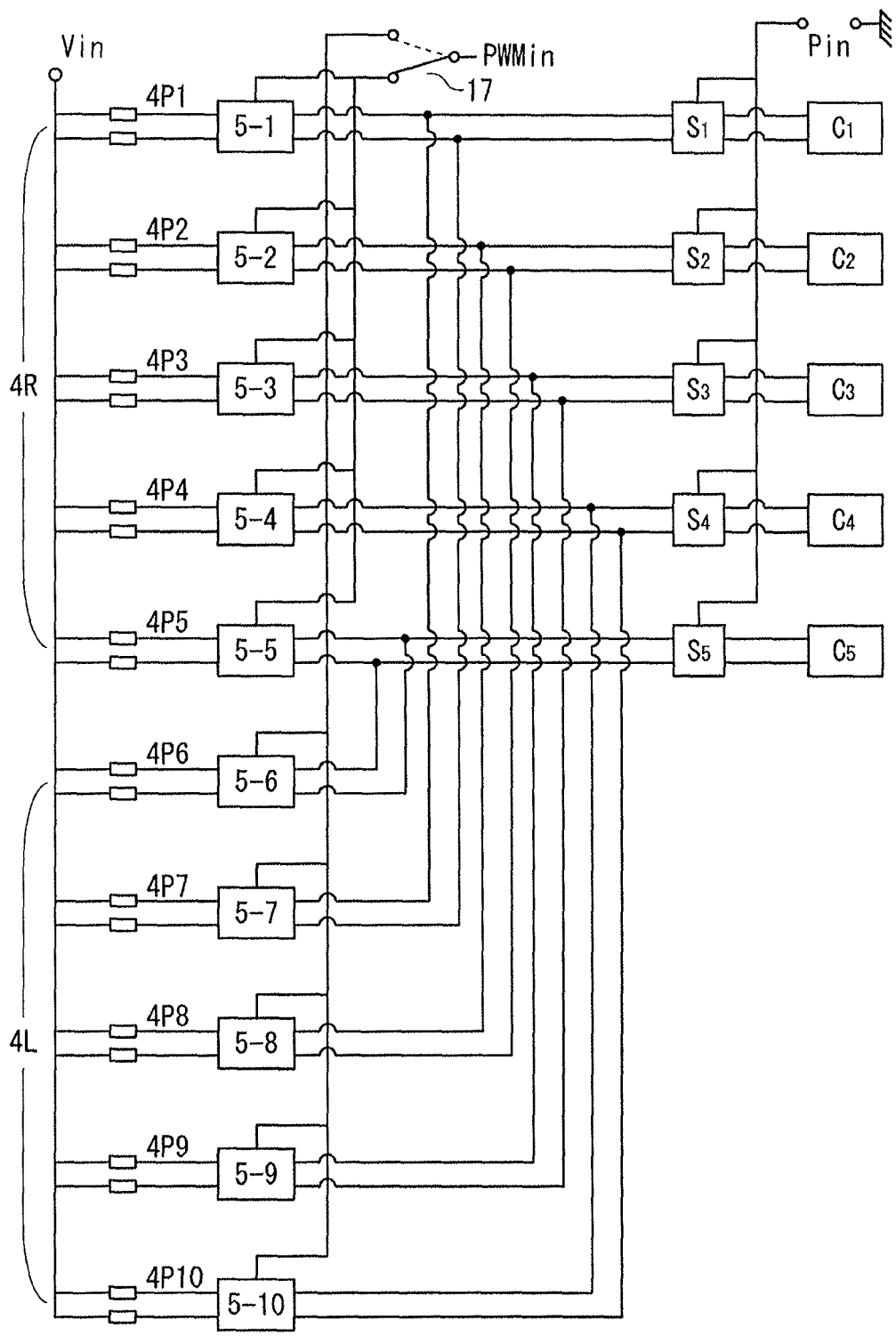
FIG. 45 is a diagram showing a sensor switcher.

FIG. 45 is a diagram showing a sensor switcher.

FIG. 45 is an example where a forward rotation sensor 4R composed of 5 sensor pairs (4p1 to 4p5) and a reverse rotation sensor 4L composed of 5 sensor pairs (4p6 to 4p10) are arranged in a cylindrical body 3-2.

The 5 forward rotation sensor pairs (4p1 to 4p5) are connected to control signal output sections (5-1 to 5-5), and the 5 reverse rotation sensor pairs (4p6 to 4p10) are connected to control signal output sections (5-6 to 5-10). The respective 5 control signal output sections (5-1 to 5-5) are connected to respective 5 control circuits (S1 to S5), and the respective 5 control circuits (S1 to S5) are connected to 5 magnetic field winding sets (C1 to C5).

The respective 5 control circuits (S1 to S5) are fed with power from a direct-current power source Pin, the respective 5 control signal output sections (5-1 to 5-5) for forward rotation and the respective 5 control signal output sections (5-6 to 5-10) for reverse rotation are inputted with rotation signals PWMin pulse-modulated by another system via the sensor switcher 17, and the 10 sensor pairs (4p1 to 4p10) are inputted with actuation power Vin.

In this example, wiring is made such that the sensor pair 4p1 and the sensor pair 4p7 share the control circuit S1, the sensor pair 4p2 and the sensor pair 4p8 share the control circuit S2, the sensor pair 4p3 and the sensor pair 4p9 share the control circuit S3, the sensor pair 4p4 and the sensor pair 4p10 share the control circuit S4, and the sensor pair 4p5 and the sensor pair 4p6 share the control circuit S5. Therefore, when the sensor switcher 17 is switched from the forward rotation sensors 4R side to the reverse rotation sensors 4L side, as control signals outputted from the respective control signal output sections (5-6 to 5-10), the same control signals as those detected by the sensor pairs 4p arranged at positions advanced from the case of the forward rotation in the reverse direction by ones are inputted into the respective control circuits (S1 to S5). Therefore, since magnetic field distributions in the respective fixed salient poles becomes similar to those explained in FIG. 36 and FIG. 37 even in the respective forward and reverse rotation directions, the rotor 1 rotates freely in the respective rotation directions.

Here, as the sensor forming the sensor pair 4p, a light sensor 4a may be adopted and a coil sensor 4c may be adopted. Further, the sections to be detected 3a are not required to be ones formed in the circumferential direction of the side face of the cylindrical body 3 necessarily, and they may be ones formed in the circumferential direction of a flat face of the disk 18. Further, the example of the sensor switcher 17 where when switching is performed from the forward rotation sensors 4R side to the reverse rotation sensors 4L side, switching can also be performed to the control circuits which are input destinations of control signals detected by the sensor pair 4p arranged at positions advanced in the reverse rotation direction by ones

INDUSTRIAL APPLICABILITY

The magnetic induction fixed magnetic pole rotor motor of the present invention can be widely utilized in not only an electric train, an automobile driven by electric power, an automotive bicycle, and a bicycle but also OA equipment, AV equipment, a PC peripheral equipment, electric home appliances, industrial equipment, and the like.

EXPLANATION OF REFERENCE SIGNS 1 rotor
1a rotation shaft
1b rotation salient pole
1bx trailing end of rotation salient pole in rotation direction
1by leading end of rotation salient pole in rotation direction
2 stator
2b fixed salient pole
2c field winding set
3, 3-1, 3-2 cylindrical body
3a section to be detected
4 sensor
4R forward rotation sensor pair
4L reverse rotation sensor pair
4p sensor pair
4a light sensor
4b light sensor pair
4c coil sensor
4cx coil
4cy detection signal output section
4d coil sensor pair
5 control signal output section
5a transistor
6 switching section
6a input terminal
6b, 6c switching contact
7 regeneration signal generation section
8 command signal generation section
9 regeneration power control section
10 motor main body
10a casing
10b holder
11 rotation signal generation section
12 direct-current power source
13a overload detection section
13b overcurrent detection section
14 chopper signal generation section
15 charging section
16 power-feeding switcher
17 sensor switcher
18 disk
19 track
20 detection section
30 power-feeding control section
30a control circuit
31a, 31b, 31c, 31d switching element
35 free wheel diode
40a pulse transformer
40b operational amplifier
40c noise filter
40d diode
60 power controller
70 regeneration brake controller
80 control pedal
90 regeneration power controller
100, 101, 102, 103, 104 magnetic induction fixed magnetic pole rotor motor
130 overload signal generator (or overcurrent signal generator)
150 battery charge voltage controller

The invention claimed is:

1. A magnetic induction fixed magnetic pole rotor motor comprising:
a rotor having 2n rotation salient poles arranged symmetrically regarding a rotation shaft, where n is an integer;
a stator having 2nK fixed salient poles arranged so as to be opposed to the rotation salient poles and formed with K sets of field winding sets by connecting field windings wound on the respective fixed salient poles in parallel or in series at intervals of (K−1), where K is an integer of 3 or more;
K control signal output sections outputting control signals at timings at which the rotation salient poles pass through the respective fixed salient poles based upon detection signals obtained by detecting a plurality of sections to be detected with a predetermined circumferential length formed in a circumferential direction of a cylindrical body or a disk pivoted to the rotation shaft and rotating synchronously symmetrically regarding a rotation shaft by a plurality of light sensors installed at positons corresponding to the respective fixed salient poles so as to be caused to be opposed to a track formed by the sections to be detected, and an adjustment signal of a current flow time; and
a power-feeding control section having K control circuits operating according to the respective control signals and controlling directions and intensities of excitation currents fed from a direct-current power source to the respective field winding sets, wherein
the respective rotation salient poles are opposed to at least two of the fixed salient poles, and
the control signal output sections stop the control signals when the detection signals are not inputted to the control signals output sections, and the control signal output sections output the respective control signals at timings at which the excitation current to the field winding wound on the fixed salient pole to which a trailing end of one of the respective rotation salient poles in the rotation direction is opposed stops, and the excitation currents to the field winding sets wound on the fixed salient pole through which the leading end of the one of the rotation salient poles in the rotation direction has passed and the respective fixed salient poles advanced from the fixed salient pole by at least one are caused to flow in the same directions.

2. The magnetic induction fixed magnetic pole rotor motor according to claim 1, wherein the respective sections to be detected are ones formed on a side face of the cylindrical body or a flat face of the disk in a circumferential direction to be spaced from each other at fixed intervals, and the control signal output sections output the control signals, when the track is singular, by detection signals detected by K light sensor pairs formed by combining the plurality of light sensors installed in one row by twos at intervals of (K−1), and when the track is composed of a plurality of tracks, by detection signals detected by K light sensor pairs formed by combining the plurality of light sensors installed on a plurality of rows by twos of the light sensors installed on different rows.

3. The magnetic induction fixed magnetic pole rotor motor according to claim 2, wherein the respective sections to be detected are reflection sections reflecting illumination light or transmission sections allowing transmission of illumination light, the K light sensor pairs is composed of 2K light sensors emitting lights toward the reflection sections or the transmission sections, receiving reflection lights reflected by the reflection sections or transmission lights from the transmission sections and outputting detection signals, and the control signal output sections output the control signals causing the excitation currents to flow in one direction and the control signals causing the excitation currents to flow in the other direction depending on the detection signals outputted from the respective K light sensor pairs.

4. The magnetic induction fixed magnetic pole rotor motor according to claim 2, wherein the K control signal output sections are forward rotation control signal output sections outputting the control signals according to detection signals detected by K forward rotation light sensor pairs actuated when a predetermined power is fed to the K forward light rotation sensor pairs, and the K control signal output sections are provided with K reverse rotation control signal output sections outputting the control signals according to detection signals detected by K reverse rotation sensor pairs provided separately of the forward light rotation sensor pairs, and a power-feeding switching means switching feeding of the power to one of the forward rotation light sensor pairs and the reverse rotation light sensor pairs when receiving a command regarding a rotation direction of the rotor.

5. The magnetic induction fixed magnetic pole rotor motor according to claim 1, wherein when a length of an opposed face of each rotation salient pole to the fixed salient pole in the rotation direction is L0, a length of the fixed salient pole in the rotation direction is L1, a length of a slot between the rotation salient poles to each other in the rotation direction is L2, the number of the fixed salient poles opposed to each slot between the rotation salient poles to each other is m, and the number of control signal output sections whose control signals are simultaneously stopped of the control signal output sections is p;

p is 1 or more and m or less; and when a circumference of a track formed by the sections to be detected is equal to a circumference formed by the opposed faces of the rotation salient poles, a circumferential length W of the section to be detected is set to [L0+L2+(m−p)*(L1+L2)].

6. The magnetic induction fixed magnetic pole rotor motor according to claim 1, comprising a command signal generation section generating a first command signal for accelerating rotation of the rotor and a second command signal for decelerating the rotation;

a rotation signal generation section generating a rotation signal with a duty ratio corresponding to the first command signal and inputting the rotation signal into the respective control signal output sections;

a regeneration signal generation section generating a regeneration signal with a duty ratio corresponding to the second command signal; and a regeneration power control section rectifying powers induced in the respective field winding sets in response to the duty ratio of the regeneration signal to store electricity in a storage apparatus.

7. The magnetic induction fixed magnetic pole rotor motor according to claim 6, wherein an overload detection section outputting an overload signal when the excitation current caused to flow in each field winding set exceeds a threshold value, wherein the rotation signal generation section decreases the duty ratio of the rotation signal when being inputted with the overload signal, and increases the decreased duty ratio of the rotation signal up to a duty ratio corresponding to the first command signal when the overload signal disappears.

8. The magnetic induction fixed magnetic pole rotor motor according to claim 6, comprising an overcurrent detection section outputting an overcurrent signal when a current due to a voltage induced in each field winding set exceeds a threshold value, wherein the regeneration signal generation section decreases the duty ratio of the regeneration signal when being inputted with the overcurrent signal, and increases the decreased duty ratio of the regeneration signal up to a duty ratio corresponding to the second command signal when the overcurrent signal disappears.

9. The magnetic induction fixed magnetic pole rotor motor according to claim 6, wherein the K control signal output sections are forward rotation control signal output sections outputting the control signals according to detection signals detected by K forward rotation light sensor pairs during input of the rotation signals, and the K control signal output sections are provided with K reverse rotation control signal output sections outputting the control signals according to detection signals detected by K reverse rotation light sensor pairs provided separately of the forward rotation light sensor pairs, and a rotation signal switching means switching the input destinations of the rotation signals to either ones of the forward rotation control signal output sections and the reverse rotation control signal output sections when receiving a command regarding a rotation direction of the rotor.

10. The magnetic induction fixed magnetic pole rotor motor according to claim 1, comprising:

a switching section switching an input destination of one of the control signals outputted from the control signal output sections from one predetermined control circuit of the respective control circuits to another predetermined control circuit, wherein when the switching section receives a command for reversing the rotor from a forward rotation direction to a reverse rotation direction or from the reverse rotation direction to the forward rotation direction, the switching section is subjected to switching.

* * * * *